US 12,134,441 B2
(12) United States Patent
Vorhies et al.

(10) Patent No.: US 12,134,441 B2
(45) Date of Patent: *Nov. 5, 2024

(54) GRIP ASSEMBLY FOR VEHICLE

(71) Applicant: Dextera Brakes, LLC, Winnetka, IL (US)

(72) Inventors: Todd Vorhies, Sandpoint, ID (US); John Doane Nichols, III, Winnetka, IL (US); Nathaniel Bartholomew Egging, Washington Hayden, ID (US); Scott Miller Padiak, Glencoe, IL (US)

(73) Assignee: Dextera Brakes, LLC, Winnetka, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/519,779

(22) Filed: Nov. 27, 2023

(65) Prior Publication Data

US 2024/0239437 A1 Jul. 18, 2024

Related U.S. Application Data

(63) Continuation of application No. 18/152,702, filed on Jan. 10, 2023, now Pat. No. 11,866,123, which is a (Continued)

(51) Int. Cl.
*B62L 3/02* (2006.01)
(52) U.S. Cl.
CPC ................... *B62L 3/023* (2013.01)
(58) Field of Classification Search
CPC ....................................... B62L 3/023
See application file for complete search history.

(56) References Cited

U.S. PATENT DOCUMENTS

D70,281 S 6/1926 Lents
2,271,273 A 1/1942 Mueller
(Continued)

FOREIGN PATENT DOCUMENTS

CN 86202646 U 4/1987
CN 87205545 U 10/1988
(Continued)

OTHER PUBLICATIONS

Sep. 1, 2021—(WO) ISR & WO—App. No. PCT/US2021/035223.
(Continued)

*Primary Examiner* — Vinh Luong
(74) *Attorney, Agent, or Firm* — Banner & Witcoff, Ltd.

(57) ABSTRACT

A lever system using a linkage assembly creates linear movement from a rotational movement of a lever. The lever system may be arranged as a grip assembly to activate a braking system of a vehicle. The linkage assembly may include a slide linkage, a bearing linkage, and a pivot linkage such that the lever may cause an end of the bearing linkage and an end of the pivot linkage to move toward the slide linkage, which causes the slide linkage to move in a linear direction. The grip assembly may have a lever that is pivotally connected with a housing of the grip assembly at a predetermined distance and with a contact region to prevent rotational movement in one direction while allowing rotational movement in the opposite direction. Further, the grip assembly may include a bearing linkage that is pivotally connected to the lever.

20 Claims, 27 Drawing Sheets

Related U.S. Application Data continuation of application No. 17/478,519, filed on Sep. 17, 2021, now Pat. No. 11,618,529, which is a continuation-in-part of application No. 16/892,112, filed on Jun. 3, 2020, now abandoned.

(56) References Cited

U.S. PATENT DOCUMENTS

| | | | |
|---|---|---|---|
| 2,387,020 | A | 10/1945 | Helme |
| D230,927 | S | 3/1974 | Goletski |
| 4,018,292 | A | 4/1977 | Roll et al. |
| 4,225,087 | A | 9/1980 | Lawlor |
| 4,286,699 | A | 9/1981 | Pawelka |
| D270,631 | S | 9/1983 | Moskin et al. |
| 4,471,209 | A | 9/1984 | Hollander |
| 4,909,094 | A | 3/1990 | Yoshigai |
| 5,048,152 | A | 9/1991 | Gray |
| 5,159,851 | A | 11/1992 | Rahmes |
| 5,163,354 | A | 11/1992 | Bilodeau |
| 5,437,206 | A | 8/1995 | Boor |
| 5,572,907 | A | 11/1996 | Kaakinen |
| 5,676,021 | A | 10/1997 | Campagnolo |
| 5,868,377 | A | 2/1999 | Taomo et al. |
| 5,871,202 | A | 2/1999 | Taomo et al. |
| 5,983,506 | A | 11/1999 | Glesser |
| 6,041,895 | A | 3/2000 | Mao |
| 6,139,060 | A | 10/2000 | Lenhart |
| 6,311,370 | B1 | 11/2001 | Blin |
| 6,360,628 | B1 | 3/2002 | Corso |
| 6,457,377 | B1 | 7/2002 | Hsu |
| 6,484,855 | B1 | 11/2002 | Yaple |
| 6,502,675 | B1 | 1/2003 | Andrus |
| 6,615,688 | B2 | 9/2003 | Wessel |
| 6,644,328 | B1 | 11/2003 | Lenhart |
| 6,851,437 | B1 | 2/2005 | Lenhart |
| 6,978,694 | B2 | 12/2005 | Peppard |
| D520,330 | S | 5/2006 | Ejvinsson et al. |
| 7,487,694 | B2 | 2/2009 | Fukui |
| 7,665,769 | B2 | 2/2010 | Lenhart |
| 7,690,085 | B2 | 4/2010 | Lenhart |
| 7,992,258 | B2 | 8/2011 | Stitser |
| 8,113,087 | B2 | 2/2012 | Arnold |
| 8,256,323 | B2 | 9/2012 | Vellutini |
| 8,448,762 | B2 | 5/2013 | Hirose et al. |
| 8,579,329 | B2 | 11/2013 | Lenhart |
| 9,108,726 | B2 | 8/2015 | O'Connell et al. |
| 9,159,507 | B2 | 10/2015 | Mueller et al. |
| 9,268,354 | B1 | 2/2016 | Vorhies et al. |
| 9,287,063 | B2 | 3/2016 | Mueller et al. |
| 10,167,041 | B2 | 1/2019 | Komada et al. |
| 10,240,619 | B2 | 3/2019 | Oi |
| 10,710,671 | B2 | 7/2020 | Henry et al. |
| 11,618,529 | B2 | 4/2023 | Vorhies et al. |
| 2002/0088298 | A1 | 7/2002 | Hsu |
| 2003/0213331 | A1 | 11/2003 | Croft |
| 2005/0029797 | A1 | 2/2005 | Roiser |
| 2005/0150083 | A1 | 7/2005 | Roberts |
| 2006/0169094 | A1* | 8/2006 | Fukui ............... B62K 23/06 74/551.8 |
| 2007/0204716 | A1 | 9/2007 | Dal Pra' |
| 2007/0251059 | A1 | 11/2007 | You |
| 2009/0152063 | A1 | 6/2009 | Tsai |
| 2013/0133467 | A1 | 5/2013 | Slone |
| 2017/0361894 | A1 | 12/2017 | Gahlert |
| 2018/0093738 | A1 | 4/2018 | Komada |
| 2018/0201338 | A1 | 7/2018 | Henry et al. |
| 2018/0215438 | A1 | 8/2018 | Okubo et al. |
| 2019/0152457 | A1 | 5/2019 | Ruopp |

FOREIGN PATENT DOCUMENTS

| | | |
|---|---|---|
| CN | 2145748 Y | 11/1993 |
| CN | 2255401 Y | 6/1997 |
| CN | 2654496 Y | 11/2004 |
| CN | 100420605 C | 9/2008 |
| CN | 103171721 A | 6/2013 |
| CN | 302483214 | 6/2013 |
| CN | 204095990 U | 1/2015 |
| CN | 205906153 U | 1/2017 |
| CN | 106741527 A | 5/2017 |
| CN | 206243366 U | 6/2017 |
| CN | 108001586 A | 5/2018 |
| CN | 108032945 A | 5/2018 |
| CN | 108068946 A | 5/2018 |
| CN | 207955935 U | 10/2018 |
| CN | 109665029 A | 4/2019 |
| DE | 4035154 A1 | 4/1991 |
| DE | 4026058 A1 | 2/1992 |
| DE | 10237212 A1 | 3/2004 |
| DE | 202012006313 U1 | 10/2013 |
| DE | 202012007991 U1 | 12/2013 |
| DE | 202018000240 U1 | 4/2019 |
| EP | 2014544 A2 | 1/2009 |
| EP | 001187066-0001 | 2/2010 |
| EP | 2340988 A2 | 7/2011 |
| EP | 2682332 A1 | 1/2014 |
| GB | 602043 A | 5/1948 |
| GB | 2070319 A | 9/1981 |
| GB | 2477312 A | 8/2011 |
| JP | H08-239075 A | 9/1996 |
| JP | D1157636 | 11/2002 |
| JP | D1305755 | 7/2007 |
| JP | D1468552 | 5/2013 |
| KR | 101350439 B1 | 1/2014 |
| KR | 101551883 B1 | 9/2015 |
| KR | 20170069056 A | 6/2017 |
| TW | I321109 B | 3/2010 |
| TW | M377037 U | 3/2010 |
| TW | M384143 U | 7/2010 |
| TW | 201728487 A | 8/2017 |
| TW | 201922554 A | 6/2019 |
| TW | 201922556 A | 6/2019 |
| WO | 1982 00968 A1 | 4/1982 |
| WO | 2008 122120 A1 | 10/2008 |
| WO | 2012 143258 A2 | 10/2012 |
| WO | 2019 016144 A2 | 1/2019 |
| WO | WO 2023044421 A1 * | 3/2023 ............. B62K 23/06 |

OTHER PUBLICATIONS

Define "Linkage," Google Search, Aug. 9, 2021 (Year: 2021).
Feb. 25, 2022—(TW) TSR—App. No. 110120168.
Mar. 1, 2022—(TW) Office Action—App. No. 110120168.
Aug. 2, 2022—(TW) Office Action—App. No. 110120168.
Nov. 30, 2022—(WO) ISR & WO—App. No. PCT/US2022/076553.
Oct. 3, 2023—(TW) Office Action—App. No. 111135157.

* cited by examiner

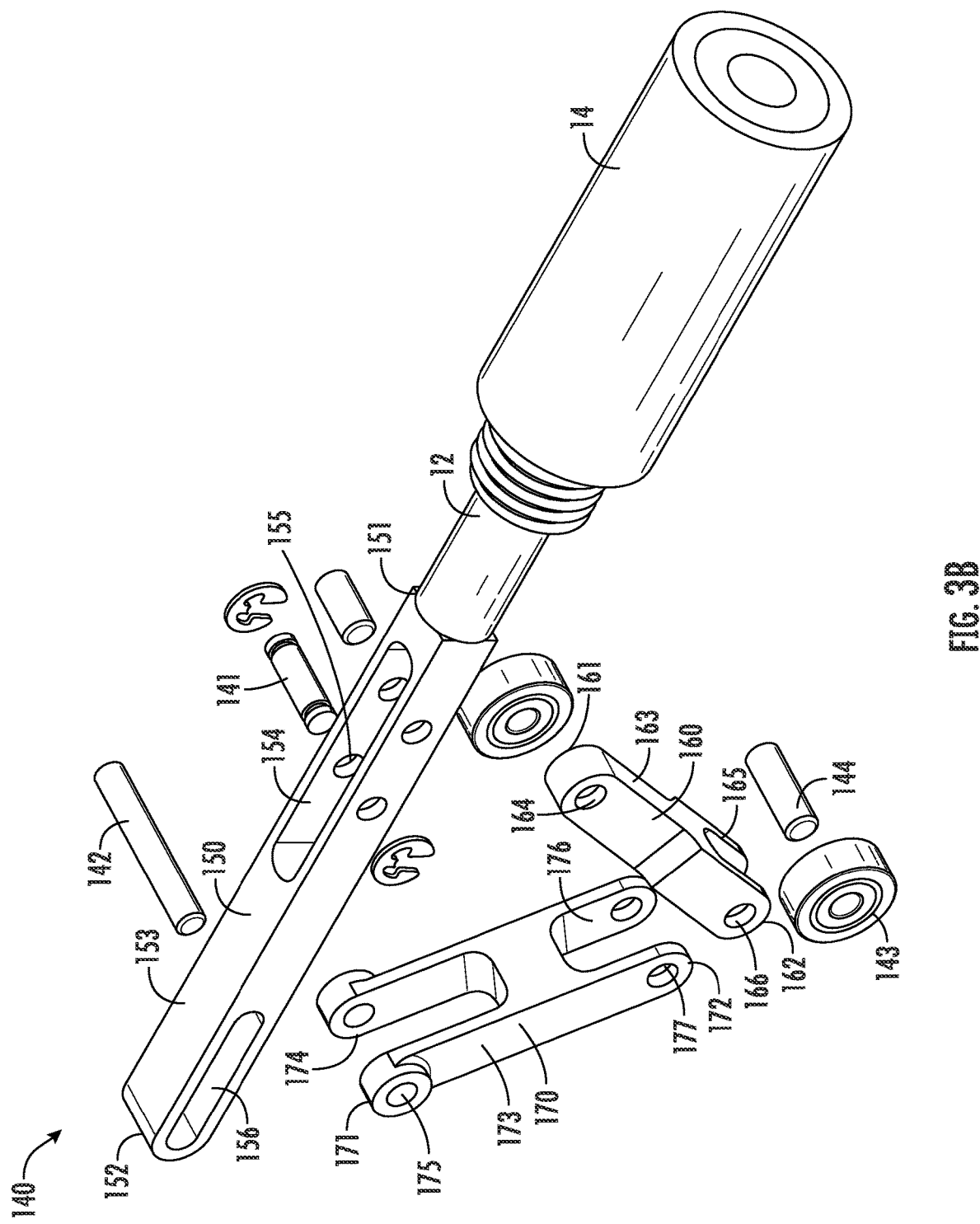

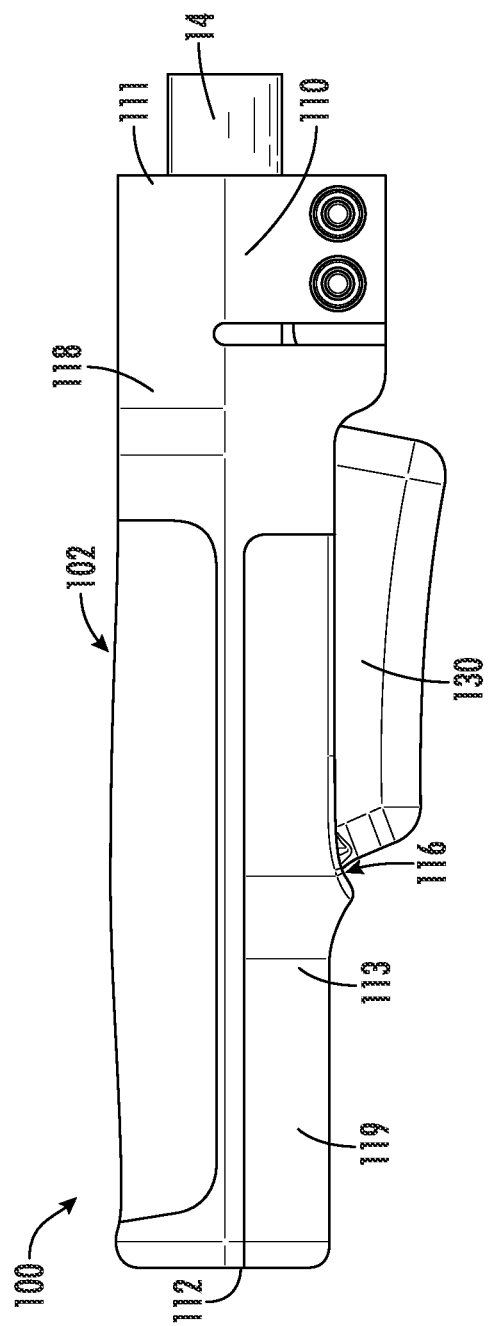
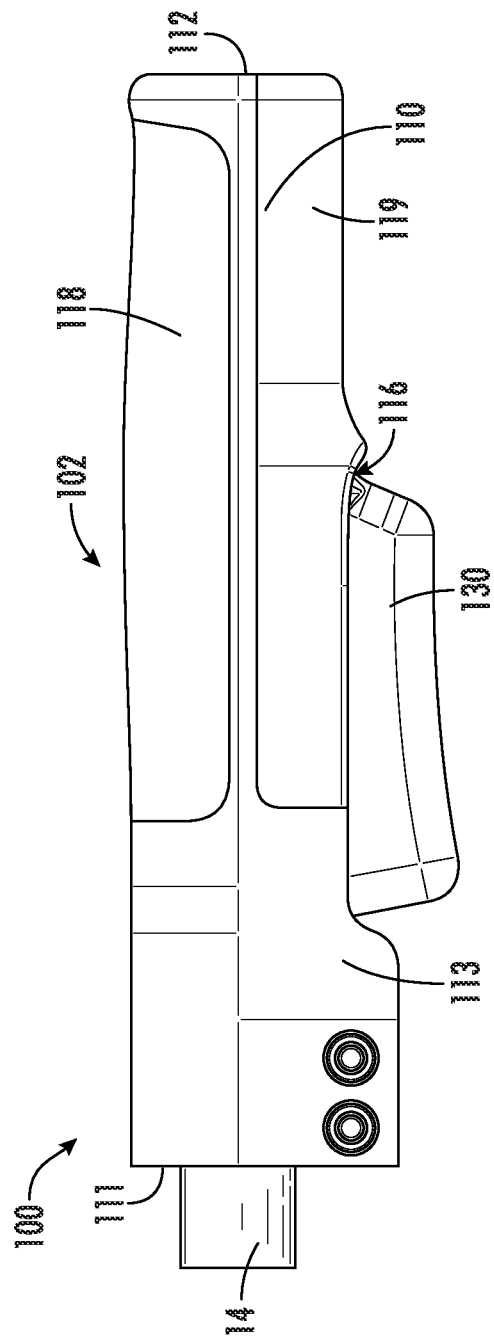

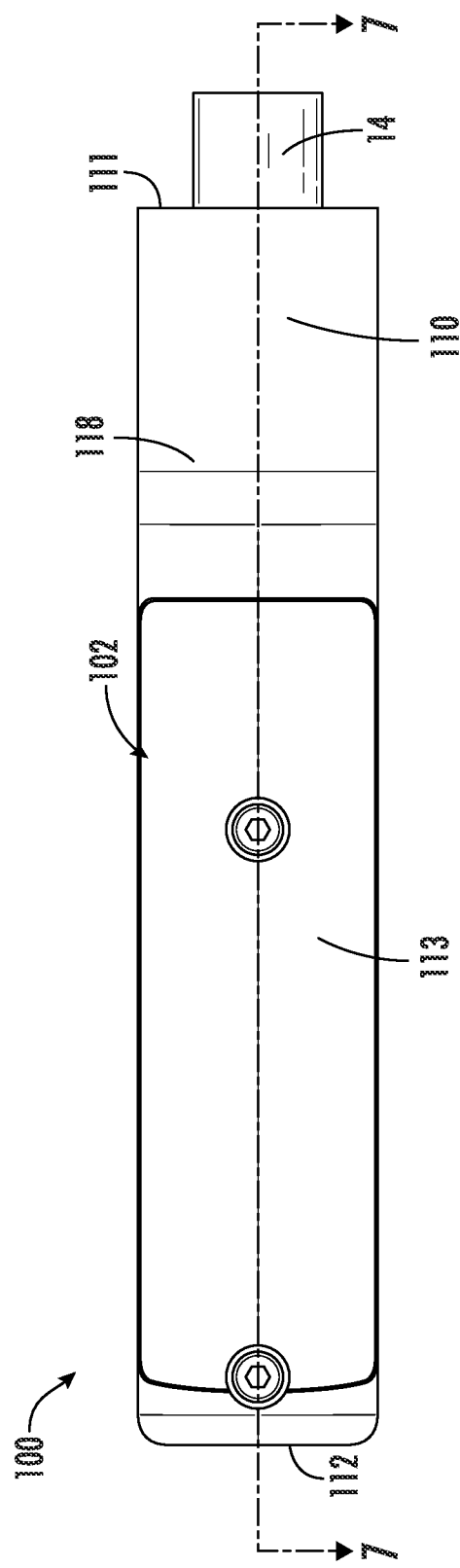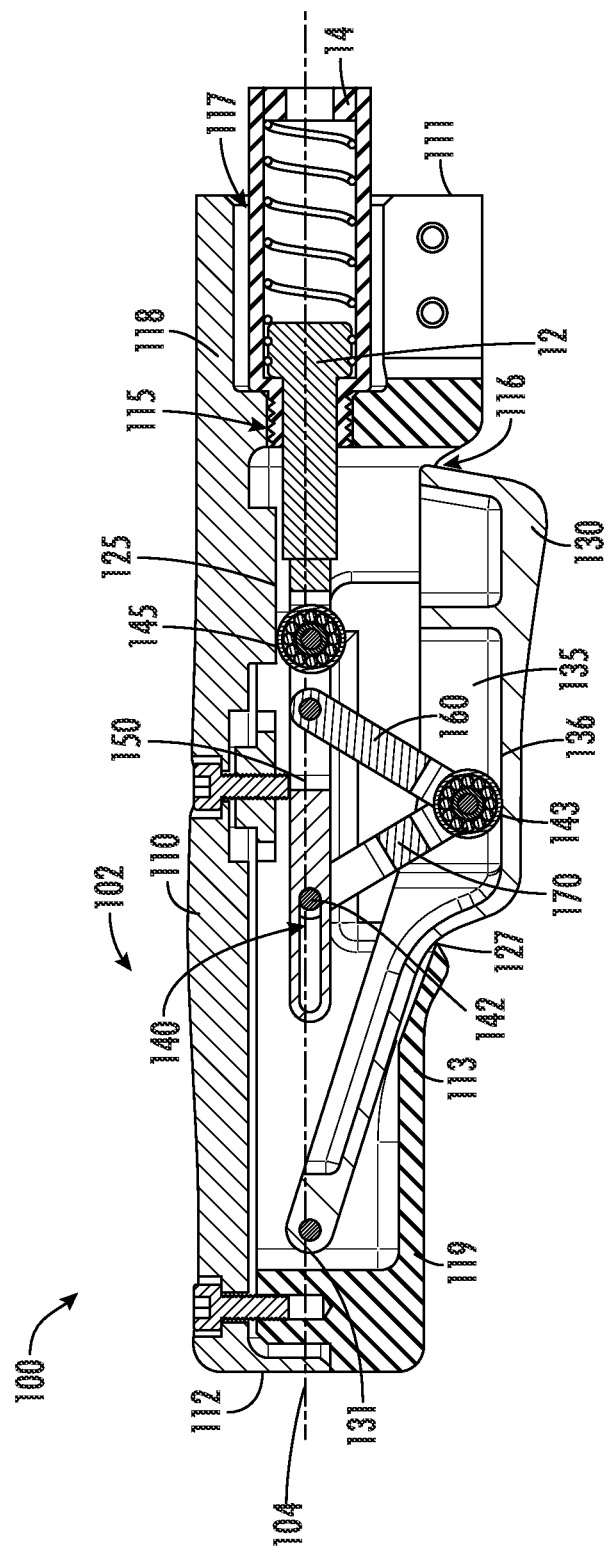

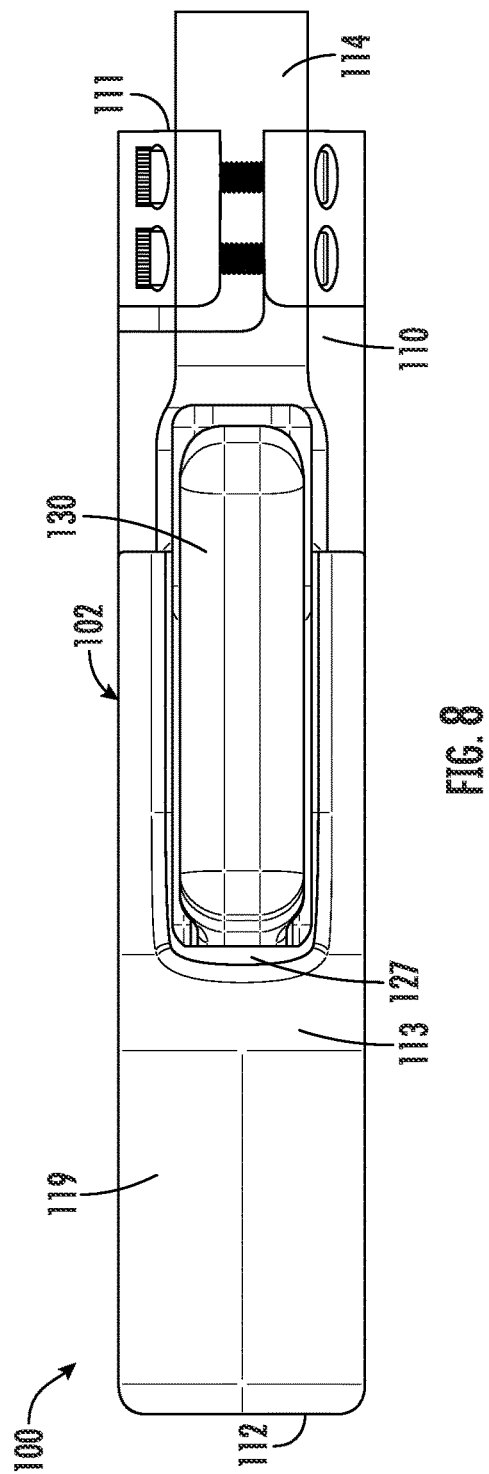

GRIP ASSEMBLY FOR VEHICLE

CROSS-REFERENCE TO RELATED APPLICATION

This application is a continuation of U.S. application Ser. No. 18/152,702 filed on Jan. 10, 2023, which is a continuation of U.S. application Ser. No. 17/478,519 filed on Sep. 17, 2021, which is a continuation-in-part of U.S. patent application Ser. No. 16/892,112 filed on Jun. 3, 2020. The above referenced application is incorporated by reference in its entirety.

TECHNICAL FIELD

Aspects of the disclosure relate to actuation systems in general related to lever assemblies contained within an enclosure or at least partially within an enclosure.

BACKGROUND

Many types of mechanical devices may be used to activate different types of mechanisms. Lever and linkage assemblies may be used to reduce the force needed to activate a mechanical system or change a force exerted in one direction to cause movement in a different direction. As an example, in braking or throttle systems for vehicles, such as a bicycles, scooters, or motorcycles, an externally mounted lever may be utilized to exert a force on a cable or hydraulic braking system to activate the brakes. However, the externally mounted lever may be cumbersome and difficult for some users to operate.

SUMMARY

This Summary introduces some general concepts relating to this disclosure in a simplified form that are further described below in the Detailed Description. This Summary is not intended to identify key features or essential features of the disclosure.

In some aspects, this disclosure may relate to a lever system that includes a housing, a lever, and a linkage assembly. The housing may have a first end, a second end opposite the first end, and a housing body extending between the first end and the second end, where the first end has a first opening that extends into an interior cavity, and a second opening on a lower portion of the housing that extends into the interior cavity. The first axis may define a longitudinal axis of the grip assembly. The lever may have a first end that is pivotally engaged at a first location with the housing, a second end opposite the first end, and a lever body extending between the first end and the second end. The linkage assembly may include: (a) a slide linkage having a first end, a second end opposite the first end, and a slide linkage body extending between the first end and the second end; (b) a bearing linkage having a first end pivotally engaged with the slide linkage and a second end opposite the first end; and (c) a pivot linkage having a first end pivotally engaged with the housing at a second location and also slidably engaged with the slide linkage and a second end opposite the first end that is pivotally engaged with the second end of the bearing linkage. When the lever rotates toward the interior cavity, the second end of the bearing linkage and the second end of the pivot linkage may both move toward the slide linkage causing the slide linkage to move along the longitudinal axis. In some examples, the slide linkage may move toward the first opening when the lever rotates toward the interior cavity, while in other examples, the slide linkage may move away from the first opening when the lever rotates toward the interior cavity. The slide linkage may have a receiver near the first end that receives a cable, where the cable is part of a braking system for a vehicle. The slide linkage may connect to a piston that is configured to attach to a hydraulic line of a braking system for a vehicle. The second end of the bearing linkage and the second end of the pivot linkage may be connected to a first roller bearing. The lever body may include a pocket with a bottom surface, where the first roller bearing contacts the bottom surface. The first end of the lever may be enclosed within the housing and a portion of the lever body extends through the second opening. The housing may include an edge on the second opening that provides a stop to limit rotation of the lever in a direction away from the interior cavity. The housing body may include a first member having the first opening and a curved upper surface and a second member having the second opening, where the interior cavity is formed when the first member and the second member are joined together. The first member and the second member may be releasably joined together.

Other aspects of this disclosure may relate to a grip assembly that includes a housing, a lever, and a linkage assembly. The housing may have a first end, a second end opposite the first end, and a housing body extending between the first end and the second end, where the first end has a first opening that extends into an interior cavity, and a second opening on a lower portion of the housing that extends into the interior cavity. The first opening may define a longitudinal axis of the grip assembly. A lever may have a first end that is pivotally engaged at a first location with the housing, a second end opposite the first end, and a lever body extending between the first end and the second end. A linkage assembly may include: (a) a slide linkage having a first end, a second end opposite the first end, and a slide linkage body extending between the first end and the second end, where the first end of the slide linkage is configured to connect to a brake cable; (b) a bearing linkage having a first end pivotally engaged with the slide linkage, a second end opposite the first end, and a bearing linkage body extending between the first end and the second end, where the first end of the bearing linkage is nearer the second end of the slide linkage than the first end of the slide linkage; and (c) a pivot linkage having a first end pivotally engaged with the housing at a second location and also slidably engaged with the slide linkage and a second end opposite the first end that is pivotally engaged with the second end of the bearing linkage, where the first end of the pivot linkage is connected to the slide linkage nearer the first end of the slide linkage than the second end of the slide linkage. When the lever rotates toward the interior cavity, the second end of the bearing linkage and the second end of the pivot linkage may move towards the slide linkage causing the slide linkage to move away from the first opening. The second end of the slide linkage may connect to a first roller bearing. The first end of the lever may be enclosed within the housing and a portion of the lever body extends through the second opening. The housing body may include a first member having the first opening and a curved upper surface and a second member having the second opening, where the interior cavity is formed when the first member and the second member are joined together.

Still other aspects of this disclosure may relate to a grip assembly that includes a housing, a lever, and a linkage assembly. The housing may have a first end, a second end opposite the first end, and a housing body extending between the first end and the second end, where the first end has a first opening that extends into an interior cavity, and a second opening on a lower portion of the housing that extends into the interior cavity. The first opening may define a longitudinal axis of the grip assembly. The lever may have a first end that is pivotally engaged at a first location with the housing, a second end opposite the first end, and a lever body extending between the first end and the second end. The linkage assembly may include: (a) a slide linkage having a first end, a second end opposite the first end, and a slide linkage body extending between the first end and the second end, where the first end of the slide linkage is configured to connect to a piston; (b) a bearing linkage having a first end pivotally engaged with the slide linkage, a second end opposite the first end, and a bearing linkage body extending between the first end and the second end, where the first end of the bearing linkage is nearer the first end of the slide linkage than the second end of the slide linkage; and (c) a pivot linkage having a first end pivotally engaged with the housing at a second location and also slidably engaged with the slide linkage and a second end opposite the first end that is pivotally engaged with the second end of the bearing linkage, where the first end of the pivot linkage is connected to the slide linkage nearer the second end of the slide linkage than the first end of the slide linkage. When the lever rotates toward the interior cavity, the second end of the bearing linkage and the second end of the pivot linkage may move toward the slide linkage causing the slide linkage to move toward from the first opening. The first end of the lever is enclosed within the housing and a portion of the lever body extends through the second opening. The first opening may be located within a recess on the housing, where the recess is configured to receive a tubular member from a handlebar of a vehicle. The housing body may include a first member having the first opening and a curved upper surface and a second member having the second opening, where the interior cavity is formed when the first member and the second member are joined together. A first roller bearing may be connected near the first end of the slide linkage and the first roller bearing contacts an interior surface of the housing.

Additional aspects of this disclosure may relate to a grip assembly for a vehicle comprising: (a) a housing having a first end, a second end opposite the first end, and a housing body extending between the first end and the second end, where the housing includes a curved outward facing surface along a top side of the housing, the first end of the housing has a first opening that extends into an interior cavity, and a second opening located on a bottom side of the housing opposite the top side that extends into the interior cavity, and the first opening receives a handlebar of the vehicle; and (b) a lever having a first end, a second end opposite the first end, and a lever body extending between the first end and the second end, the lever being pivotally connected to the housing at a lever pivot that is located a predetermined distance from the first end of the lever, where the lever body includes a bottom wall that extends from a first end of the lever to the second end of the lever, a pair of lever side walls, and an end wall at the second end. The lever may also include an inboard region located between the first end of the lever and the lever pivot and configured to contact an index finger of a user and an outboard region located between the second end of the lever and the lever pivot and configured for a pinky finger of the user, where the inboard region may include a contact region that contacts a stop to prevent rotational movement of the lever toward the housing when a force is applied to the inboard region. The grip assembly also includes a pivot linkage having a first end pivotally engaged with the housing, a second end opposite the first end, and a bearing linkage having a first end with a first roller bearing and a second end opposite the first end that is pivotally engaged with the second end of the pivot linkage at a pivot connection, where the first roller bearing moves along an interior surface of the housing. The grip assembly may be utilized to operate a brake system such that when the outboard region of the lever rotates toward the interior cavity of the housing, the first end of the bearing linkage moves away from the first end of the housing causing a brake system of the vehicle to engage a wheel of the vehicle. The bearing linkage may be connected to a cable of the brake system. The lever may include an interior bearing surface that contacts a second roller bearing arranged at the pivot connection, where the interior bearing surface comprises a convex curved surface. In some examples, the stop that contacts the contact region may be integrally formed with the housing. In addition, a clamp may secure the handlebar to the housing, where the clamp forms the stop that contacts the contact region of the lever. The lever pivot may be positioned a predetermined distance from the first end of the lever, where the predetermined distance is within a range of 25 percent and 50 percent of an overall length of the lever. In some examples, the lever pivot may be positioned a predetermined distance from the first end of the lever, where the predetermined distance is within a range of 10 percent and 90 percent of an overall length of the lever.

Other aspects of the disclosure may relate to a grip assembly for a vehicle comprising: (a) a housing having a first end, a second end opposite the first end, and a housing body extending between the first end and the second end, where the first end has a first opening that extends into an interior cavity, and a second opening of the housing that extends into the interior cavity, where the first opening receives a handlebar of the vehicle; (b) a lever having a first end, a second end opposite the first end, and a lever body extending between the first end and the second end, the lever pivotally connected to the housing at a lever pivot that is located a predetermined distance from the first end of the lever, where the lever includes an inboard region located between the first end of the lever and the lever pivot and configured to contact an index finger of a user and an outboard region located between the second end of the lever and the lever pivot and configured for a pinky finger of the user; (c) a bearing linkage having a first end pivotally connected to the lever at a first linkage pivot and a second end of the bearing linkage connected to a cable anchor opposite the first end of the bearing linkage; and (d) a swing linkage having a first end pivotally connected to the second end of the bearing linkage at a second linkage pivot and a second end of the swing linkage pivotally connected to the housing at a third linkage pivot. The inboard region of the lever may include a contact region that contacts a stop to prevent rotational movement of the lever when a force is applied to the inboard region of the lever. The grip assembly may be utilized to operate a brake system such that when the outboard region of the lever rotates toward the interior cavity, the second end of the bearing linkage moves away from the first end of the housing causing a brake system of the vehicle to engage a wheel of the vehicle. The stop that contacts the contact region may be integrally formed with the housing. In some examples, a clamp may secure the handlebar to the housing, where the clamp forms the stop that contacts the contact region. Additionally, the clamp may include an aperture that receives a cable from the brake system, where the cable connects to the cable anchor and extends through the aperture. The lever pivot may be positioned a predetermined distance from the first end of the lever, where the predetermined distance is within a range of 25 percent and 50 percent of an overall length of the lever. The contact region may comprise a boss on an interior surface of the lever. The housing may include an aperture that receives a cable from the brake system, where the cable connects to the cable anchor and extends through the aperture and into the handlebar, where the aperture includes a tapered opening that leads to a receiver configured to receive a cable casing.

Yet other aspects of this disclosure may include a grip assembly for a vehicle comprising: (a) a housing having a first end, a second end opposite the first end, and a housing body extending between the first end and the second end, where the first end has a first opening that extends into an interior cavity, and a second opening of the housing that extends into the interior cavity, and where the first opening receives a handlebar of the vehicle; (b) a lever having a first end, a second end opposite the first end, and a lever body extending between the first end and the second end, where the lever is pivotally connected to the housing at a lever pivot that is located a predetermined distance from the first end of the lever; and (c) a bearing linkage having a first end with a first roller bearing and a second end of the bearing linkage is pivotally connected to the lever with a linkage pivot where the first roller bearing moves along an interior surface of the housing, and where a cable anchor is connected to the first end of the bearing linkage. The lever may include an inboard region located between the first end of the lever and the lever pivot and configured to contact an index finger of a user and an outboard region located between the second end of the lever and the lever pivot and configured for a pinky finger of the user, where the inboard region includes a contact region that contacts a stop to prevent rotational movement of the lever when a force is applied to the inboard region. The grip assembly may be utilized to operate a brake system such that when the outboard region of the lever rotates toward the interior cavity, the first end of the bearing linkage moves away from the first end of the housing causing a brake system of the vehicle to engage a wheel of the vehicle. The interior surface of the housing that contacts the first roller bearing may be angled relative to an upper edge of the housing, where a distance from an outboard end of the interior surface is closer to the upper edge of the housing than an inboard end of the interior surface. The second end of the housing may include an access opening to allow access to the interior cavity of the housing. A clamp may be attached to the housing to secure the handlebar to the housing, where the clamp forms the stop that contacts the contact region, where the clamp includes an aperture that receives a cable from the brake system, and where the cable connects to the cable anchor and extends through the aperture. The housing may include an aperture that receives a cable from the brake system, where the cable connects to the cable anchor and extends through the aperture and into the handlebar.

Additional aspects of this disclosure may relate to a grip assembly for a vehicle comprising: (a) a housing having a first end, a second end opposite the first end, and a housing body extending between the first end and the second end, where the first end has a first opening that extends into an interior cavity, and a second opening of the housing that extends into the interior cavity, and where the first opening receives a handlebar of the vehicle; (b) a lever having a first end, a second end opposite the first end, and a lever body extending between the first end and the second end, the lever pivotally connected to the housing at a lever pivot that is located a predetermined distance from the first end of the lever, where the lever includes an inboard region located between the first end of the lever and the lever pivot and configured to contact an index finger of a user and an outboard region located between the second end of the lever and the lever pivot and configured for a pinky finger of the user, the inboard region having a contact region that contacts a stop to prevent rotational movement of the lever when a force is applied to the inboard region; and (c) a bearing linkage having a first end pivotally connected to the lever at a first linkage pivot and a second end of the bearing linkage connected to a piston, where the piston is slidably connected to a hydraulic cylinder that connects to a hydraulic line that is part of a hydraulic braking system. The grip assembly may be utilized to operate a brake system such that when the outboard region of the lever rotates toward the interior cavity of the housing, the second end of the bearing linkage pushes on the piston causing the hydraulic brake system of the vehicle to engage a wheel of the vehicle. The hydraulic cylinder is secured within the interior cavity of the housing, where the hydraulic line may extend from the hydraulic cylinder and then extend into the handlebar of the vehicle. In some examples, the hydraulic cylinder may be secured to the lever, where the hydraulic line may extend from the hydraulic cylinder and then extend outside of the handlebar of the vehicle.

BRIEF DESCRIPTION OF THE DRAWINGS

Example embodiments of the disclosure will now be described by way of example only and with reference to the accompanying drawings, in which:

FIG. 3B illustrates a perspective exploded view of the linkage assembly of FIG. 3A according to aspects disclosed herein.

FIG. 4 illustrates a front view of the exemplary grip assembly of FIG. 1 according to aspects disclosed herein.

FIG. 5 illustrates a rear view of the exemplary grip assembly of FIG. 1 according to aspects disclosed herein.

FIG. 6 illustrates a top view of the exemplary grip assembly of FIG. 1 according to aspects disclosed herein.

FIG. 7 illustrates a cross-sectional front view of the exemplary grip assembly of FIG. 1 according to aspects disclosed herein.

FIG. 8 illustrates a bottom view of the exemplary grip assembly of FIG. 1 according to aspects disclosed herein.

FIG. 9 illustrates a left side view of the exemplary grip assembly of FIG. 1 according to aspects disclosed herein.

FIG. 10 illustrates a right side view of the exemplary grip assembly of FIG. 1 according to aspects disclosed herein.

DETAILED DESCRIPTION

Figure 1:
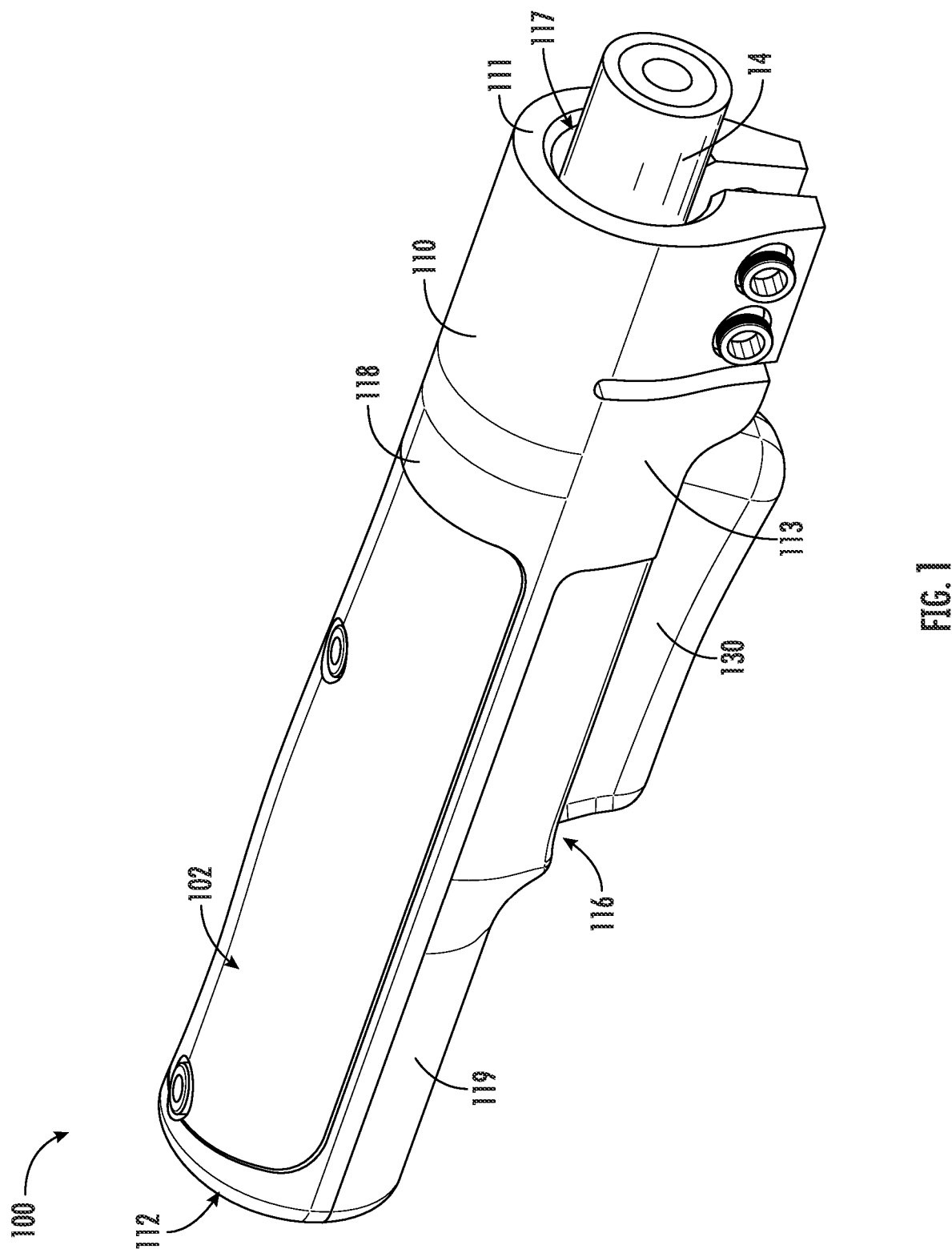
FIG. 1 illustrates a perspective view of an exemplary grip assembly with a lever system for a vehicle according to aspects disclosed herein.
Figure 2A:
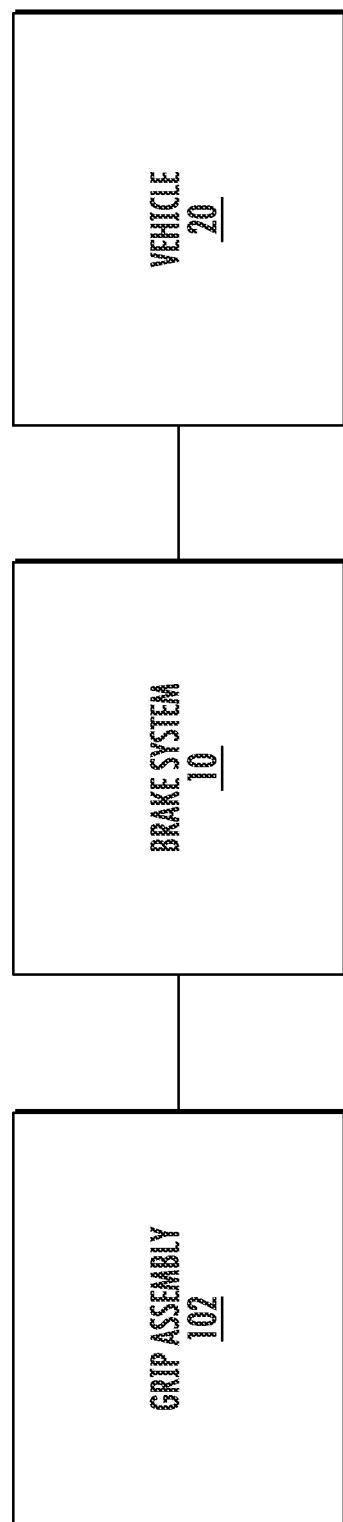
FIG. 2A illustrates a schematic of the exemplary grip assembly of FIG. 1 connected to a brake system of a vehicle according to aspects disclosed herein.
Figure 2B:
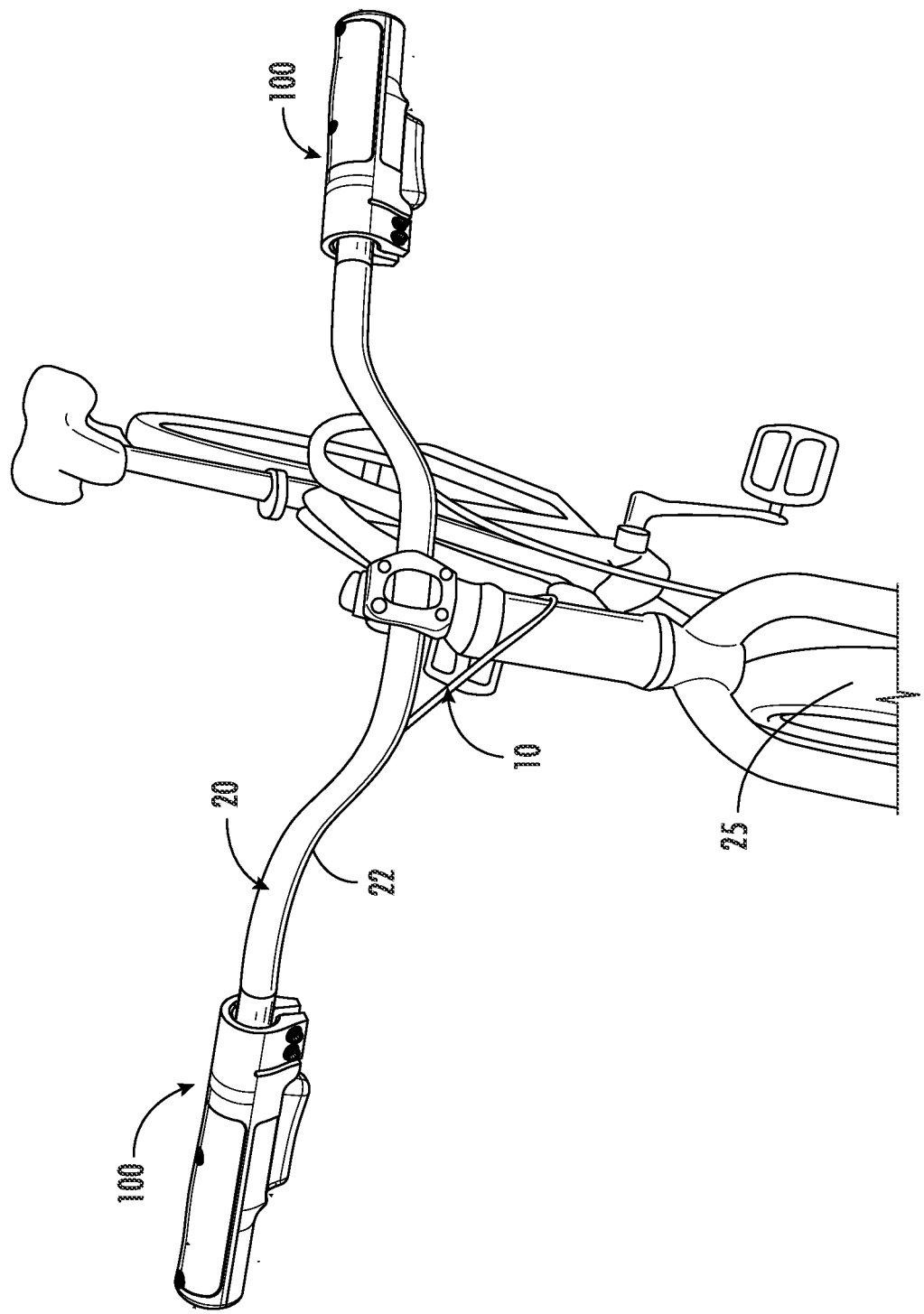
FIG. 2B illustrates a perspective view of the exemplary grip assembly of FIG. 1 connected to a vehicle according to aspects disclosed herein.
Figure 3A:
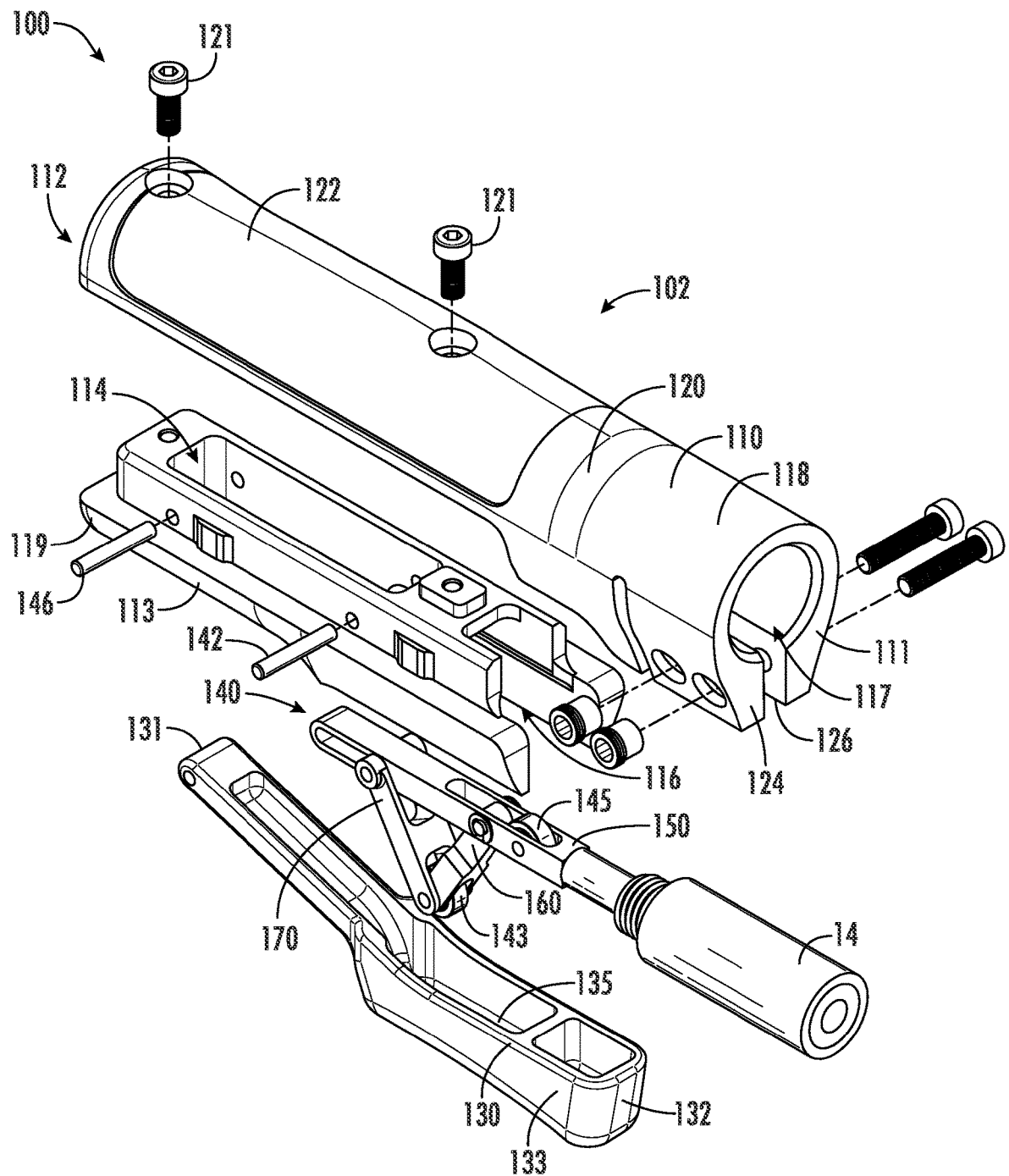
FIG. 3A illustrates a perspective exploded view of the exemplary grip assembly of FIG. 1 according to aspects disclosed herein.

In the following description of various examples of lever assemblies that may be contained or partially contained within an enclosure. In one example, the lever assembly may be a portion of a grip assembly for a braking system of a vehicle as described herein. In this disclosure, reference is made to the accompanying drawings, which form a part hereof, and in which are shown by way of illustration various example structures and environments in which aspects of the disclosure may be practiced.

It is to be understood that other structures and environments may be utilized and that structural and functional modifications may be made from the specifically described structures without departing from the scope of the present disclosure. However, those skilled in the art will readily appreciate that the disclosure herein is not limited to the scales, dimensions, proportions, and/or orientations shown in the figures. Also, while the terms "center", "top," "bottom," "front," "back," "left," "right." "side," "rear," and the like may be used in this specification to describe various example features and elements of the disclosure, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three-dimensional orientation of structures in order to fall within the scope of this disclosure. The reader is advised that the attached drawings are not necessarily drawn to scale.

The examples described herein provide for a lever system that is located in or at least partially located in an enclosure such that the linkage assembly may allow for vertical or rotational movement of a lever to cause a linear movement through a linkage assembly. In some examples, the lever system may be located within an enclosure used for a grip assembly for a vehicle where the lever assembly may be connected to a braking or throttle system for a vehicle such as a bicycle, scooter, motorcycle, or other type of vehicle. The grip assembly may be used for other systems that requires linear movement that is activated by a rotating lever, such as a safety knife, or other type of system.

FIGS. 1-11C illustrate an example lever system 100 that is arranged as a grip assembly 102 to activate a braking system 10 of a vehicle 20. Braking system 10 in the examples of 1-11C may be a hydraulic braking system with a hydraulic line 14 routed inside the handlebar 22 such that the hydraulic line is not externally visible at the intersection of the grip assembly 102. The grip assembly 102 may include a housing 110, a lever 130, and a linkage assembly 140, where the lever 130 may be at least partially located within an interior cavity 114 of the housing 110. The linkage assembly 140 may be at least partially enclosed within the housing 110 and may include three primary linkage members such as a slide linkage 150, a bearing linkage 160, and a pivot linkage 170, where the linkage members are pivotally engaged with each other. For example, the slide linkage 150 may be pivotally engaged with the bearing linkage 160 and the pivot linkage 170, while the bearing linkage 160 and the pivot linkage 170 may be pivotally engaged with each other. The lever 130 may also be pivotally attached to the housing 110 such that when a user applies a force to the lever 130, the lever 130 rotates toward the interior cavity 114 of the housing 110. As the lever 130 rotates toward the interior cavity 114, a portion of the bearing linkage 160 and a portion of the pivot linkage 170 both move toward the slide linkage 150 causing the slide linkage 150 to move along a longitudinal axis 104 of the grip assembly 102.

As shown in FIGS. 3A, 3B, 7, and 11A-C, the linkage assembly 140 may include three primary linkage members 150, 160, 170. The linkage members 150, 160, 170 may form a substantially triangular shape when connected. In this example, the slide linkage 150 may have a first end 151, a second end 152, and a slide linkage body 153 extending between the first end 151 and the second end 152. Similarly, the bearing linkage 160 may have a first end 161, a second end 162 opposite the first end 161, and bearing linkage body 163 extending between the first end 161 and the second end 162, and the pivot linkage 170 may have a first end 171, a second end 172 opposite the first end 171, and pivot linkage body 173 extending between the first end 171 and the second end 172. In some examples, the first end 151 of the slide linkage 150 is configured to connect to a piston 12 of the hydraulic braking system 10 such that the piston is configured to push fluid within a hydraulic line 14 of the hydraulic braking system 10.

The linkage assembly 140 may be arranged such that the first end 161 of the bearing linkage 160 is pivotally connected nearer the first end 151 of the slide linkage 150 than the second end 152 of the slide linkage 150. The first end 161 of the bearing linkage 160 may be received in a forward slot 154. Forward slot 154 may extend through an upper and lower surface of the slide linkage body 153. In addition, the first end 161 of the bearing linkage may have an opening 164 that receives a pin 141 that extends through the opening 164 and through an opening 155 of the slide linkage body 153 to pivotally connect the bearing linkage 160 to the slide linkage 150. Further, the pivot linkage 170 may be pivotally and slidably connected to the slide linkage 150 nearer the second end 152 of the slide linkage 150 than the first end 151. The pivot linkage body 173 may have a first clevis 174 at the first end 171 that receives a portion of the slide linkage body 153. The pivot linkage 170 may have a clevis 174, 176 at each end. First clevis 174 may receive a portion of the slide linkage body 153 and may connect to the slide linkage body 153 with a pin 142 that extends through an opening 175 in the first clevis 174 of the pivot linkage 170 through a rear slot 156. Rear slot 156 may extend through the front and rear surfaces of the slide linkage body 153. Pin 142 may also connect the slide linkage 150 and the pivot linkage 170 to the housing 110. By fixing the pin 142 to the housing 110, the slide linkage 150 may move relative to the housing 110 in a direction toward and away from opening 115. The second end 162 of the bearing linkage body may have a clevis 165 that receives a roller bearing 143, and the second end 172 of the pivot linkage 170 may have a second clevis 176 that receives the second end 162 of the bearing linkage 160. Pin 144 may extend through opening 166 in clevis 165, opening 177 in second clevis 176, and through the roller bearing 143 to connect the bearing linkage 160, the pivot linkage 170, and the roller bearing 143 together. In addition, a second roller bearing 145 may be mounted within the forward slot 154 of the slide linkage 150. The second roller bearing 145 may contact and roll along an interior guide surface 125 located on the first member 118 of the housing 110 as shown in FIG. 7. In some examples, the length of the bearing linkage 160 and the length of the pivot linkage 170 may be substantially the same length, or within 10 percent of the length of each other. The length of the bearing linkage 160 and the pivot linkage 170 may be defined as the distance between the center of the holes 264 and 266 of the bearing linkage 160 and the distance between the center of the holes 275 and 277 of the pivot linkage 170.

The lever 130 may have a first end 131, a second end 132, and a lever body 133 that extends from the first end 131 to the second end 132. The first end 131 of the lever 130 may be pivotally engaged to the housing 110 using pin 146 at a location that is aft of the pin 144 that connects the pivot linkage 170 and slide linkage 150 together, or the pin 146 may be located nearer the second end 112 of the housing than the first end 111 of the housing 110. Alternatively, the lever 130 may be pivotally attached to the housing 110 in other locations, such as pivotally attaching the lever 130 nearer the first end 111 of the housing 110 than the second end 112. The first end 131 of the lever body 133 may be enclosed in the interior cavity 114 within the housing 110 while a portion of the lever body 133 may extend through a lower opening 116 in a lower portion of the housing 110 such that a portion of the lever body 133 is exposed outside of the housing 110. Alternatively or optionally, the lever 130 may be pivotally attached to the housing 110 where the lever 130 is located completely outside of the housing 110.

The lever body 133 may include a pocket 135 with a bottom surface 136, such that the roller bearing 143 may contact the bottom surface 136. As the lever 130 rotates toward the interior cavity 114, the bottom surface 136 may exert a force on the roller bearing 143 causing the second end 162 of the bearing linkage 160 and the second end 172 of the pivot linkage 170 to move towards the slide linkage 150 causing the slide linkage 150 to move toward from a side opening 115 of the housing 110. As the slide linkage 150 moves toward the side opening 115, the piston 12 pushes the hydraulic fluid within the hydraulic brake system 10 causing the brakes to engage.

The housing 110 having a first end 111, a second end 112 opposite the first end 111, and a housing body 113 extending between the first end 111 and the second end 112. The first end 111 may have a side opening 115 that extends into an interior cavity 114, and a lower opening 116 on a lower portion of the housing 110 that also extends into the interior cavity 114. The side opening 115 may have a cylindrical shape that defines longitudinal axis 104 of the grip assembly 102. The housing 110 may also have a recess 117 formed at the first end 111 that is coaxial with the longitudinal axis 104. Recess 117 may receive a portion a tubular member of the handlebar 22 to connect the grip assembly 102 to the vehicle 20. The housing 110 may have a pair of opposing flanges 124 spaced on either side of an opening 126 that extends into recess 117. A pair of mechanical fasteners 128 may extend through openings in the flanges to secure the grip assembly 102 onto the tubular member of the vehicle 20.

The housing body 113 may include a first member 118 and a second member 119 that are releasably joined together. For example, the first member 118 and second member 119 may be releasably joined using mechanical fasteners 121 as in the illustrated example to allow for disassembly and any maintenance or repairs. The first member 118 may have a curved upper outward facing surface 120 and form the side opening 115 and an upper portion of the interior cavity 114. The second member 119 may have a curved lower outward facing surface and form the lower opening 116 and a lower portion of the interior cavity 114. In addition, the lower member 119 may be pivotally connected to the lever 130 and also have an opening to receive pin 142 to fix the location of the first end of the pivot linkage 170. The interior cavity 114 may be formed when the first member 118 and the second member 119 are joined together. An edge 127 of the lower opening 116 may contact a portion of the lever body 133 to provide a stop to limit rotation of the lever 130 in a direction away from the interior cavity 114.

In addition, the first member 118 of the housing may have a recess 122 along the first member 118 that may be configured to receive a flexible or polymer coating to enhance the feel of the grip assembly 102. In some examples, a removable covering may be fitted over the entire grip assembly 102 or over a majority of the grip assembly 102 to enhance the feel of the grip assembly 102. The removable covering may act as a moisture and dust barrier to keep unwanted moisture and debris from the interior components of the grip assembly 102.

Figure 11A:
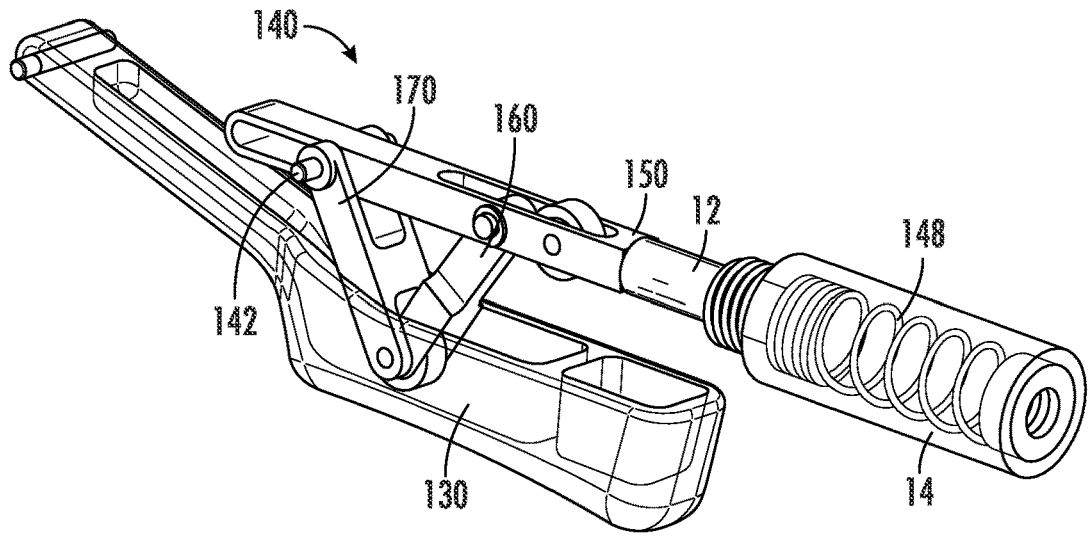
FIG. 11A illustrates a perspective view of the exemplary grip assembly of FIG. 1 with some components removed for clarity according to aspects disclosed herein.
Figure 11B:
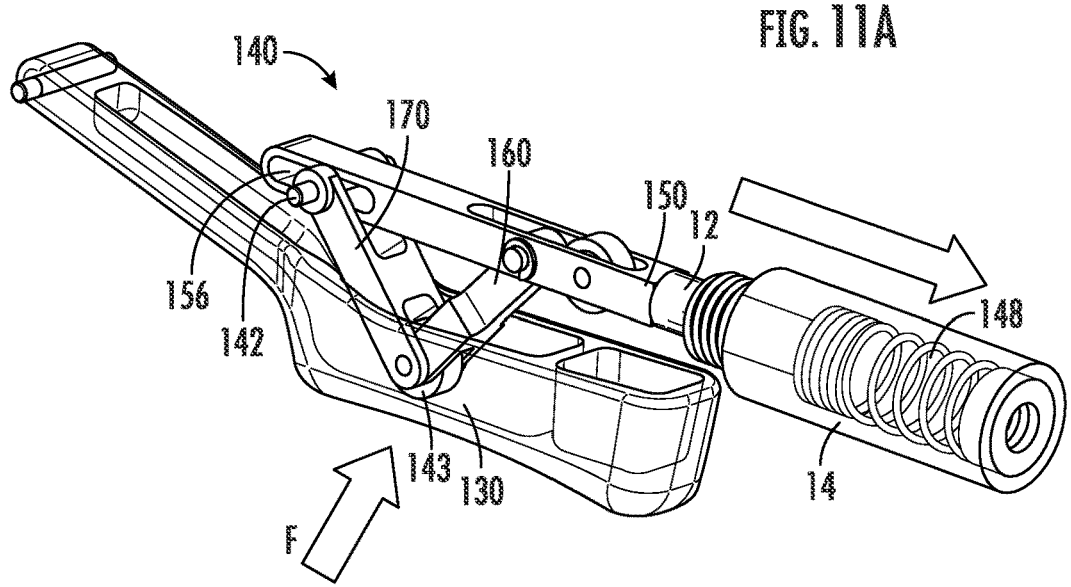
FIG. 11B illustrates a perspective view of the exemplary grip assembly of FIG. 1 with some components removed for clarity according to aspects disclosed herein.
Figure 11C:
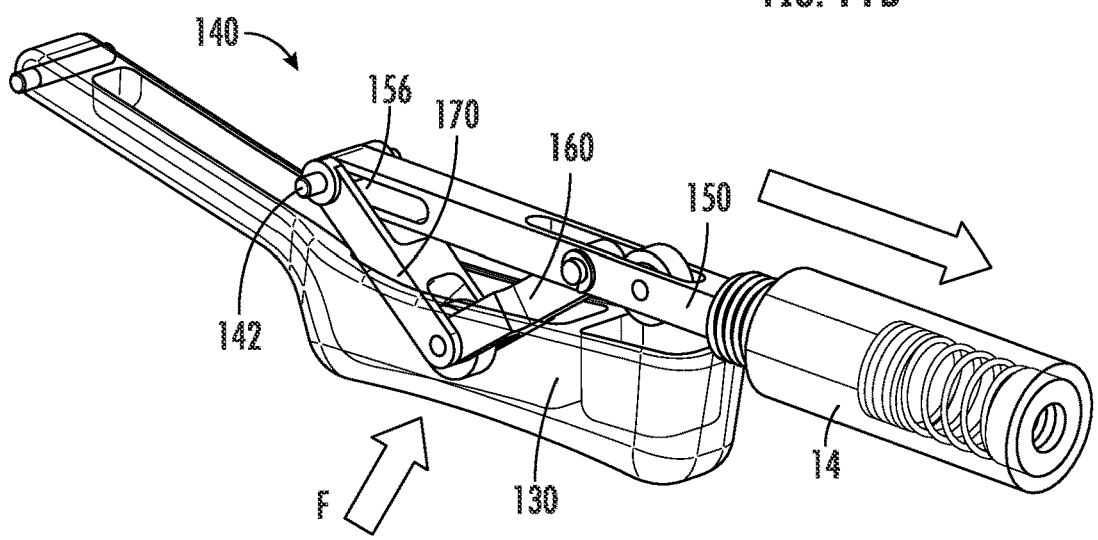
FIG. 11C illustrates a perspective view of the exemplary grip assembly of FIG. 1 with some components removed for clarity according to aspects disclosed herein.
Figure 12:
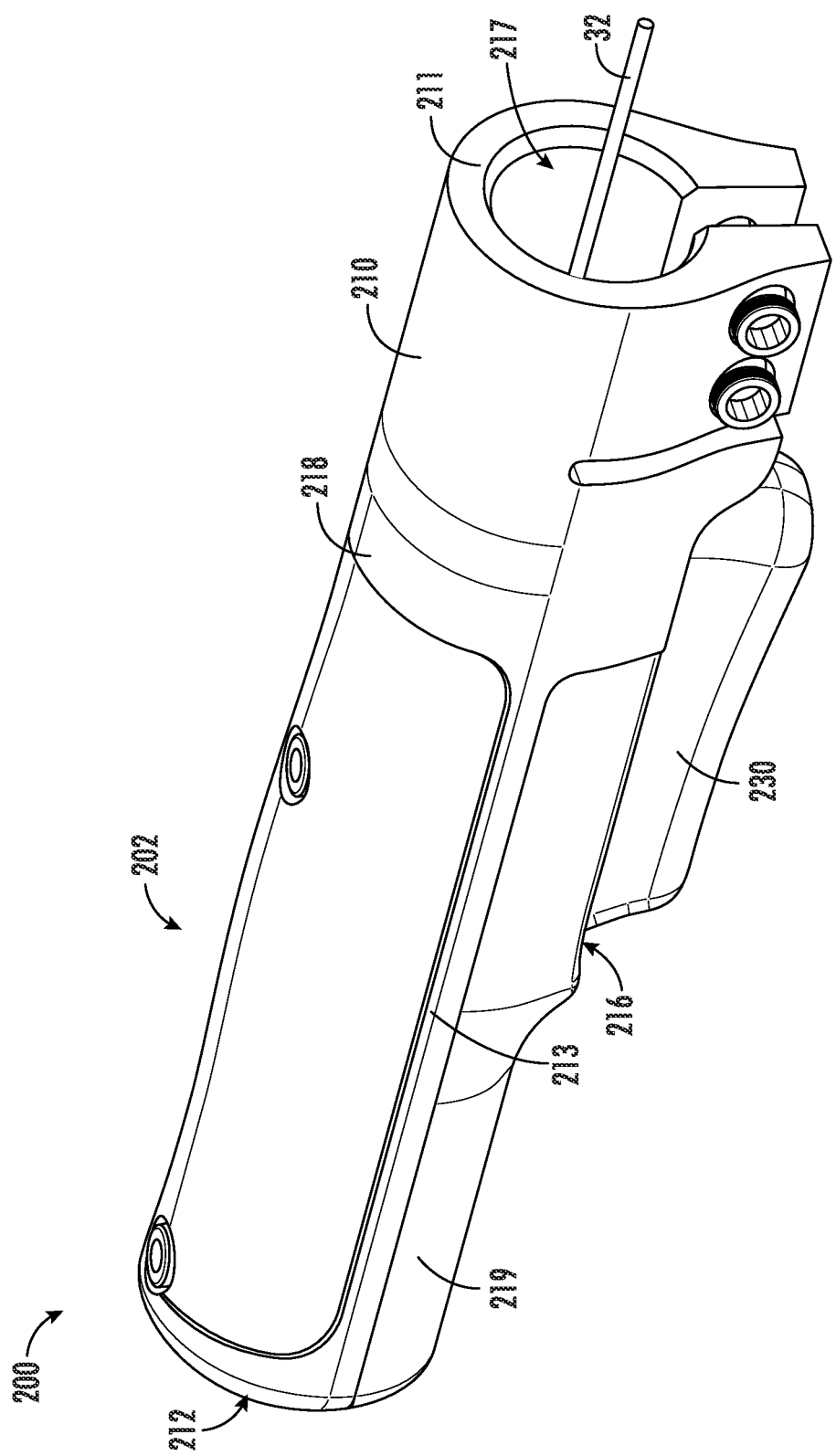
FIG. 12 illustrates a perspective view of an alternate exemplary grip assembly for a vehicle with a lever system according to aspects disclosed herein.

As best illustrated in FIGS. 11A-11C, the lever 130 may be rotated toward the interior cavity 114 of the housing 110 causing the slide linkage 150 to move linearly toward the opening 115 of the housing 110. In the illustrated examples in FIGS. 11A-11C, the housing 110 is removed to illustrate the linkage assembly 140 movement. In FIG. 11A, the lever 130 and linkage assembly 140 are in a normal or rest position. In FIG. 11B, the lever 130 has received a force, F, causing the lever 130 to rotate upward towards the slide linkage 150. As the lever 130 moves upwards, the roller bearing 143 begins to roll along the bottom surface 136 of the pocket 135 and the second end 162 of the bearing linkage 160 and the second end of the pivot linkage 170 begin to move upward. The upward movement of second ends 162, 172 causes the slide linkage 150 to move horizontally as the first end 171 of the pivot linkage 170 moves rearward within the rear slot 156. Because end 171 of the pivot linkage 170 is fixed to the housing 110, the slide linkage 150 moves towards the opening 115 of the housing beginning to push the fluid in the hydraulic line while also compressing spring 148 within the hydraulic line 14. As shown in FIG. 11C, the rear slot 156 acts as a stop for the slide linkage 150 as well as a stop for the lever's upward movement, such that a length of the rear slot 156 may determine the length of horizontal movement of the slide linkage 150. In this fully extended condition, the brakes of the vehicle may be fully engaged. Additionally, the angle between the pivot linkage 170 and the bearing linkage 160 may be greater in the fully extended condition as compared to the rest condition. As the force is removed from the lever 130, the spring 148 that was compressed when the brakes were engaged, exerts a force to return the linkage assembly 140 back to its rest condition.

The components for the grip assembly 102 such as the linkage members 150, 160, 170 as well as the lever 130 and housing members 118, 119 may be formed from metallic materials such as but not limited to aluminum, magnesium, steel, or non-metallic materials such as a polymeric material, carbon based composites, or other lightweight material. The components may be formed from known process such as molding, casting, forging, machining, or other methods known to one skilled in the art.

FIGS. 12-14C illustrate an example lever system 200 that is arranged as a grip assembly 202 to activate a cable braking system 10 of a vehicle 20. For the example of FIGS. 12-14C, the features are referred to using similar reference numerals under the "2xx" series of reference numerals, rather than "1xx" as used in the embodiment of FIGS. 1-11C. Accordingly, certain features of the grip assembly 202 that were already described above with respect to grip assembly 102 of FIGS. 1-11C may be described in lesser detail, or may not be described at all. Grip assembly 202 may be connected to a brake system 10 that is arranged as a cable oriented brake system 10 with a cable 32 routed inside the handlebar 22 such that the cable 32 is not externally visible at the intersection of the grip assembly 202. The grip assembly 202 may include a housing 210, a lever 230, and a linkage assembly 240, where the lever 230 may be at least partially located within an interior cavity 214 of the housing 210. The linkage assembly 240 may include three primary linkage members such as a slide linkage 250, a bearing linkage 260, and a pivot linkage 270, where the linkage members are pivotally engaged with each other. For example, the slide linkage 250 may be pivotally engaged with the bearing linkage 260 and the pivot linkage 270, while the bearing linkage 260 and the pivot linkage 270 may be pivotally engaged with each other. The lever 230 may also be pivotally attached to the housing 210 such that when a user applies a force to the lever 230, the lever 230 rotates toward the interior cavity 214 of the housing 210. As the lever 230 rotates toward the interior cavity 214, a portion of the bearing linkage 260 and a portion of the pivot linkage 270 both move toward the slide linkage 250 causing the slide linkage 250 to move along a longitudinal axis 204 of the grip assembly 202.

Figure 13:
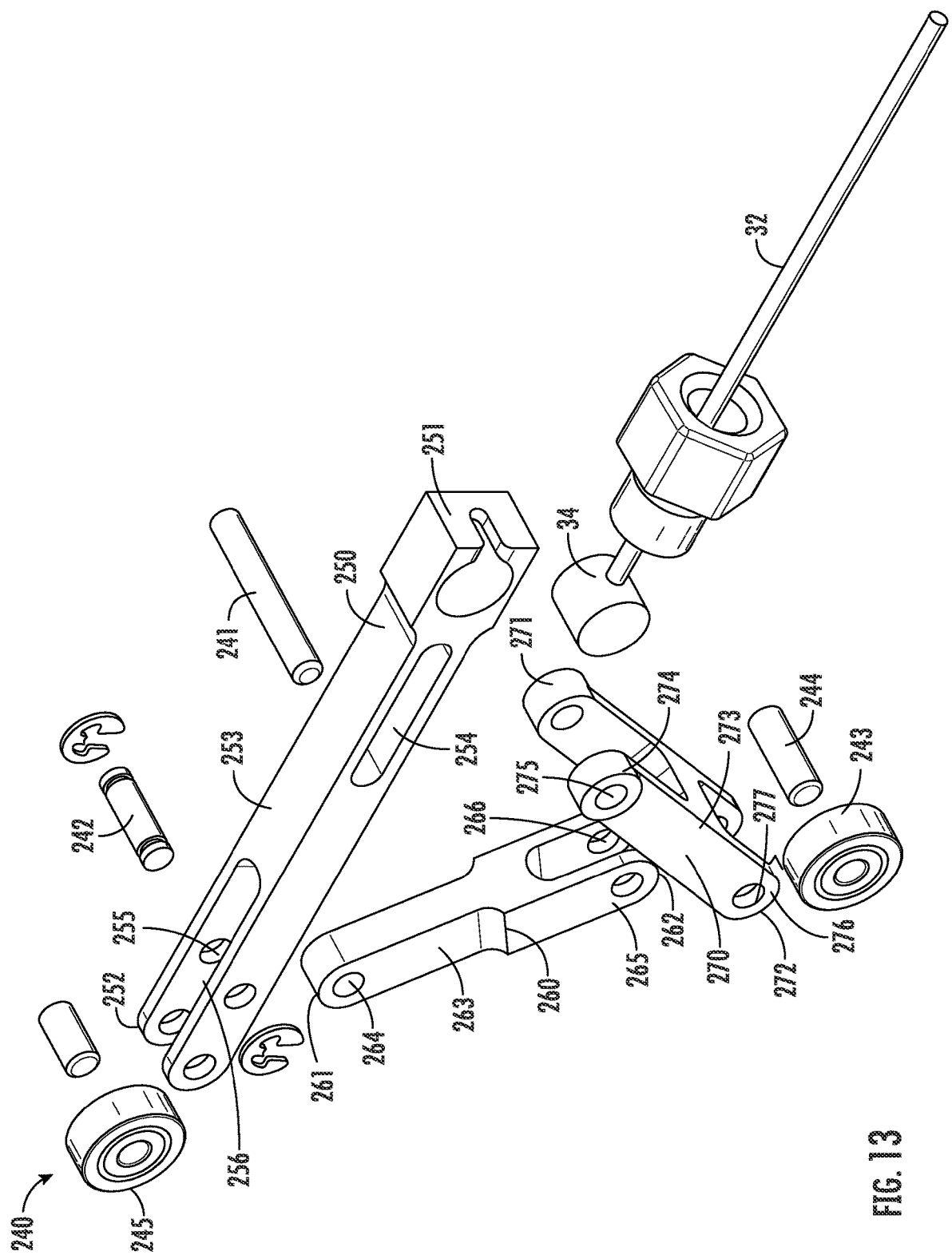
FIG. 13 illustrates a perspective exploded view of the linkage assembly of the grip assembly of FIG. 12 according to aspects disclosed herein.

As shown in FIG. 13, the linkage assembly 240 may include three primary linkage members. In this example, the slide linkage 250 may have a first end 251, a second end 252, and a slide linkage body 253 extending between the first end 251 and the second end 252. Similarly, the bearing linkage 260 may have a first end 261, a second end 262 opposite the first end 261, and bearing linkage body 263 extending between the first end 261 and the second end 262, and the pivot linkage 270 may have a first end 271, a second end 272 opposite the first end 271, and pivot linkage body 273 extending between the first end 271 and the second end 272. In some examples, the first end 251 of the slide linkage 250 may have a receiver 259 that is configured to receive an engaging member 34 of the cable 32 of the cable braking system 10. The linkage assembly 240 may be arranged such that the first end 261 of the bearing linkage 160 is pivotally connected nearer the second end 252 of the slide linkage 250 than the first end 251 of the slide linkage 250. The first end 261 of the bearing linkage 260 may be received in a rear slot 256. Rear slot 256 may extends through an upper and lower surface of the slide linkage body 253 and may have the form of a clevis. In addition, the first end 261 of the bearing linkage may have an opening 264 that receives a pin 242 that extends through the opening 264 and through an opening 255 of the slide linkage body 253 to pivotally connect the bearing linkage 260 to the slide linkage 250. Pin 242 may also connect the slide linkage 250 and the bearing linkage 260 to the housing 210. By fixing the pin 242 to the housing 210, the slide linkage 250 may move relative to the housing 210. Further the pivot linkage 270 may be pivotally and slidably connected to the slide linkage 250 nearer the first end 251 of the slide linkage 250 than the second end 252. The pivot linkage body 273 may have a first clevis 274 at the first end 271 that receives a portion of the slide linkage body 253. The pivot linkage body 273 may be connected to the slide linkage 250 with a pin 241 that extends through an opening 275 in the first clevis 274 of the pivot linkage 270 through a forward slot 254. Forward slot 254 may extend through the front and rear surfaces of the slide linkage body 253. The second end 262 of the bearing linkage body may have a clevis 265 that receives a roller bearing 243, and the second end 272 of the pivot linkage 270 may have a second clevis 276 that receives the second end 262 of the bearing linkage 260. Pin 244 may extend through opening 266 in clevis 265, opening 277 in second clevis 276, and through the roller bearing 243 to connect the bearing linkage 260, the pivot linkage 270, and the roller bearing 243 together. In addition, a second roller bearing 245 may be mounted within the rear slot 256 of the slide linkage 250. The second roller bearing 145 may contact and roll along an interior surface of the lever 230.

The lever 230 may have a first end 231, a second end 232, and a lever body 233 that extends from the first end 231 to the second end 232. The first end 231 of the lever 230 may be pivotally engaged with the housing 210 at a location that is aft of the pin 242 that connects the bearing linkage 260 and slide linkage 250 together. The first end 231 of the lever body 233 may be enclosed in the interior cavity 214 within the housing 210 while a portion of the lever body 233 may extend through a lower opening 216 in a lower portion of the housing 210. The lever body 233 may include a pocket 235 with a bottom surface 236, such that the roller bearing 243 may contact the bottom surface 236. As the lever 230 rotates toward the interior cavity 214, the bottom surface 236 may exert a force on the roller bearing 243 causing the second end 262 of the bearing linkage 260 and the second end 272 of the pivot linkage 270 to move towards the slide linkage 250 causing the slide linkage 250 to move away from a side opening 215 of the housing 210. As the slide linkage 250 moves away the side opening 215 pulling the cable 32 causing the braking system 10 to engage a wheel 25 on the vehicle 20.

The housing 210 having a first end 211, a second end 212 opposite the first end 211, and a housing body 213 extending between the first end 211 and the second end 212. The first end 211 may have a side opening 215 that extends into an interior cavity 214, and a lower opening 216 on a lower portion of the housing 210 that also extends into the interior cavity 214. The side opening 215 may have a cylindrical shape that defines longitudinal axis 204 of the grip assembly 202. The housing 210 may also have a recess 217 formed at the first end 211 that is coaxial with the longitudinal axis 204. Recess 217 may receive a portion a tubular member of the handlebar 22 to connect the grip assembly 202 to the brake system 10 of the vehicle 20. The housing body 213 may include a first member 218 and a second member 219 that are releasably joined together. The first member 218 may have a curved upper outward facing surface and form the side opening 215 and an upper portion of the interior cavity 214. The second member 219 may have a curved lower outward facing surface and form the lower opening 216 and a lower portion of the interior cavity 214. The interior cavity 214 may be formed when the first member 218 and the second member 219 are joined together. An edge 227 of the lower opening 216 may contact a portion of the lever body 233 to provide a stop to limit rotation of the lever 230 in a direction away from the interior cavity 214.

Figure 14A:
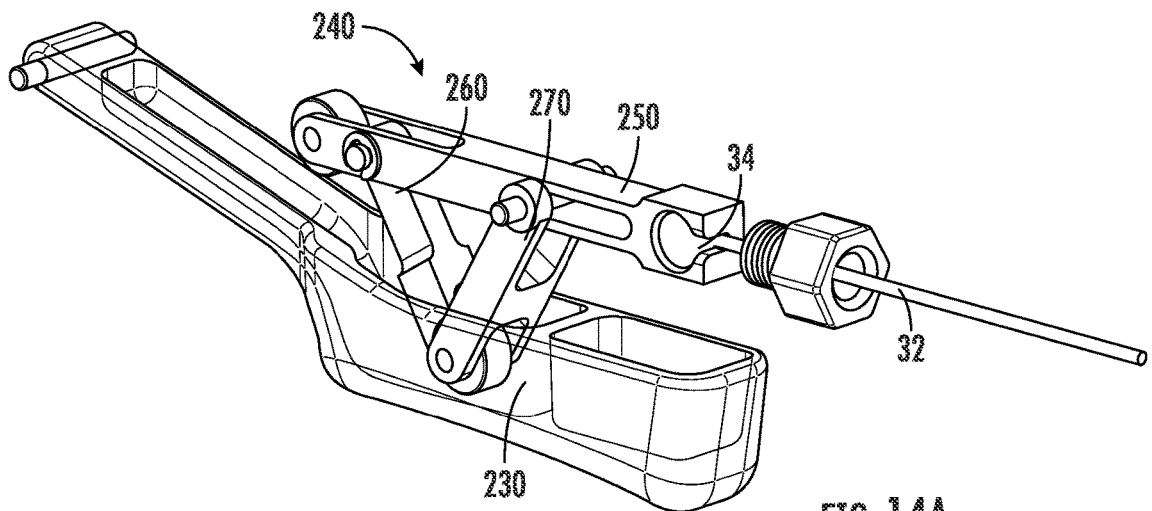
FIG. 14A illustrates a perspective view of the exemplary grip assembly of FIG. 12 with some components removed for clarity according to aspects disclosed herein.
Figure 14B:
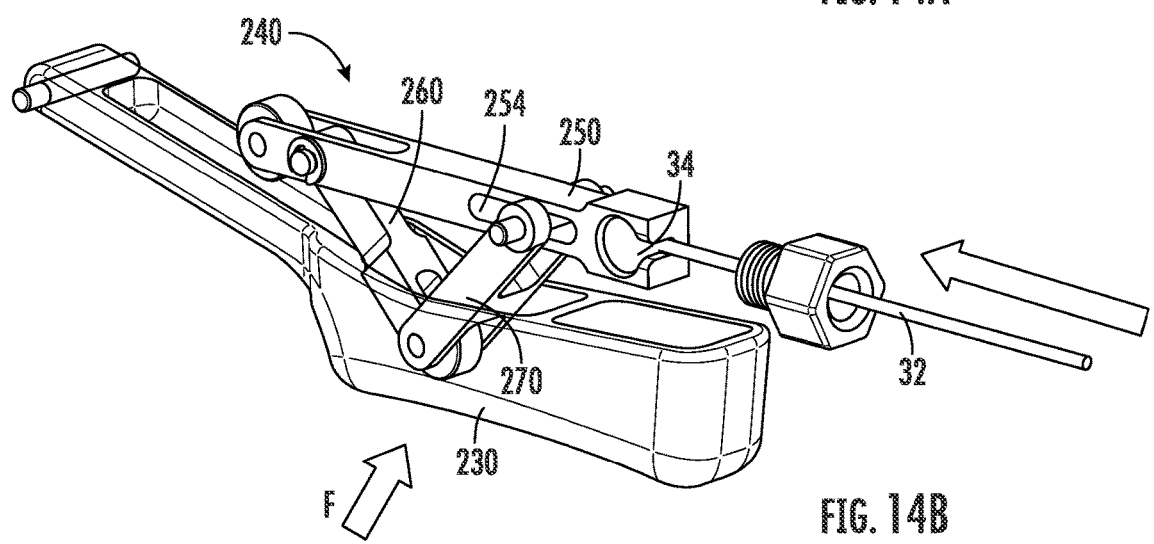
FIG. 14B illustrates a perspective view of the exemplary grip assembly of FIG. 12 with some components removed for clarity according to aspects disclosed herein.
Figure 14C:
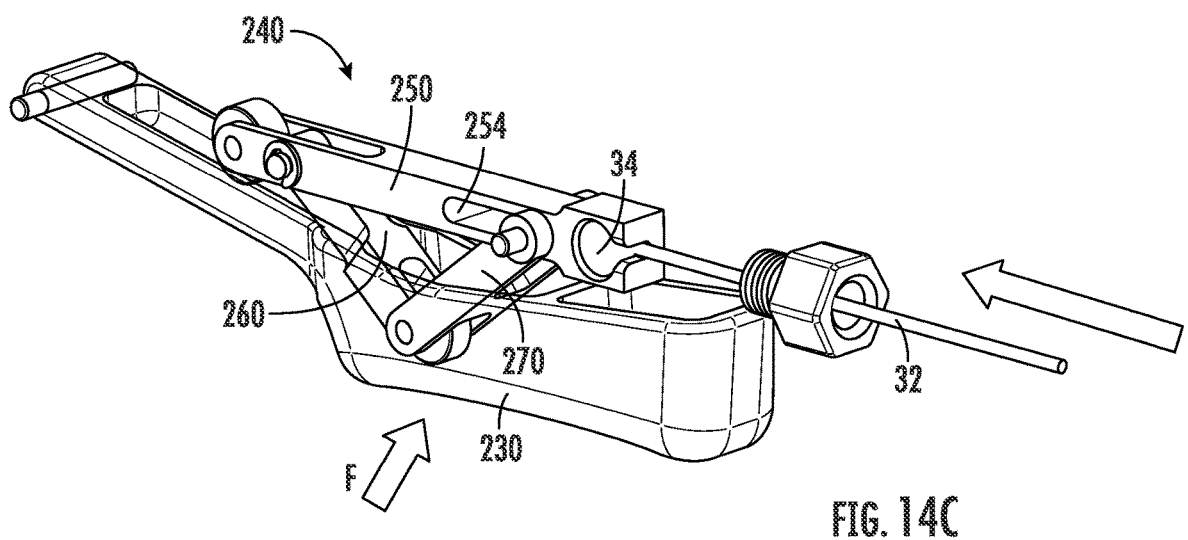
FIG. 14C illustrates a perspective view of the exemplary grip assembly of FIG. 12 with some components removed for clarity according to aspects disclosed herein.
Figure 15:
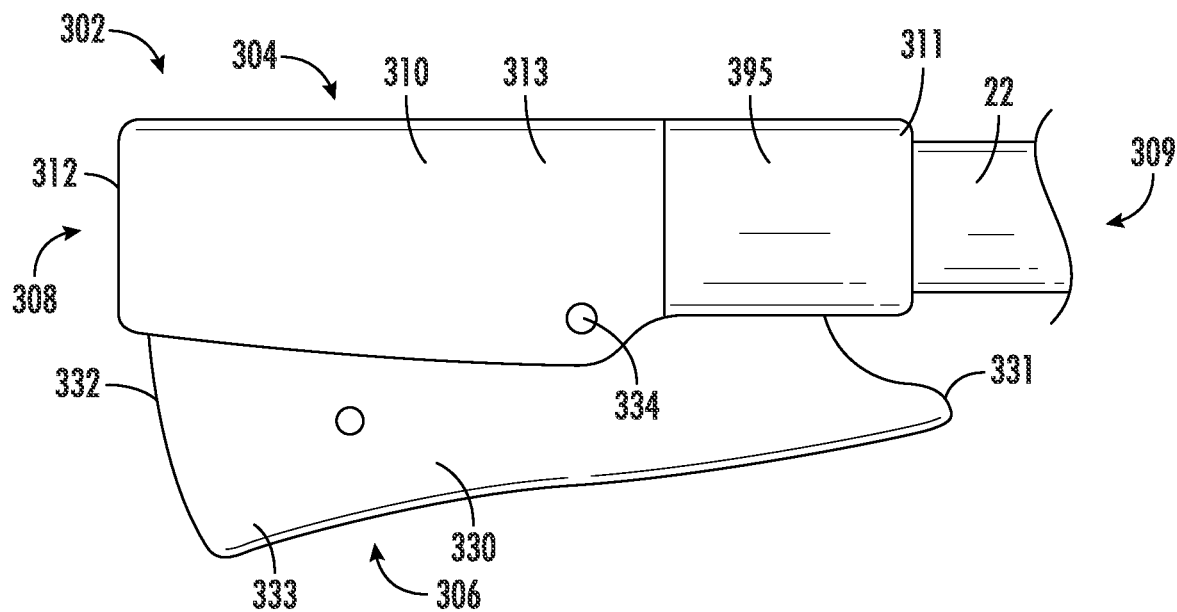
FIG. 15 illustrates a front view of another exemplary grip assembly with a lever system for a vehicle according to aspects disclosed herein.
Figure 16:
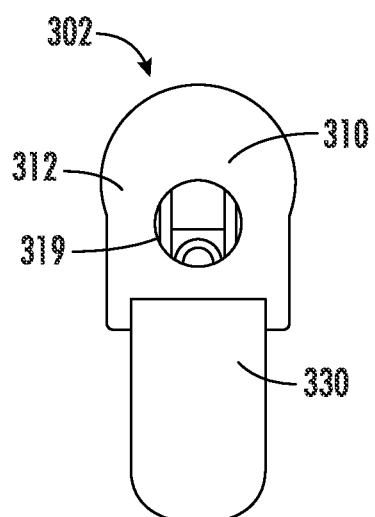
FIG. 16 illustrates an outboard side view of the exemplary grip assembly of FIG. 15 connected to a vehicle according to aspects disclosed herein.

As best illustrated in FIGS. 14A-14C, the lever 230 may be rotated toward the interior cavity 214 of the housing 210 causing the slide linkage 250 to move linearly away the opening 215 of the housing 210. In the illustrated examples in FIGS. 14A-14C, the housing 210 is removed to illustrate the linkage assembly 240 movement. In FIG. 14A, the lever 230 and linkage assembly 240 are in a normal or rest position. In FIG. 14B, the lever 230 has received a force, F, causing the lever 230 to rotate upward towards the slide linkage 250. As the lever 230 moves upwards, the roller bearing 243 begins to roll along the bottom surface 236 of the pocket 235 and the second end 262 of the bearing linkage 260 and the second end 272 of the pivot linkage 270 begin to move upward. The upward movement of second ends 262, 272 causes the slide linkage 250 to move horizontally away from the side opening 215 pulling the cable 32 into the housing 210. As the slide linkage 250 moves, the forward slot 254 moves relative to first end 271 of the pivot linkage 270. As shown in FIG. 11C, the forward slot 254 acts as a stop for the slide linkage 250 as well as a stop for the lever's upward movement, such that a length of the forward slot 254 may determine the length of horizontal movement of the slide linkage 250. In this fully extended condition, the brakes of the vehicle may be fully engaged. Additionally, the angle between the pivot linkage 270 and the bearing linkage 260 may be greater in the fully extended condition as compared to the rest condition.

FIGS. 15-20 illustrate another exemplary grip assembly 302 with a lever system 300 arranged to activate a cable braking system 10 of a vehicle 20. For the example of FIGS. 15-19, the features are referred to using similar reference numerals under the "3xx" series of reference numerals, rather than "1xx" as used in the embodiment of FIGS. 1-11C and reference numerals "2xx" as used in the embodiment of FIGS. 12-14C. Accordingly, certain features of the grip assembly 302 that were already described above with respect to grip assembly 102 of FIGS. 1-11C and grip assembly 202 of FIGS. 12-14C may be described in lesser detail, or may not be described at all. Grip assembly 302 may be connected to a brake system 10 that is arranged as a cable oriented brake system 10 with a cable 32 routed inside the handlebar 22 such that the cable 32 may not be externally visible at the intersection of the grip assembly 302. The grip assembly 302 may have a top side 304, a bottom side 306 opposite the top side 304, an outboard end 308, and an inboard end 309 opposite the outboard end 308. The grip assembly 302 may include a housing 310, a lever 330, and a linkage assembly 340, where the lever 330 may be at least partially located within an interior cavity 314 of the housing 310 and extend below a bottom edge of the housing 310. The linkage assembly 340 may include a pair of linkage members such as a bearing linkage 360 and a pivot linkage 370, where the bearing linkage 360 may be pivotally engaged at a pivot connection 346 with the pivot linkage 370. The lever 330 may be pivotally attached to the housing 310 at a lever pivot 334 that is spaced a predetermined distance from a first end 331 of the lever 330. The lever 330 may have a contact region 335 arranged on an interior surface of the lever body 333 between the lever pivot 334 and the first end 331, where the contact region 335 may contact a stop 390 to prevent rotational movement of the lever 330 toward the housing 310 when an upward force is applied to the inboard region 337 of the lever 330. The contact region 335 may comprise a boss 339 or raised surface on an interior surface of the lever body 333. In some examples, the contact region 335 may be reinforced with a coating or other surface treatment to improve its durability. The stop 390 may positioned on the inboard end 311 of the housing 310 and in some examples may be integrally formed with the housing 310. Optionally, a clamp 395 may be attached to the inboard end 311 of the housing 310 and extend around a majority of the inboard end 311 of the housing 310 to help secure housing 310 to the handlebar 22 of the vehicle 20. In some examples, the clamp 395 may be integrally formed with the housing 310. The clamp 395 may include the stop 390 that contacts the contact region 335 to prevent rotational movement of the lever 330 when a force is applied to an inboard region 337 of the lever 330, where the inboard region 337 may be the region between the lever pivot 334 and the inboard end 311. The clamp 395 may be secured to the housing 310 using a clamp fastener 396. The lever pivot 334 location may allow for a user to keep their hand on the brake lever 330 at all times to help improve the safety for a user, where an index finger and middle finger of the user may be located inboard of the lever pivot 334 on the inboard region 337 and a ring finger and pinky finger of a user may be located outward of the lever pivot 334 on the outboard region 338. Thus, when a user applies a force to the inboard region 337 of the brake lever 330 (e.g., when a user squeezes the lever 330 with an index and middle finger inboard of the lever pivot 334 between the first end 331 and the lever pivot 334), the interaction between the contact region 335 and the stop 390 prevents rotational movement of the lever 330 toward the inboard end 311 to prevent any accidental braking. To apply a braking force, a user may apply a force to the outboard region 338 of the lever 330 outboard of the lever pivot 334 (e.g., when a user squeezes the lever 330 outboard of the lever pivot 334 between the second end 332 and the lever pivot 334), the lever 330 may rotate toward the interior cavity 314 of the housing 310. As the lever 330 rotates toward the interior cavity 314, an interior bearing surface 336 of the lever 330 may push against the pivot connection 346 causing the pivot connection 346 to move upward toward an upper interior surface 317 of the housing 310 causing a first end 361 of the bearing linkage 360 to move toward an outboard end 312 of the housing 310 which pulls the cable 32 in an outboard direction to engage the brakes of the vehicle 20. In some examples, the interior bearing surface 336 of the lever 330 may have a convex or angled shape that causes the pivot connection 346 to move upward and outward when the lever 330 rotates toward the interior cavity 314. Alternatively, the lever 330 may be arranged such that the outboard region 338 includes the contact region 335 to prevent rotation toward the housing 310 when an upward force is applied to the outboard region 338 and the lever 330 is able to rotate toward the housing 310 when a force is applied to the inboard region 337 to cause the braking system to engage with a wheel 25 of a vehicle.

Figure 18:
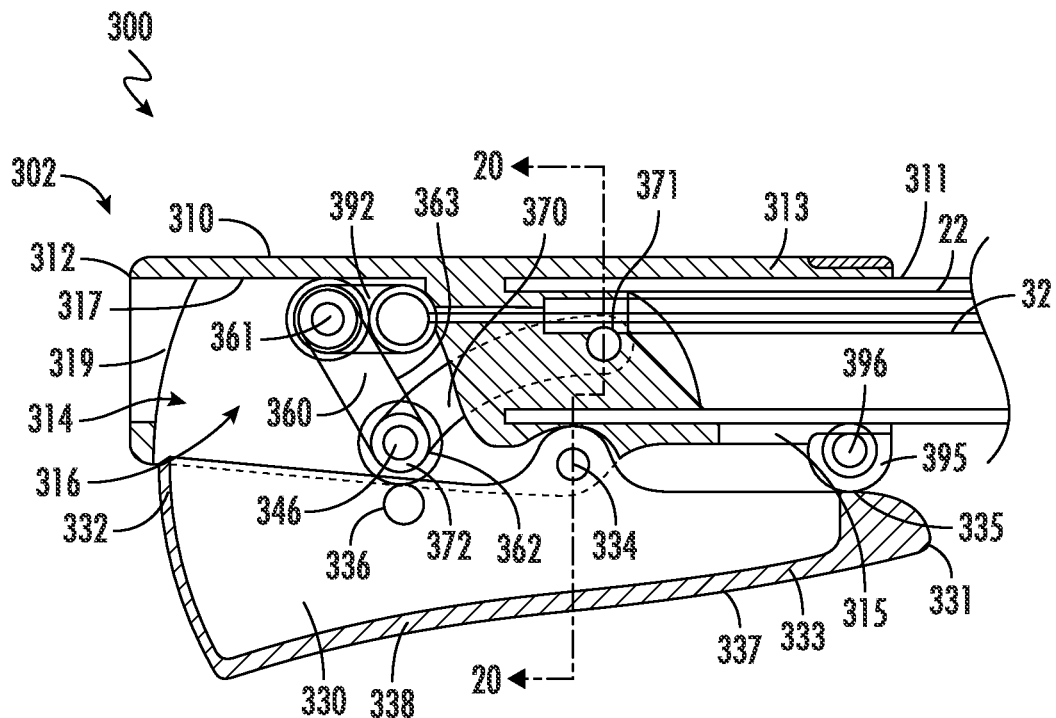
FIG. 18 illustrates a front cross-sectional view of the grip assembly of FIG. 15 along line 18-18 according to aspects disclosed herein.
Figure 19:
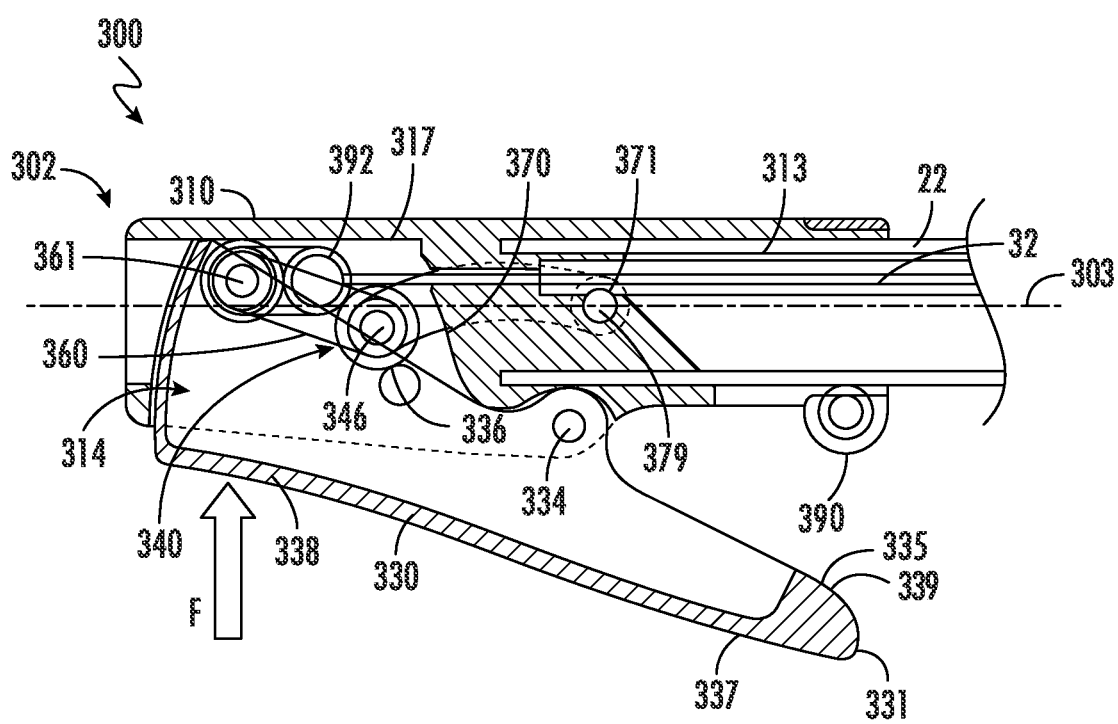
FIG. 19 illustrates a front cross-sectional view of the grip assembly of FIG. 15 according to aspects disclosed herein.
Figure 20:
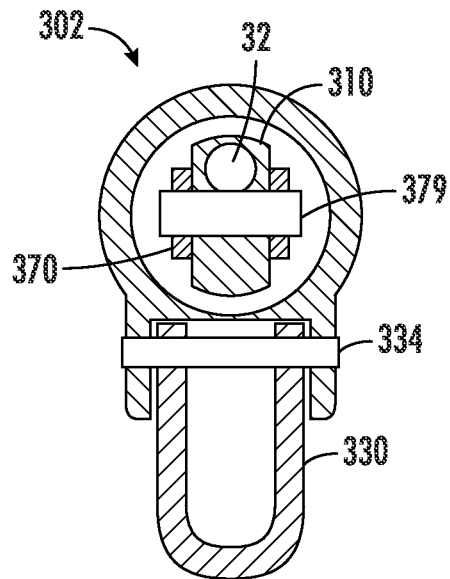
FIG. 20 illustrates a side cross-sectional view of the grip assembly of FIG. 18 along line 20-20 according to aspects disclosed herein.

As shown in FIG. 18-20, the linkage assembly 340 may include a pair of linkage members. In this example, the bearing linkage 360 may have a first end 361, a second end 362 opposite the first end 361, and bearing linkage body 363 extending between the first end 361 and the second end 362, and the pivot linkage 370 may have a first end 371, a second end 372 opposite the first end 371, and pivot linkage body 373 extending between the first end 371 and the second end 372. The pivot connection 346 may connect the second end 362 of the bearing linkage 360 and the second end 372 of the pivot linkage. The first end 371 of the pivot linkage 370 at a linkage connection 379 location may be pivotally connected to the housing 310 (or a fixed insert installed into the housing 310). The linkage connection 379 may be located inboard of the lever pivot 334. In some examples, the pivot connection 346 may include a roller bearing to allow the pivot connection 346 to roll and move smoothly along the interior bearing surface 336 of the lever 330. In some examples, the first end 361 of the bearing linkage 360 may be configured to connect directly to the cable 32 via a cable anchor 392 attached to the bearing linkage 360, or the cable 32 may be indirectly connected to the bearing linkage 360 such that movement of the first end 361 also moves the cable 32. The first end 361 of the bearing linkage 360 may also include a roller bearing connected such that the roller bearing may contact and roll along an upper interior surface 317 of the housing 310. In addition, the linkage connection 379 and pivot connection 346 may include a pinned connection that may include a clevis and/or a receiver to allow the linkages 360, 370 to freely rotate relative.

The housing 310 having a first or inboard end 311, a second or outboard end 312 opposite the inboard end 311, and a housing body 313 extending between the inboard end 311 and the outboard end 312. The inboard end 311 may have a side opening 315 that extends into an interior cavity 314, and a lower opening 316 on the housing 310 that also extends into the interior cavity 314. The side opening 315 may have a cylindrical shape that defines longitudinal axis 303 of the grip assembly 302. The side opening 315 of housing 310 may receive a portion a tubular member of the handlebar 22 to connect the grip assembly 302 to the brake system 10 of the vehicle 20. The outboard end 312 of the housing 310 may include an access opening 319 to allow access to the interior cavity 314 of the housing 310. The housing body 313 may be formed as a unitary member or may be formed from a plurality of members that may be releasably or permanently joined together. The housing 310 may have a curved upper outward facing surface opposite the lower opening 316. In addition, the housing 310 may have a curved side surfaces extending downward from the upper outward facing surface toward the lower opening 316.

The lever 330 may have a first end 331, a second end 332, and a lever body 333 that extends from the first end 331 to the second end 332. The lever body 333 may include a bottom wall with an outward facing surface that extends from a first end 331 of the lever 330 to the second end 332 of the lever 330, a pair of lever side walls extending upward from the bottom wall, and an end wall that extends between the bottom wall and the lever side walls at the second end 332. As discussed above, the lever 330 may be pivotally engaged with the housing 310 at lever pivot 334. Lever pivot 334 may be located inboard of the pivot connection 346 of the bearing linkage 360 and the pivot linkage 370.

As discussed above, the lever 330 may be pivotally attached to the housing 310 at a lever pivot 334 that is spaced a predetermined distance from an inboard end 311 of the lever 330. The predetermined distance may be approximately 50 percent of an overall length of the lever 330, where the overall length of the lever 330 is the distance from a first end 331 to the second end 332. In some examples, the predetermined distance may be within a range of 25 percent and 50 percent of the overall length of the lever 330, or within a range of 35 percent and 45 percent of the overall length of the lever 330. Optionally, the predetermined distance may be within a range of 10 percent and 90 percent of the overall length of the lever 330, or within a range of 25 percent and 75 percent of the overall length of the lever 330. In addition, the inboard end 331 of the lever 330 may be spaced further inboard (i.e., towards the handlebar) than an inboard end 311 of the housing 310. Further, the lever pivot 334 may be located less than 50 percent of a length of the housing defined as the distance from an inboard end 311 of the housing 310 to an outboard end 312 of the housing 310. A portion of the lever body 333 may be enclosed in the interior cavity 314 of the housing 310 while a portion of the lever body 333 may extend through a lower opening in the housing 310. As discussed above, the interior bearing surface 336 may have a contoured shape that may have a curved convex shape or an angled shape (relative to a longitudinal axis 303 of the housing 310) that contacts and pushes against the pivot connection 346 causing the pivot connection 346 to move upward and/or outward when the lever 330 rotates toward the interior cavity 314. The interior bearing surface 336 may be integrally formed with the lever 330. In some examples, the interior bearing surface 336 may be a separate component such as a pin connected to the lever 330 where the pin contacts the roller bearing at pivot connection 346. As the pivot connection 346 moves upward toward (or upward and outward) the upper interior surface 317, the first end 361 of the bearing linkage 360 may move away from a side opening 315 of the housing 310 pulling the cable 32 of the braking system 10, which causes the brakes to engage a wheel 25 on the vehicle 20. In addition, when the outboard region 338 of the lever 330 moves toward the housing 310, the inboard region 337 may move away from the housing 310.

Figure 17:
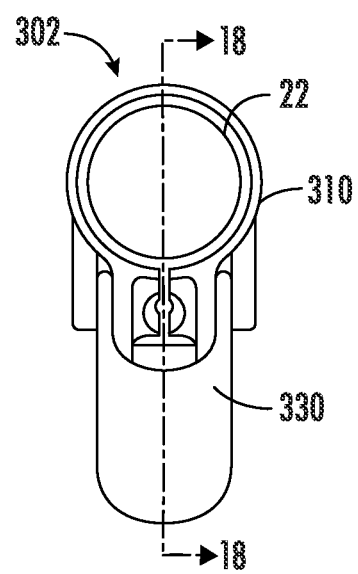
FIG. 17 illustrates an inboard side view of the exemplary grip assembly of FIG. 15 connected to a vehicle according to aspects disclosed herein.

As best illustrated in FIGS. 18-19, a force, F, applied to the lever 330 between the second end 332 and the lever pivot 334 may cause the lever 330 to rotate toward the interior cavity 314 of the housing 310. As the lever 330 rotates, the first end 361 of the bearing linkage 360 may move linearly away from the side opening 315 of the housing 310 toward an outboard end 312 of the housing 310. In FIG. 17, the lever 330 and linkage assembly 340 are in a normal or rest position. In FIG. 18, the lever 330 has received a force, F, causing the lever 330 to rotate upward toward an interior cavity 314 of the housing 310 to an engaged position. As the lever 330 moves upwards, the pivot connection 346 begins to move along the interior bearing surface 336 of the lever 330 (i.e., the second end 362 of the bearing linkage 360 and the second end 372 of the pivot linkage 370 begin to move upward or upward and outboard). The movement of pivot connection 346 causes the first end 361 of the bearing linkage 360 to move linearly away from the side opening 315 pulling the cable 32 into the housing 310. As the first end 361 of the bearing linkage 360 pulls the cable 32 into the housing 310, the brakes may engage with a wheel 25 of the vehicle 20. Once the force, F, is removed the tension from the cable 32 pulls the linkage assembly 340 back to the normal or rest position as shown in FIG. 18.

FIGS. 21-25 illustrate another exemplary grip assembly 402 with a lever system 400 arranged to activate a cable braking system 10 of a vehicle 20. For the example of FIGS. 21-25, the features are referred to using similar reference numerals under the "4xx" series of reference numerals, rather than "1xx" as used in the embodiment of FIGS. 1-11C, reference numerals "2xx" as used in the embodiment of FIGS. 12-14C, and reference numerals under "3xx" as used in the embodiment of FIGS. 15-20. Accordingly, certain features of the grip assembly 402 that were already described above with respect to grip assemblies 102, 202, and 302 may be described in lesser detail, or may not be described at all. Grip assembly 402 may be connected to a brake system 10 that is arranged as a cable oriented brake system 10 with a cable 32 routed inside or outside the handlebar 22. The grip assembly 402 may include a housing 410, a lever 430, and a bearing linkage 460, where the lever 430 may be at least partially located within an interior cavity 414 of the housing 410. The bearing linkage 460 may be pivotally engaged at a linkage pivot 447 with the lever 430. As in other examples, the lever 430 may be pivotally attached to the housing 410 at a lever pivot 434 that is spaced a predetermined distance from a first end 431 of the lever 430. The lever 430 may have a contact region 435 between the lever pivot 434 and the first end 431, where the contact region 435 may contact a stop 490 to prevent rotational movement toward an inboard end 411 of the housing 410. The stop 490 may positioned on the housing 410 and in some examples may be integrally formed with the housing 410. Optionally, a clamp 495 may be attached to the housing 410 and extend around a majority of the first end 411 of the housing 410 to help secure housing 410 to the handlebar 22 of the vehicle 20. The clamp 495 may include the stop 490 that contacts the contact region 435 to prevent rotational movement of the lever 430 when a force is applied to the inboard region 437. The lever pivot 434 location may allow for a user to keep their hand on the brake lever 430 at all times to help improve the safety for a user, where an index finger and middle finger of a user may be located inboard of the lever pivot 434 on the inboard region 437 and a ring finger and pinky finger of a user may be located outward of the lever pivot 434 on the outboard region 438. Thus, when a user applies a force to the inboard region 437 of the brake lever 430 (e.g., when a user squeezes the lever 430 with an index and middle finger inboard of the lever pivot 434 between the first end 431 and the lever pivot 434), the interaction between the contact region 435 and the stop 490 prevents rotational movement of the lever 430 to prevent any accidental braking. To apply a braking force, a user may apply a force, F, to the outboard region 438 of the lever 430 (e.g., when a user squeezes the lever 430 outboard of the lever pivot 434 between the second end 432 and the lever pivot 434), the lever 430 may rotate toward the interior cavity 414 of the housing 410. As the outboard region 438 of the lever 430 rotates toward the interior cavity 414, the first end 461 of the bearing linkage 460 moves away from the first end 411 of the housing 410 causing a brake system 10 of the vehicle 20 to engage a wheel 25 of the vehicle 20. When engaging the brakes, the first end 461 of the bearing linkage 460 may move toward an outboard end 412 of the housing 410 which pulls the cable 32 in an outboard direction.

Figure 21:
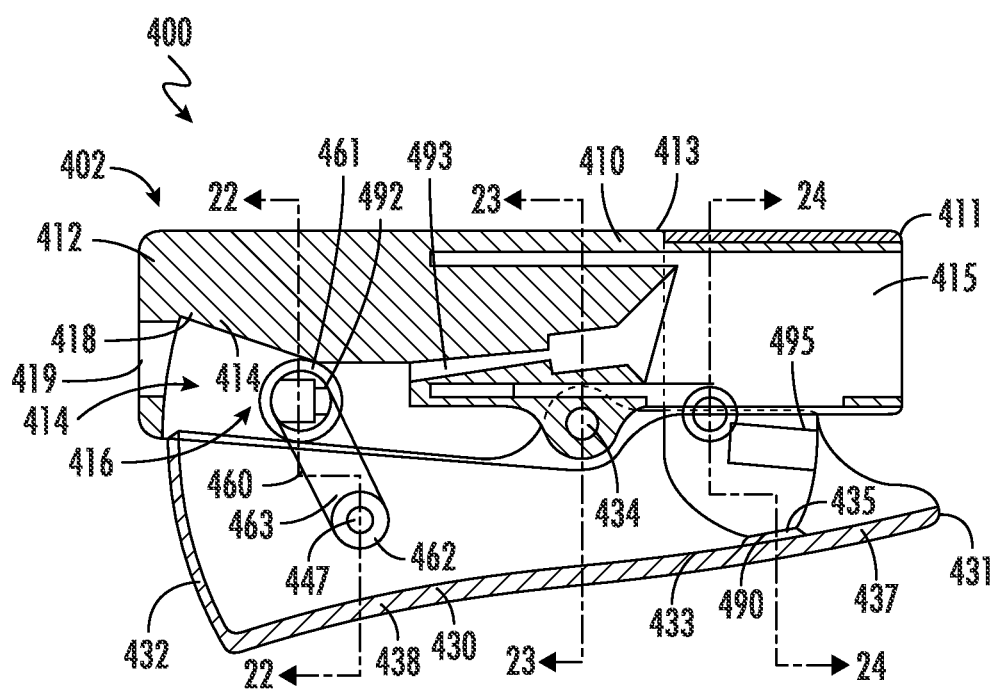
FIG. 21 illustrates a front cross-sectional view of an alternate grip assembly according to aspects disclosed herein.
Figure 22:
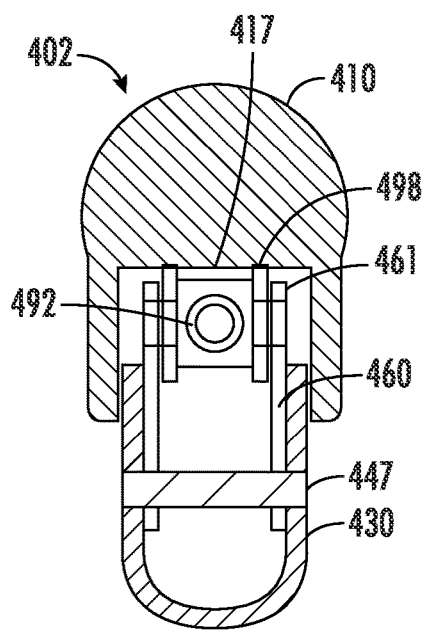
FIG. 22 illustrates a side cross-sectional view of the grip assembly of FIG. 21 along line 22-22 according to aspects disclosed herein.
Figure 23:
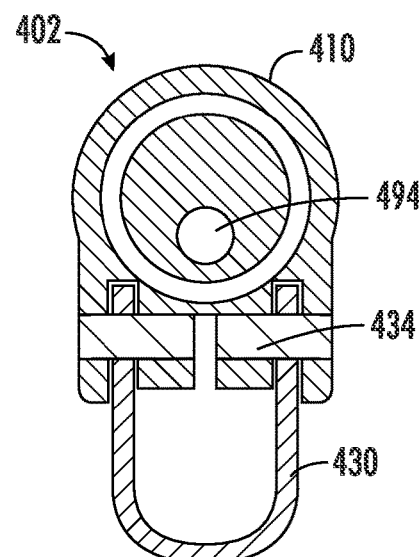
FIG. 23 illustrates a side cross-sectional view of the grip assembly of FIG. 21 along line 23-23 according to aspects disclosed herein.
Figure 24:
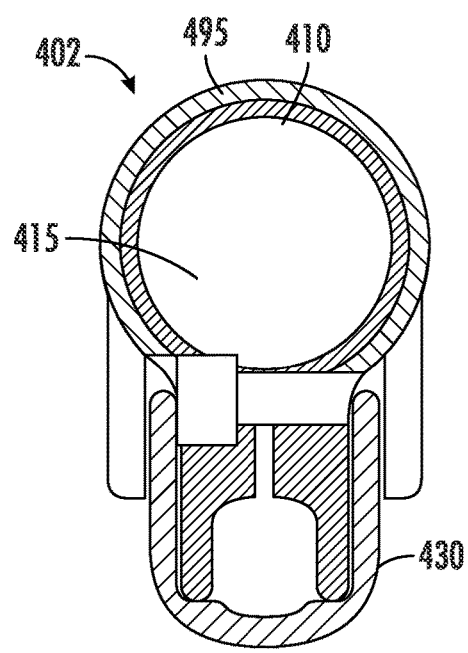
FIG. 24 illustrates a side cross-sectional view of the grip assembly of FIG. 21 along line 24-24 according to aspects disclosed herein.

As shown in FIGS. 21-25, the bearing linkage 460 may have a first end 461, a second end 462 opposite the first end 461, and bearing linkage body 463 extending between the first end 461 and the second end 462, where the first end 461 may include a roller bearing where the roller bearing may contact and roll along an interior surface 417 of the housing 410 and the second end 462 may be pivotally connected to the lever 430 at the linkage pivot 447. The linkage pivot 447 may be a pinned connection where the bearing linkage 460 may engage the lever 430. In some examples, the first end 461 of the bearing linkage 460 may be configured to connect directly to the cable 32 via a cable anchor 492, or the cable 32 may be indirectly connected to the bearing linkage 460 such that movement of the first end 461 also moves the cable 32. The interior surface 417 of the housing 410 may face the lower opening 416 of the housing 410 and be angled relative to an upper edge of the housing 410 (i.e., a plane parallel to the uppermost longitudinal edge of a top surface of the housing 410), where a distance from an outboard end 418 of the interior surface 417 may be closer to the upper edge of the housing than an inboard end of the interior surface 417. In addition, the pivotal connection between the bearing linkage 460 and the cable anchor 492 may include a pinned connection that may include a clevis and/or a receiver to allow the bearing linkage 460 and the cable anchor 492 to rotate relative to each other. As another option, a disc 498 may be arranged on either or both sides of the cable anchor 492 to allow the first end 461 of the bearing linkage 460 to roll along interior surface 417 as shown in FIG. 22.

The housing 410 having a first or inboard end 411, a second or outboard end 412 opposite the inboard end 411, and a housing body 413 extending between the inboard end 411 and the outboard end 412. The inboard end 411 may have a side opening 415 that extends into an interior cavity 414, and a lower opening 416 on the housing 410 that also extends into the interior cavity 414. The outboard end 412 of the housing 410 may include an access opening 419 to allow access to the interior cavity 414 of the housing 410. As discussed in more detail below, the housing 410 may also include an aperture 493 to route cable 32 through the housing 410 and a cable casing receiver 494 to receive the cable casing 36.

The lever 430 may have a first end 431, a second end 432, and a lever body 433 that extends from the first end 431 to the second end 432. As discussed above, the lever 430 may be pivotally engaged with the housing 410 at lever pivot 434. Lever pivot 434 may be located inboard of the linkage pivot 447 that connects the bearing linkage 460 and the lever 430. The lever 430 may be pivotally attached to the housing 410 at a lever pivot 434 that is spaced a predetermined distance from a first end 431 of the lever 430. The predetermined distance may be approximately 50 percent of an overall length of the lever 430, where the overall length of the lever 430 is the distance from a first end 431 to the second end 432. In some examples, the predetermined distance may be within a range of 25 percent and 50 percent of the overall length of the lever 430, or within a range of 35 percent and 45 percent of the overall length of the lever 430. Optionally, the predetermined distance may be within a range of 10 percent and 90 percent of the overall length of the lever 430, or within a range of 25 percent and 75 percent of the overall length of the lever 430. A portion of the lever body 433 may be enclosed in the interior cavity 414 of the housing 410 while a portion of the lever body 433 may extend through a lower opening 416 in the housing 410. As the first end 461 of the bearing linkage 460 moves upward and outward along the interior surface 417, the first end 461 of the bearing linkage 460 may pull the cable 32 of the braking system 10, which causes the brakes to engage a wheel 25 on the vehicle 20.

Figure 25:
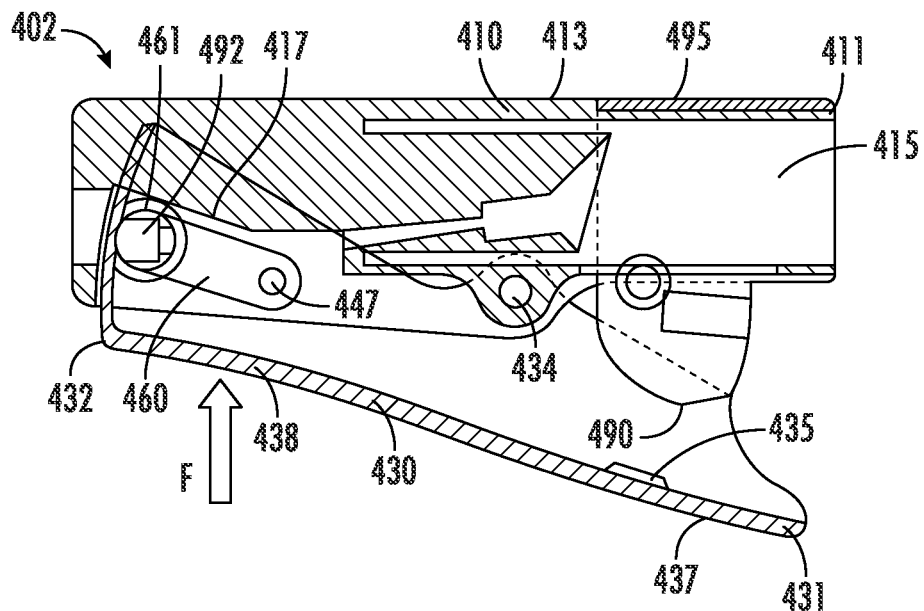
FIG. 25 illustrates a front cross-sectional view of the grip assembly of FIG. 21 according to aspects disclosed herein.

As best illustrated in FIGS. 21 and 25, a force, F, applied to the lever 430 between the second end 432 and the lever pivot 434 may cause the lever 430 to rotate toward the interior cavity 414 of the housing 410. As the lever 430 rotates, the first end 461 of the bearing linkage 460 may move linearly upward and outward away from the side opening 415 of the housing 410 toward an outboard end 412 of the housing 410. In FIG. 21, the lever 430 and bearing linkage 460 are in a normal or rest position. In FIG. 25, the lever 430 has received a force, F, causing the lever 430 to rotate upward toward an interior cavity 414 of the housing 410 to an engaged position. As the lever 430 moves upwards, the first end 461 of the bearing linkage 460 may move upward and outboard pulling the cable 32 into the housing 410. As the first end 461 of the bearing linkage 460 pulls the cable 32 into the housing 410, the brakes may engage with a wheel 25 of the vehicle 20. Once the force, F, is removed the tension from the cable 32 pulls the bearing linkage 460 back to the normal or rest position.

FIGS. 26-30 illustrate another exemplary grip assembly 502 with a lever system 500 arranged to activate a cable braking system 10 of a vehicle 20. For the example of FIGS. 26-30, the features are referred to using similar reference numerals under the "5xx" series of reference numerals, rather than "1xx" as used in the embodiment of FIGS. 1-11C, reference numerals "2xx" as used in the embodiment of FIGS. 12-14C, reference numerals under "3xx" as used in the embodiment of FIGS. 16-20, and reference numerals under "4xx" as used in the embodiment of FIGS. 21-25. Accordingly, certain features of the grip assembly 502 that were already described above with respect to grip assemblies 102, 202, 302, and 402 may be described in lesser detail, or may not be described at all. Grip assembly 502 may be connected to a brake system 10 that is arranged as a cable oriented brake system 10 with a cable 32 routed inside or outside the handlebar 22. The grip assembly 502 may include a housing 510, a lever 530, a bearing linkage 560 and a swing linkage 580, where the lever 530 may be at least partially located within an interior cavity 514 of the housing 510. The bearing linkage 560 may be pivotally connected at a first linkage pivot 547 with the lever 530 and also pivotally connected with the swing linkage 580 at a second linkage pivot 548. The swing linkage 580 may also be pivotally connected the housing 510. As in other examples, the lever 530 may be pivotally attached to the housing 510 at a lever pivot 534 that is spaced a predetermined distance from an inboard end 531 of the lever 530. The lever 530 may have a contact region 535 between the lever pivot 534 and the first end 531, where the contact region 535 may contact a stop 590 to prevent rotational movement toward the inboard end 511 of the housing 510. The stop 590 may positioned on the housing 510 and in some examples may be integrally formed with the housing 510. Optionally, a clamp 595 may be attached to the housing 510 and extend around a majority of the first end 511 of the housing 510 to help secure housing 510 to the handlebar 22 of the vehicle 20. The clamp 595 may include the stop 590 that contacts the contact region 535 to prevent rotational movement of the lever 530 when a force is applied to the inboard region 537. The lever pivot 534 location may allow for a user to keep their hand on the brake lever 530 at all times to help improve the safety for a user, where an index finger and middle finger of a user may be located inboard of the lever pivot 534 on the inboard region 537 and a ring finger and pinky finger of a user may be located outward of the lever pivot 534 on the outboard region 538. Thus, when a user applies a force to the inboard region 537 of the brake lever 530 (e.g., when a user squeezes the lever 530 with an index and middle finger inboard of the lever pivot 534 between the first end 531 and the lever pivot 534), the interaction between the contact region 535 and the stop 590 prevents rotational movement of the lever 530 to prevent any accidental braking. To apply a braking force, a user may apply a force, F, to the outboard region 538 of the lever 530 (e.g., when a user squeezes the lever 530 outboard of the lever pivot 534 between the second end 532 and the lever pivot 534), the lever 530 may rotate toward the interior cavity 514 of the housing 510. As the outboard region 538 of the lever 530 rotates toward the interior cavity 514, the second end 562 of the bearing linkage 560 may move away from the first end 511 of the housing 510 causing a brake system 10 of the vehicle 20 to engage a wheel 25 of the vehicle 20. When engaging the brakes, the second end 562 of the bearing linkage 560 may move toward an outboard end 512 of the housing 510 which pulls the cable 32 in an outboard direction.

Figure 26:
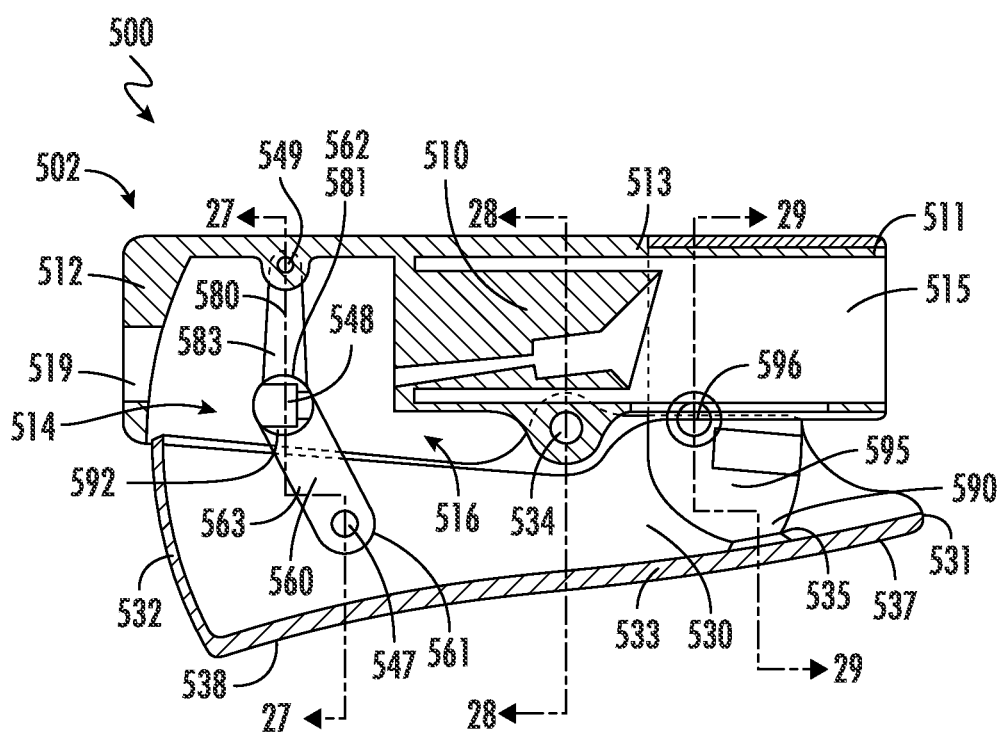
FIG. 26 illustrates a front cross-sectional view of an alternate grip assembly according to aspects disclosed herein.
Figure 27:
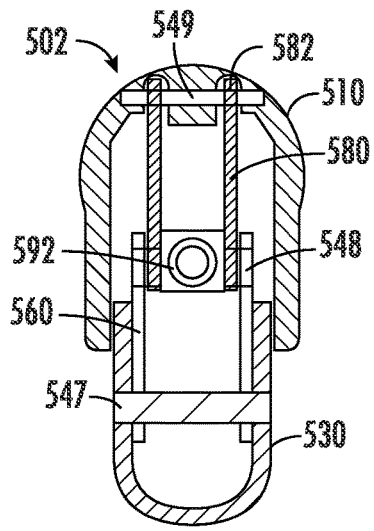
FIG. 27 illustrates a side cross-sectional view of the grip assembly of FIG. 26 along line 27-27 according to aspects disclosed herein.
Figure 28:
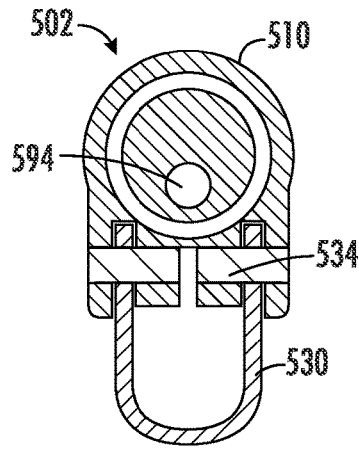
FIG. 28 illustrates a side cross-sectional view of the grip assembly of FIG. 26 along line 28-28 according to aspects disclosed herein.
Figure 29:
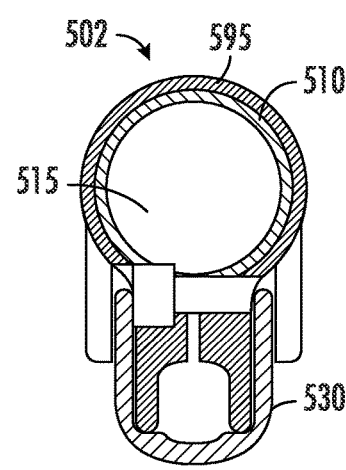
FIG. 29 illustrates a side cross-sectional view of the grip assembly of FIG. 26 along line 29-29 according to aspects disclosed herein.

As shown in FIGS. 26-30, the linkage assembly 540 may include a bearing linkage 560 and a swing linkage 580. The bearing linkage 560 may have a first end 561, a second end 562 opposite the first end 561, and bearing linkage body 563 extending between the first end 561 and the second end 562. Similarly, the swing linkage 580 may include a first end 581, a second end 582, and a swing linkage body 583. The first end 561 may be pivotally connected to the lever 530 at a first linkage pivot 547, and the second end 562 may be pivotally connected to a first end 581 of the swing linkage 580 at a second linkage pivot 548. A second end 582 of the swing linkage 580 may be pivotally connected to an interior surface within the interior cavity 514 of the housing 510. In some examples, the second end 562 of the bearing linkage 560 may be configured to connect directly to the cable 32 via a cable anchor 592, or the cable 32 may be indirectly connected to the bearing linkage 560 such that movement of the second end 562 also moves the cable 32. In addition, the linkage pivots 547, 548, 549 may be a pivotal connection that includes a pinned connection that may include a clevis and/or a receiver. For example, as shown in FIG. 27, linkage pivot 548 includes a clevis and pinned connection to allow the bearing linkage 560 and the cable anchor 592 to rotate relative to each other.

The housing 510 having a first or inboard end 511, a second or outboard end 512 opposite the inboard end 511, and a housing body 513 extending between the inboard end 511 and the outboard end 512. The inboard end 511 may have a side opening 515 that extends into an interior cavity 514, and a lower opening 516 on the housing 510 that also extends into the interior cavity 514. The outboard end 512 of the housing 510 may include an access opening 519 to allow access to the interior cavity 514 of the housing 510. As discussed in more detail below, the housing 510 may also include an aperture 593 to route cable 32 through the housing 510 and a cable casing receiver 594 to receive the cable casing 36.

The lever 530 may have a first end 531, a second end 532, and a lever body 533 that extends from the first end 531 to the second end 532. As discussed above, the lever 530 may be pivotally engaged with the housing 510 at lever pivot 534. Lever pivot 534 may be located inboard of the first linkage pivot 547 that connects the bearing linkage 560 and the lever 530 and also inboard of the second and third linkage pivots 548, 549. The lever 530 may be pivotally attached to the housing 510 at a lever pivot 534 that is spaced a predetermined distance from a first end 531 of the lever 530. The predetermined distance may be approximately 50 percent of an overall length of the lever 530, where the overall length of the lever 530 is the distance from a first end 531 to the second end 532. In some examples, the predetermined distance may be within a range of 25 percent and 50 percent of the overall length of the lever 530, or within a range of 35 percent and 45 percent of the overall length of the lever 530. Optionally, the predetermined distance may be within a range of 10 percent and 90 percent of the overall length of the lever 530, or within a range of 25 percent and 75 percent of the overall length of the lever 530. A portion of the lever body 533 may be enclosed in the interior cavity 514 of the housing 510 while a portion of the lever body 533 may extend through a lower opening 516 in the housing 510.

Figure 30:
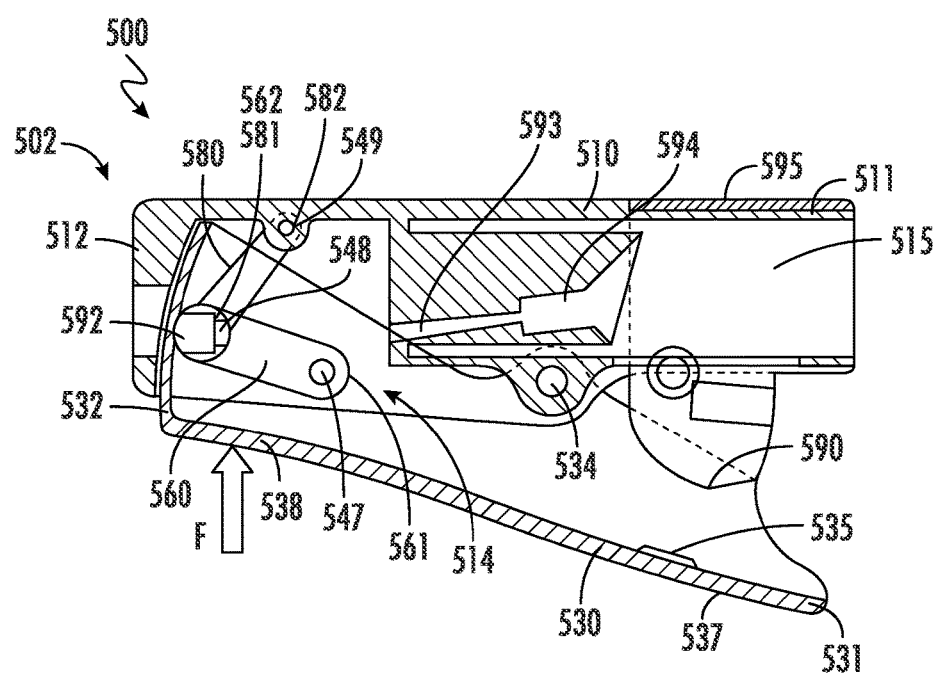
FIG. 30 illustrates a front cross-sectional view of the grip assembly of FIG. 26 according to aspects disclosed herein.

As best illustrated in FIGS. 26 and 30, a force, F, applied to the lever 530 between the second end 532 and the lever pivot 534 may cause the lever 530 to rotate toward the interior cavity 514 of the housing 510. As the lever 530 rotates, the second end 562 of the bearing linkage 560 may move upward and outboard away from the side opening 515 of the housing 510 and toward an outboard end 512 of the housing 510. In FIG. 26, the lever 530 and bearing linkage 560 are in a normal or rest position. In FIG. 30, the lever 530 has received a force, F, causing the lever 530 to rotate upward toward an interior cavity 514 of the housing 510 to an engaged position. As the lever 530 moves upwards, the second end 562 of the bearing linkage 560 may move outboard or upward and outboard pulling the cable 32 into the housing 510. As the second end 562 of the bearing linkage 560 pulls the cable 32 into the housing 510, the brakes may engage with a wheel 25 of the vehicle 20. Once the force, F, is removed the tension from the cable 32 pulls the bearing linkage 560 back to the normal or rest position.

Figure 31:
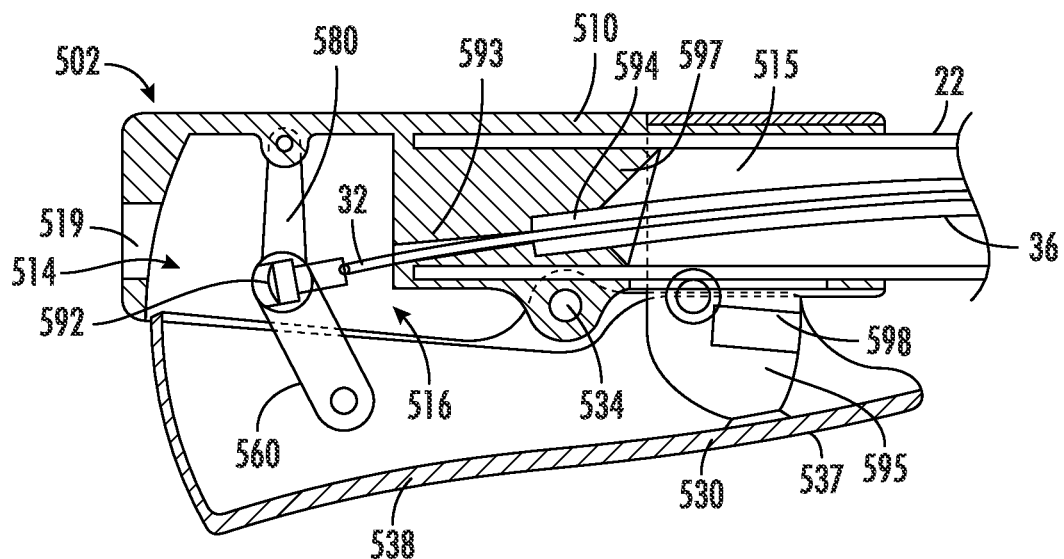
FIG. 31 illustrates a front cross-sectional view of the grip assembly of FIG. 26 according to aspects disclosed herein.
Figure 32:
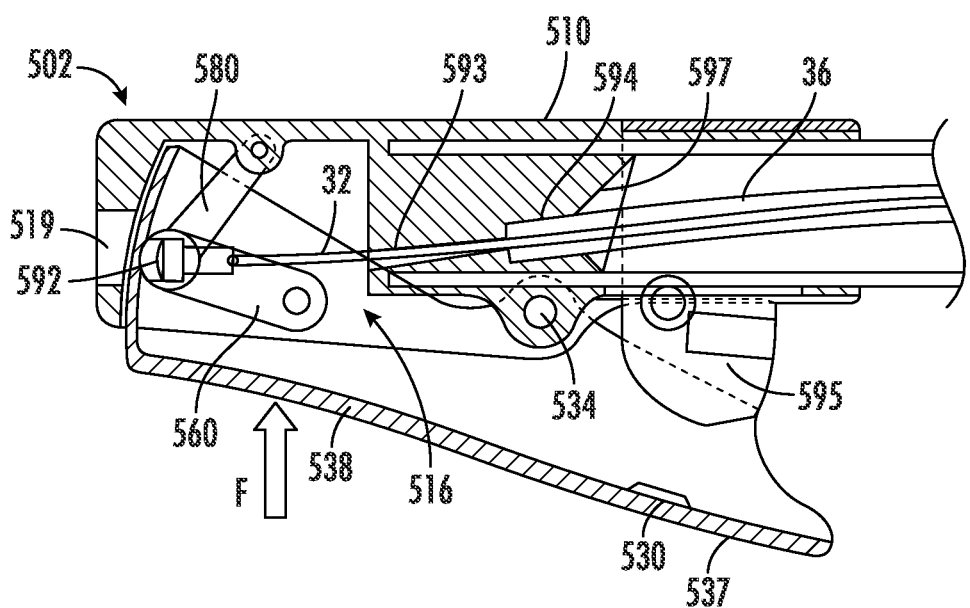
FIG. 32 illustrates a front cross-sectional view of the grip assembly of FIG. 26 according to aspects disclosed herein.

The grip assemblies 402, 502 may also include options to route the cable 32 of the brake system 10 either through the handlebars 22 of the vehicle or outside of the handlebars 22 as shown in FIGS. 31-34. While FIGS. 31-34 are illustrated using grip assembly 502, this same cable routing also applies to grip assembly 402. This flexibility of routing the cable 32 either inside or outside the handlebars allows for existing vehicles 20 to be modified with the grip assemblies 402, 502. FIGS. 31-32 illustrate an option to route the brake cable 32 through the housing 510 and into the handlebars 22 of the vehicle 20 in both a rest position in FIG. 31 and an engaged position in FIG. 32. The housing 510 may include an aperture 593 that extends through the interior cavity 514 and allows access to side opening 515. The aperture 593 may provide a path for the cable 32 to extend from the cable anchor 592 through the aperture 593 and into the handlebar 22 and then to other brake components of the brake system 10. The cable 32 may be sheathed in a cable casing 36 that may be routed through the handlebar 22 and the opening 515. The cable casing 36 is then received in a receiver 594 of the housing 510. The receiver 594 may be contiguous with aperture 593 such that the cable 32 can extend through both the aperture 593 and the receiver 594. The receiver 594 may have a larger diameter than the aperture 593 to receive the casing 36. The casing 36 may be secured into the receiver 594 using a friction fit. In addition, the receiver 594 may include a tapered region 597 at one end to help the installation of the casing 36 into the receiver 594. The tapered region 597 may form an asymmetric conical shape to help guide the casing 36 into the receiver 594 from different directions. The access opening 519 allows access to the grip assembly 502 to allow a user to feed the cable 32 through the outboard end 512 of the housing 510.

Figure 33:
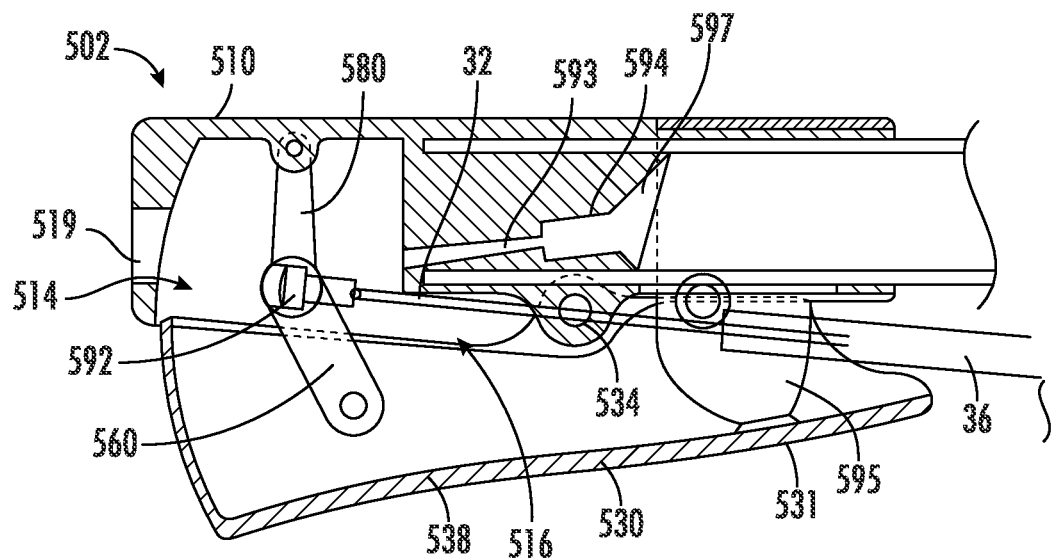
FIG. 33 illustrates a front cross-sectional view of the grip assembly of FIG. 26 according to aspects disclosed herein.
Figure 34:
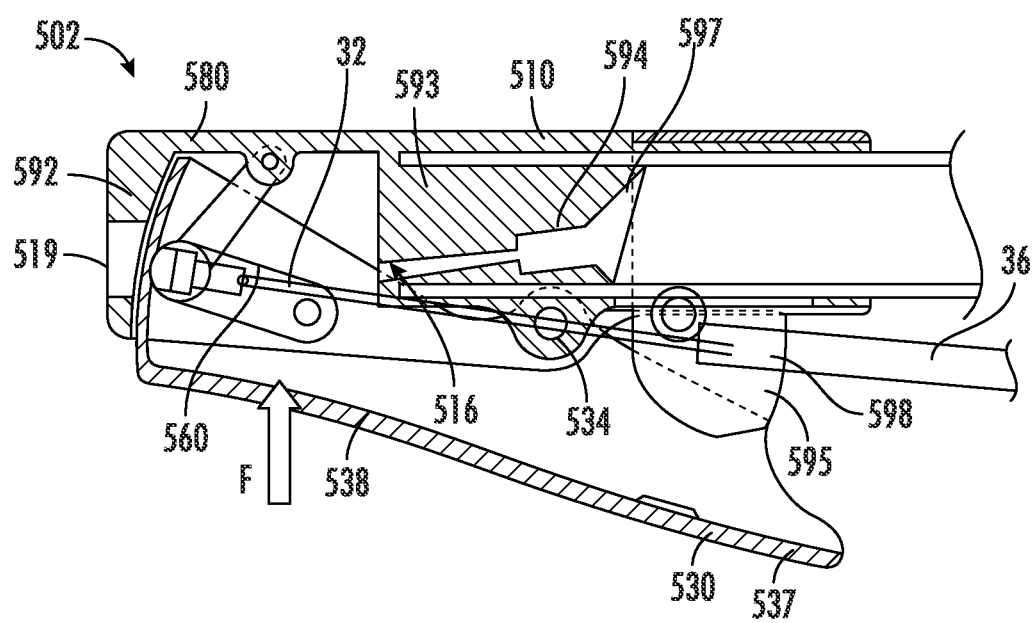
FIG. 34 illustrates a front cross-sectional view of the alternate grip assembly of FIG. 26 according to aspects disclosed herein.

FIGS. 33-34 illustrate an option to route the brake cable 32 outside of the housing 510 and outside the handlebars 22 of the vehicle 20 in both a rest position in FIG. 33 and an engaged position in FIG. 34. In FIGS. 33-34, the cable 32 may be connected to the cable anchor 592 and routed through the lower opening 516 of the housing 510. The cable 32 may also extend through an opening through a pin that connects lever 530 and the housing 510 at the lever pivot 534. In addition, the cable 32 may extend through an aperture in the clamp 595. In addition, the clamp 595 may have a receiver 598 that receives the cable casing 36. The cable casing 36 may be secured via a friction fit with the receiver 598. The cable 32 may extend from the cable anchor 592 through the lower opening 516 and outside the handlebar 22 and then to other brake components of the brake system 10.

While the exemplary grip assemblies 302, 402, 502 as illustrated are configured for a cable-type brake system, the grip assemblies 302, 402, 502 may be configured to work with a hydraulic brake system similar to that described in grip assembly 102 as described in more detail below. In a hydraulic brake system, the bearing linkage may be arranged to have an end move inboard when the outboard region of the lever is squeezed to move hydraulic fluid within a hydraulic brake system. In some examples of grip assemblies for hydraulic braking systems described herein, the distance an end of a linkage may be required to travel may be up to fifty percent less to engage a hydraulic braking system as compared to a cable driven braking system.

FIGS. 35-39 illustrate another exemplary grip assembly 602 with a lever system 600 arranged to activate a hydraulic braking system 10 of a vehicle 20. Braking system 10 in the example illustrated in FIGS. 35-39 may be a hydraulic braking system with a hydraulic line routed inside the handlebar such that the hydraulic line may not be externally visible at the intersection of the grip assembly 602. For the example of FIGS. 35-39, the features are referred to using similar reference numerals under the "6xx" series of reference numerals, rather than "1xx" as used in the embodiment of FIGS. 1-11C, reference numerals "2xx" as used in the embodiment of FIGS. 12-14C, reference numerals under "3xx" as used in the embodiment of FIGS. 16-20, reference numerals under "4xx" as used in the embodiment of FIGS. 21-25, and reference numerals under "5xx" as used in the embodiment of FIGS. 26-34. Accordingly, certain features of the grip assembly 602 that were already described above with respect to grip assemblies 102, 202, 302, 402, and 502 may be described in lesser detail, or may not be described at all. Grip assembly 602 may be connected to a brake system 10 that is arranged as a hydraulic brake system 10 with a hydraulic line 14 of the hydraulic braking system 10 routed inside the handlebar of the vehicle. The grip assembly 602 may include a housing 610, a lever 630 and a bearing linkage 660, where the lever 630 may be at least partially located within an interior cavity 614 of the housing 610. The bearing linkage 660 may be pivotally connected at a first linkage pivot 647 with the lever 630 and also pivotally connected with a piston 12 at a second linkage pivot 648. The piston 12 may be slidably engaged with a hydraulic cylinder 16 to move the hydraulic fluid within the hydraulic line to engage the braking system of the vehicle. The hydraulic cylinder 16 may be anchored within an interior cavity 614 of the housing 610. In addition, the hydraulic cylinder 16 may have a first end 24 that receives the piston 12, a second end 26 opposite the first end 24 that has a nipple or other connection feature 28 to connect to a hydraulic line of the vehicle brake system. As in the other examples, the lever 630 may be pivotally attached to the housing 610 at a lever pivot 634 that is spaced a predetermined distance from an inboard end 631 of the lever 630. The lever 630 may have a contact region 635 between the lever pivot 634 and the first end 631, where the contact region 635 may contact a stop 690 to prevent rotational movement toward the inboard end 611 of the housing 610. The stop 690 may positioned on the housing 610 and in some examples may be integrally formed with the housing 610. Optionally, a clamp 695 may be attached to the housing 610 and extend around a majority of the first end 611 of the housing 610 to help secure housing 610 to the handlebar of the vehicle. The clamp 695 may include the stop 690 that contacts the contact region 635 to prevent rotational movement of the lever 630 when a force is applied to the inboard region 637. The lever pivot 634 location may allow for a user to keep their hand on the brake lever 630 at all times to help improve the safety for a user, where an index finger and middle finger of a user may be located inboard of the lever pivot 634 on the inboard region 637 and a ring finger and pinky finger of a user may be located outward of the lever pivot 634 on the outboard region 638. Thus, when a user applies a force to the inboard region 637 of the brake lever 630 (e.g., when a user squeezes the lever 630 with an index and middle finger inboard of the lever pivot 634 between the first end 631 and the lever pivot 634), the interaction between the contact region 635 and the stop 690 prevents rotational movement of the lever 630 to prevent any accidental braking. To apply a braking force, a user may apply a force, F, to the outboard region 638 of the lever 630 (e.g., when a user squeezes the lever 630 outboard of the lever pivot 634 between the second end 632 and the lever pivot 634), the lever 630 may rotate toward the interior cavity 614 of the housing 610. As the outboard region 638 of the lever 630 rotates toward the interior cavity 614, the second end 662 of the bearing linkage 660 moves toward the first end 611 of the housing 610 causing the piston 12 to move toward the first end 611 of the housing 610 pushing the hydraulic fluid in a brake system 10 of the vehicle resulting in a brake engaging a wheel 25 of the vehicle.

Figure 35:
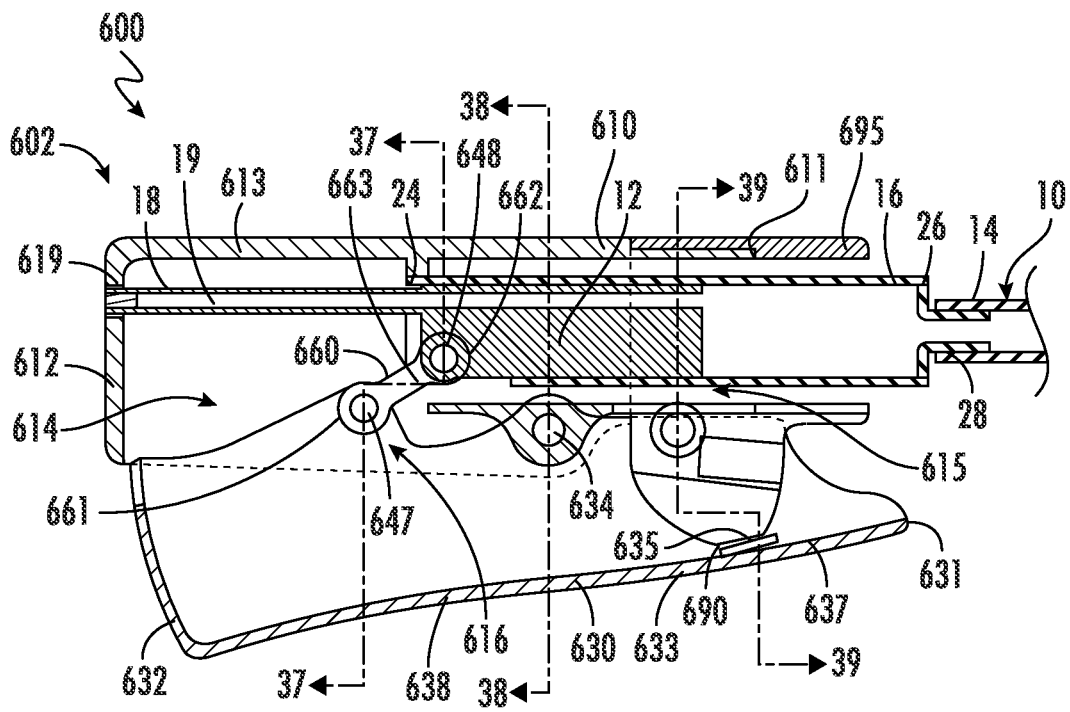
FIG. 35 illustrates a front cross-sectional view of the grip assembly according to aspects disclosed herein.
Figure 36:
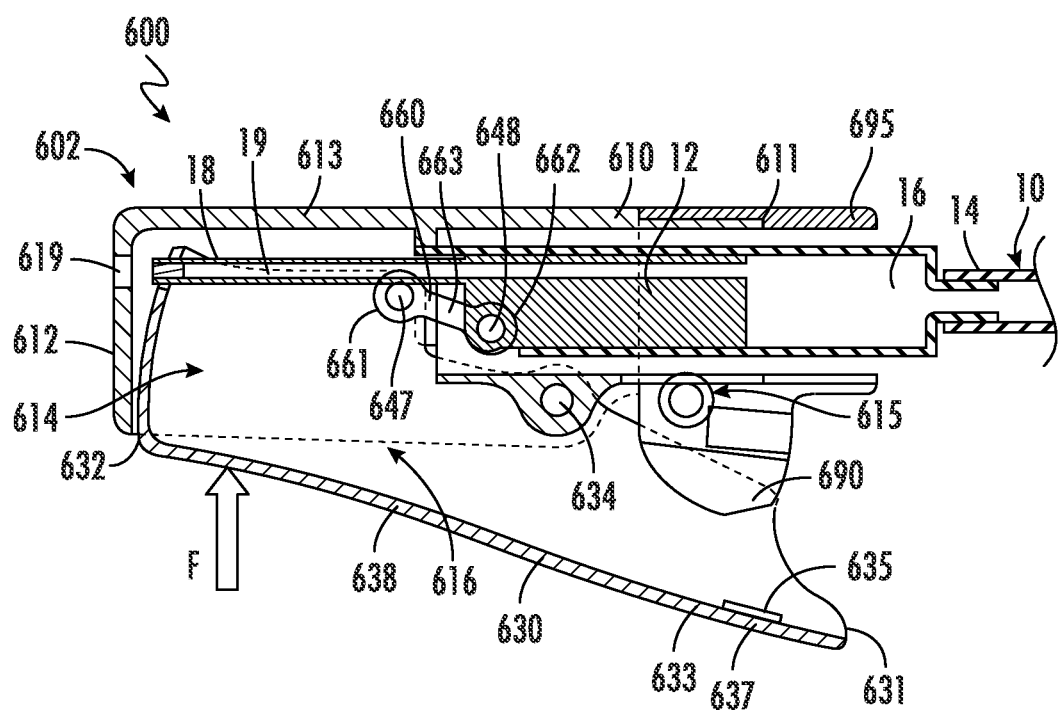
FIG. 36 illustrates a front cross-sectional view of the grip assembly of FIG. 35 according to aspects disclosed herein.
Figure 37:
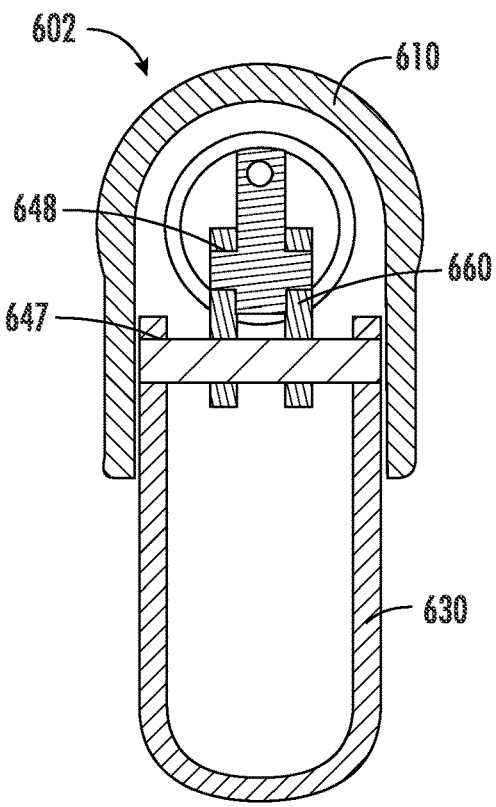
FIG. 37 illustrates a side cross-sectional view of the grip assembly of FIG. 35 along line 37-37 according to aspects disclosed herein.
Figure 38:
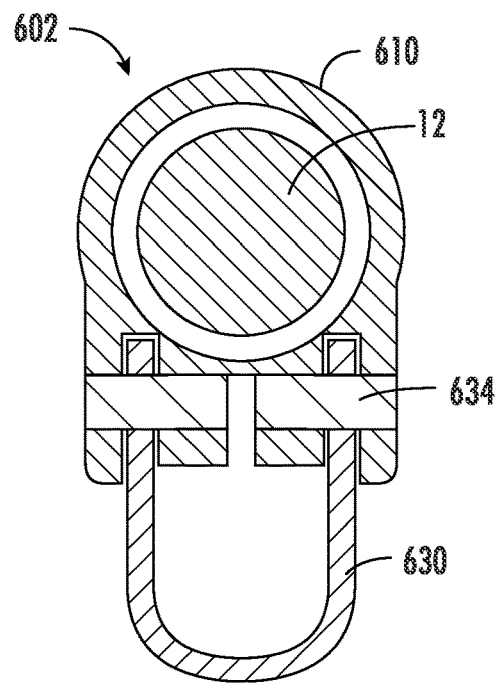
FIG. 38 illustrates a side cross-sectional view of the grip assembly of FIG. 35 along line 38-38 according to aspects disclosed herein.
Figure 39:
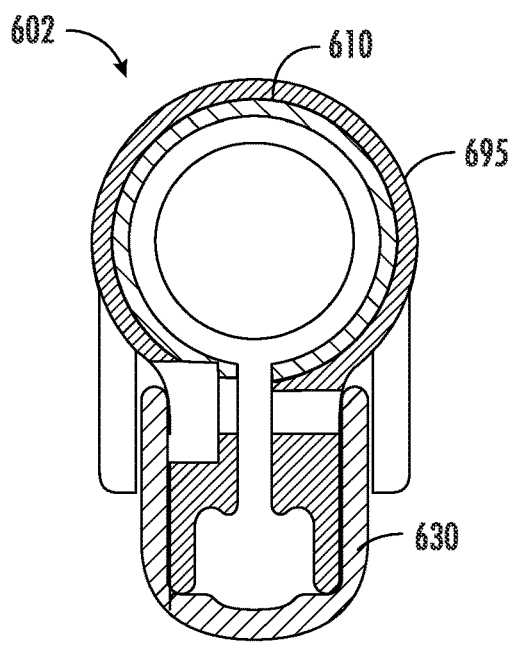
FIG. 39 illustrates a front cross-sectional view of the grip assembly of FIG. 35 along line 39-39 according to aspects disclosed herein.

As shown in FIGS. 35-39, the bearing linkage 660 may have a first end 661, a second end 662 opposite the first end 661, and bearing linkage body 663 extending between the first end 661 and the second end 662. The first end 661 may be pivotally connected to the lever 630 at a first linkage pivot 647, and the second end 662 may be pivotally connected to the piston 12 at a second linkage pivot 648. The second linkage pivot 648 may be located near a rear surface 13 of the piston 12. The movement of the second end 662 of the bearing linkage 660 is configured to also move the piston 12. In addition, the linkage pivots 647, 648 may be a pivotal connection that includes a pinned connection that may include a clevis and/or a receiver. For example, as shown in FIG. 37, linkage pivot 647 includes a clevis and pinned connection to allow the bearing linkage 660 to rotate relative to the piston 12.

The housing 610 having a first or inboard end 611, a second or outboard end 612 opposite the inboard end 611, and a housing body 613 extending between the inboard end 611 and the outboard end 612. The inboard end 611 may have a side opening 615 that extends into an interior cavity 614, and a lower opening 616 on the housing 610 that also extends into the interior cavity 614. The outboard end 612 of the housing 610 may include an access opening 619 to allow access to a bleeder stem 18 that extends from the hydraulic cylinder 16. The bleeder stem 18 may extend from a rear surface 13 of the piston and may include an internal channel 19 extends through the bleeder stem 18 and the piston 12 to be in fluid communication with the hydraulic cylinder 16. The bleeder stem 18 may include a valve near the end of the bleeder stem 18 to allow a user to perform maintenance of the hydraulic system. The bleeder stem 18 may be a rigid tube that is slidably engaged with the access opening 619 and moves with the piston 12 or in some examples, may be a flexible tube that has one end fixed to the access opening 619 but is configured to allow for movement of the piston 12 within the cylinder 16.

The lever 630 may have a first end 631, a second end 632, and a lever body 633 that extends from the first end 631 to the second end 632. As discussed above, the lever 630 may be pivotally engaged with the housing 610 at lever pivot 634. Lever pivot 634 may be located inboard of the first linkage pivot 647 that connects the bearing linkage 660 and the lever 630 and also inboard of the second linkage pivot 648. The lever 630 may be pivotally attached to the housing 610 at a lever pivot 634 that is spaced a predetermined distance from a first end 631 of the lever 630. The predetermined distance may be approximately 50 percent of an overall length of the lever 630, where the overall length of the lever 630 is the distance from a first end 631 to the second end 632. In some examples, the predetermined distance may be within a range of 25 percent and 50 percent of the overall length of the lever 630, or within a range of 35 percent and 45 percent of the overall length of the lever 630. Optionally, the predetermined distance may be within a range of 10 percent and 90 percent of the overall length of the lever 630, or within a range of 25 percent and 75 percent of the overall length of the lever 630. A portion of the lever body 633 may be enclosed in the interior cavity 614 of the housing 610 while a portion of the lever body 633 may extend through a lower opening 616 in the housing 610.

As best illustrated in FIGS. 35-36, a force, F, applied to the lever 630 in the outboard region 638 between the second end 632 and the lever pivot 634 may cause the lever 630 to rotate toward the interior cavity 614 of the housing 610. As the lever 630 rotates, the second end 662 of the bearing linkage 660 may move upward or upward and/inboard toward the side opening 615 of the housing 610 to push the piston 12 within the cylinder 16. In FIG. 35, the lever 630 and bearing linkage 660 are in a normal or rest position. In FIG. 36, the lever 630 has received a force, F, causing the lever 630 to rotate upward toward an interior cavity 614 of the housing 610 to an engaged position. As the lever 630 moves upwards, the second end 662 of the bearing linkage 660 may move upward or upward and inboard pushing the piston 12 into the cylinder 16 to push hydraulic fluid out of the cylinder 16 to engage a braking system with a wheel 25 of the vehicle. Once the force, F, is removed the pressure in the hydraulic line 14 pushes the piston 12 and the bearing linkage 660 back to the normal or rest position.

FIGS. 40-44 illustrate another exemplary grip assembly 702 with a lever system 700 arranged to activate a hydraulic braking system 10 of a vehicle 20. Braking system 10 in the example illustrated in FIGS. 40-44 may be a hydraulic braking system with a hydraulic line 14 routed outside the handlebar such that the hydraulic line is externally visible at the intersection of the grip assembly 702. For the example of FIGS. 40-44, the features are referred to using similar reference numerals under the "7xx" series of reference numerals, rather than "1xx" as used in the embodiment of FIGS. 1-11C, reference numerals "2xx" as used in the embodiment of FIGS. 12-14C, reference numerals under "3xx" as used in the embodiment of FIGS. 16-20, reference numerals under "4xx" as used in the embodiment of FIGS. 21-25, reference numerals under "5xx" as used in the embodiment of FIGS. 26-34, and reference numerals under "6xx" as used in the embodiment of FIGS. 35-39. Accordingly, certain features of the grip assembly 702 that were already described above with respect to grip assemblies 102, 202, 302, 402, 502, and 602 may be described in lesser detail, or may not be described at all. Grip assembly 702 may be connected to a brake system 10 that is arranged as a hydraulic brake system 10 with a hydraulic line 14 of the hydraulic braking system 10 routed outside the handlebar of the vehicle. The grip assembly 702 may include a housing 710, a lever 730 and a bearing linkage 760, where the lever 730 may be at least partially located within an interior cavity 714 of the housing 710. The bearing linkage 760 may be pivotally connected at a first linkage pivot 747 with the housing 710 at a first end 761 and also pivotally connected with a piston 12 at a second linkage pivot 748 at a second end 762. The piston 12 may be slidably engaged with a hydraulic cylinder 16 to move the hydraulic fluid within the hydraulic line to engage the braking system 10 of the vehicle. The hydraulic cylinder 16 may be anchored to the lever 730. In addition, the hydraulic cylinder 16 may have a first end 24 that receives the piston 12, a second end 26 opposite the first end 24 that has a nipple or other connection feature 28 to connect to a hydraulic line 14 of the vehicle brake system 10. As in the other examples, the lever 730 may be pivotally attached to the housing 710 at a lever pivot 734 that is spaced a predetermined distance from an inboard end 731 of the lever 730. The lever 730 may have a contact region 735 between the lever pivot 734 and the first end 731, where the contact region 735 may contact a stop 790 to prevent rotational movement toward the inboard end 711 of the housing 710. The stop 790 may positioned on the housing 710 and in some examples may be integrally formed with the housing 710. Optionally, a clamp 795 may be attached to the housing 710 and extend around a majority of the first end 711 of the housing 710 to help secure housing 710 to the handlebar of the vehicle. The clamp 795 may include the stop 790 that contacts the contact region 735 to prevent rotational movement of the lever 730 when a force is applied to the inboard region 737. The lever pivot 734 location may allow for a user to keep their hand on the brake lever 730 at all times to help improve the safety for a user, where an index finger and middle finger of a user may be located inboard of the lever pivot 734 on the inboard region 737 and a ring finger and pinky finger of a user may be located outward of the lever pivot 734 on the outboard region 738. Thus, when a user applies a force to the inboard region 737 of the brake lever 730 (e.g., when a user squeezes the lever 730 with an index and middle finger inboard of the lever pivot 734 between the first end 731 and the lever pivot 734), the interaction between the contact region 735 and the stop 790 prevents rotational movement of the lever 730 to prevent any accidental braking. To apply a braking force, a user may apply a force, F, to the outboard region 738 of the lever 730 (e.g., when a user squeezes the lever 730 outboard of the lever pivot 734 between the second end 732 and the lever pivot 734), the lever 730 may rotate toward the interior cavity 714 of the housing 710. As the outboard region 738 of the lever 730 rotates toward the interior cavity 714, the second end 762 of the bearing linkage 760 moves toward the first end 731 of the lever 730 causing the piston 12 to move toward the second end 26 of the cylinder 16 pushing the hydraulic fluid in hydraulic line 14 of a brake system 10 of the vehicle resulting in a brake engaging a wheel 25 of the vehicle 20.

As shown in FIGS. 40-44, the bearing linkage 760 may have a first end 761, a second end 762 opposite the first end 761, and bearing linkage body 763 extending between the first end 761 and the second end 762. The first end 761 may be pivotally connected to the housing 710 at a first linkage pivot 747, and the second end 762 may be pivotally connected to the piston 12 at a second linkage pivot 748. The second linkage pivot 748 may be located near a rear surface 13 of the piston 12. The movement of the second end 762 of the bearing linkage 760 is configured to also move the piston 12. In addition, the linkage pivots 747, 748 may be a pivotal connection that includes a pinned connection that may include a clevis and/or a receiver. For example, the second linkage pivot 748 includes a clevis and pinned connection to allow the bearing linkage 760 to rotate relative to the piston 12.

The housing 710 having a first or inboard end 711, a second or outboard end 712 opposite the inboard end 711, and a housing body 713 extending between the inboard end 711 and the outboard end 712. The inboard end 711 may have a side opening 715 that extends into an interior cavity 714, and a lower opening 716 on the housing 710 that also extends into the interior cavity 714.

The lever 730 may have a first end 731, a second end 732, and a lever body 733 that extends from the first end 731 to the second end 732. As discussed above, the lever 730 may be pivotally engaged with the housing 710 at lever pivot 734. Lever pivot 734 may be located inboard of the first linkage pivot 747 that connects the bearing linkage 760 and the housing 710 and also inboard of the second linkage pivot 748. The second linkage pivot 748 may be located inboard of the first linkage pivot 747. The lever 730 may be pivotally attached to the housing 710 at a lever pivot 734 that is spaced a predetermined distance from a first end 731 of the lever 730. The predetermined distance may be approximately 50 percent of an overall length of the lever 730, where the overall length of the lever 730 is the distance from a first end 731 to the second end 732. In some examples, the predetermined distance may be within a range of 25 percent and 50 percent of the overall length of the lever 730, or within a range of 35 percent and 45 percent of the overall length of the lever 730. Optionally, the predetermined distance may be within a range of 10 percent and 90 percent of the overall length of the lever 730, or within a range of 25 percent and 75 percent of the overall length of the lever 730. A portion of the lever body 733 may be enclosed in the interior cavity 714 of the housing 710 while a portion of the lever body 733 may extend through a lower opening 716 in the housing 710. The outboard end 732 of the lever 730 may include an access opening 739 to allow access to a bleeder stem 18 that extends from the hydraulic cylinder 16. The bleeder stem 18 may extend from the hydraulic cylinder 16 may also include an internal channel 19 that extends through the bleeder stem 18 to be in fluid communication with the hydraulic cylinder 16. The bleeder stem 18 may be a rigid tube that is an end that is fixed with access opening 739, or may be a flexible tube that has one end fixed to the access opening 739 and the other end fixed to the cylinder 16.

Figure 40:
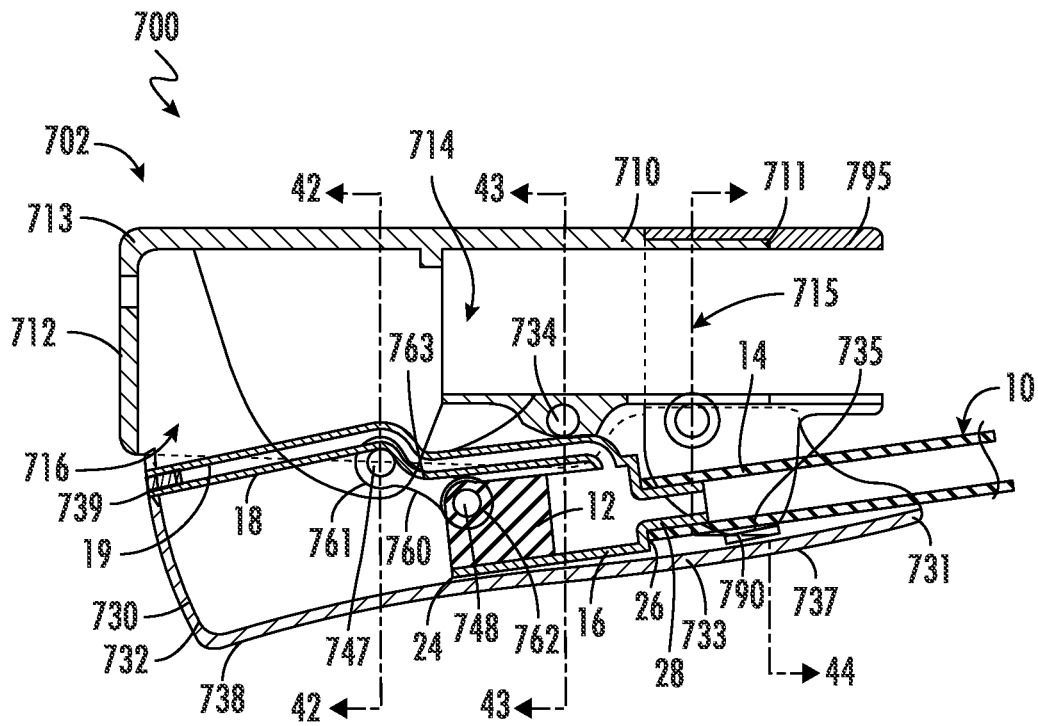
FIG. 40 illustrates a front cross-sectional view of the alternate grip assembly according to aspects disclosed herein.
Figure 41:
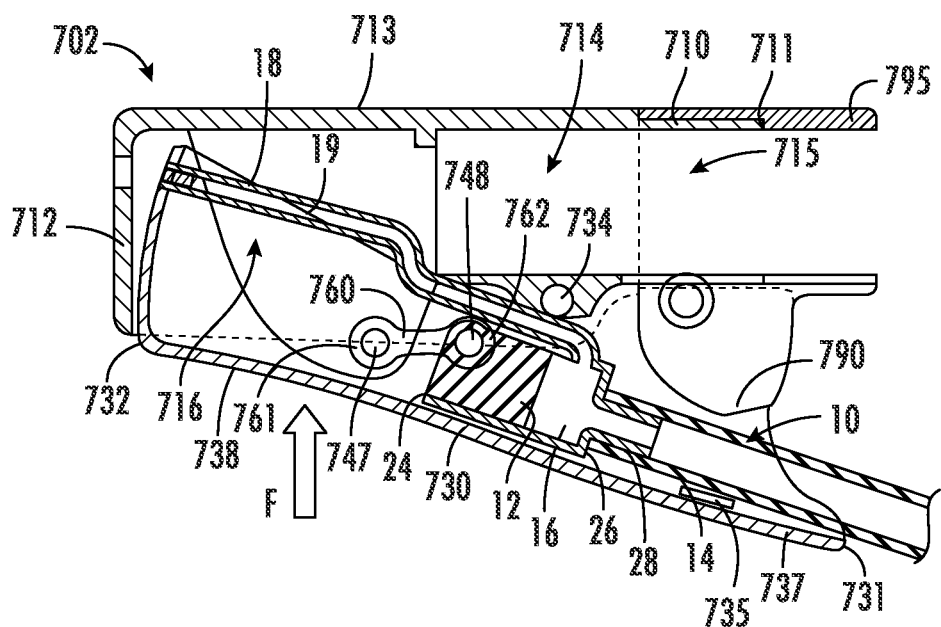
FIG. 41 illustrates a front cross-sectional view of the grip assembly of FIG. 40 according to aspects disclosed herein.
Figure 42:
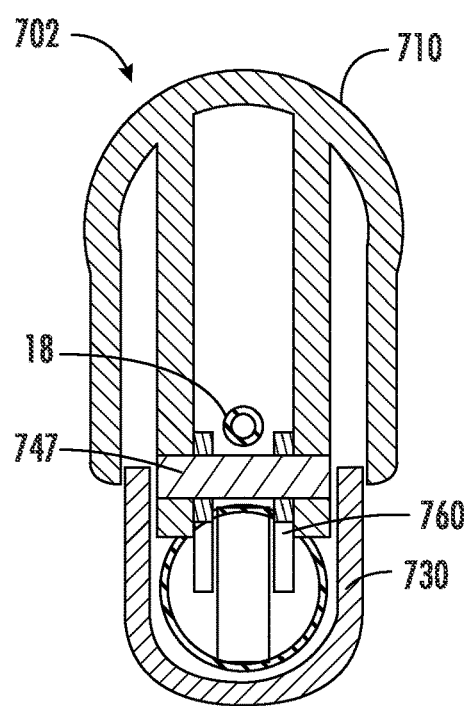
FIG. 42 illustrates a side cross-sectional view of the grip assembly of FIG. 40 along line 42-42 according to aspects disclosed herein.
Figure 43:
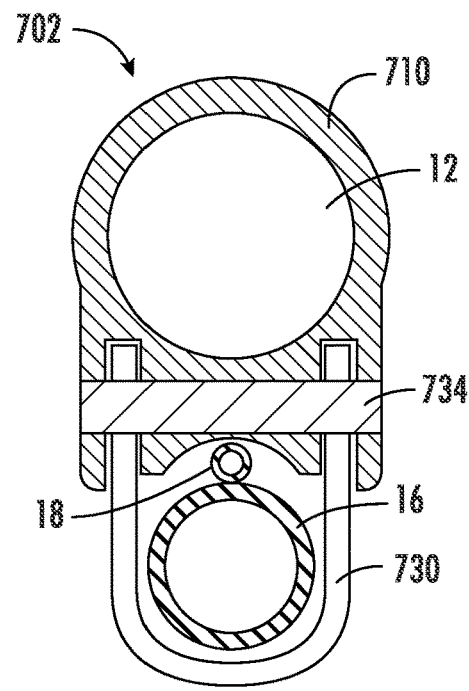
FIG. 43 illustrates a side cross-sectional view of the grip assembly of FIG. 40 along line 43-43 according to aspects disclosed herein.
Figure 44:
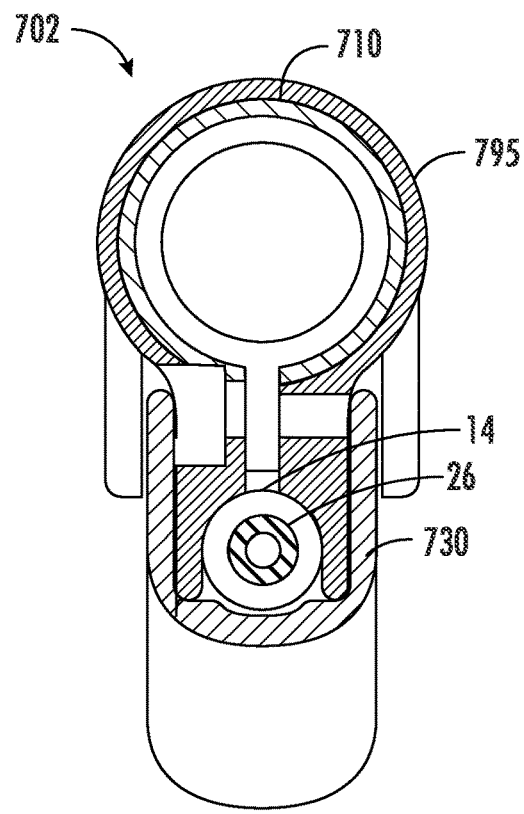
FIG. 44 illustrates a side cross-sectional view of the grip assembly of FIG. 40 along line 44-44 according to aspects disclosed herein.

As best illustrated in FIGS. 40-41, an upward oriented force, F, (i.e., a force in a direction toward the interior cavity 714 of the housing 710) applied to the lever 730 in the outboard region 738 between the second end 732 and the lever pivot 734 may cause the lever 730 to rotate toward the interior cavity 714 of the housing 710. As the lever 730 rotates, the second end 762 of the bearing linkage 760 may move upward and/or toward an inboard end 731 of the lever 730 to push the piston 12 within the cylinder 16. In FIG. 40, the lever 730 and bearing linkage 760 are in a normal or rest position. In FIG. 41, the lever 730 has received a force, F, causing the lever 730 to rotate upward toward an interior cavity 714 of the housing 710 to an engaged position. As the lever 730 moves upwards, the second end 762 of the bearing linkage 760 may move upward and/or inboard pushing the piston 12 into the cylinder 16 to push hydraulic fluid out of the cylinder 16 to engage a braking system with a wheel 25 of the vehicle 20. Once the force, F, is removed the pressure in the hydraulic line 14 pushes the piston 12 and the bearing linkage 760 back to the normal or rest position.

Figure 45:
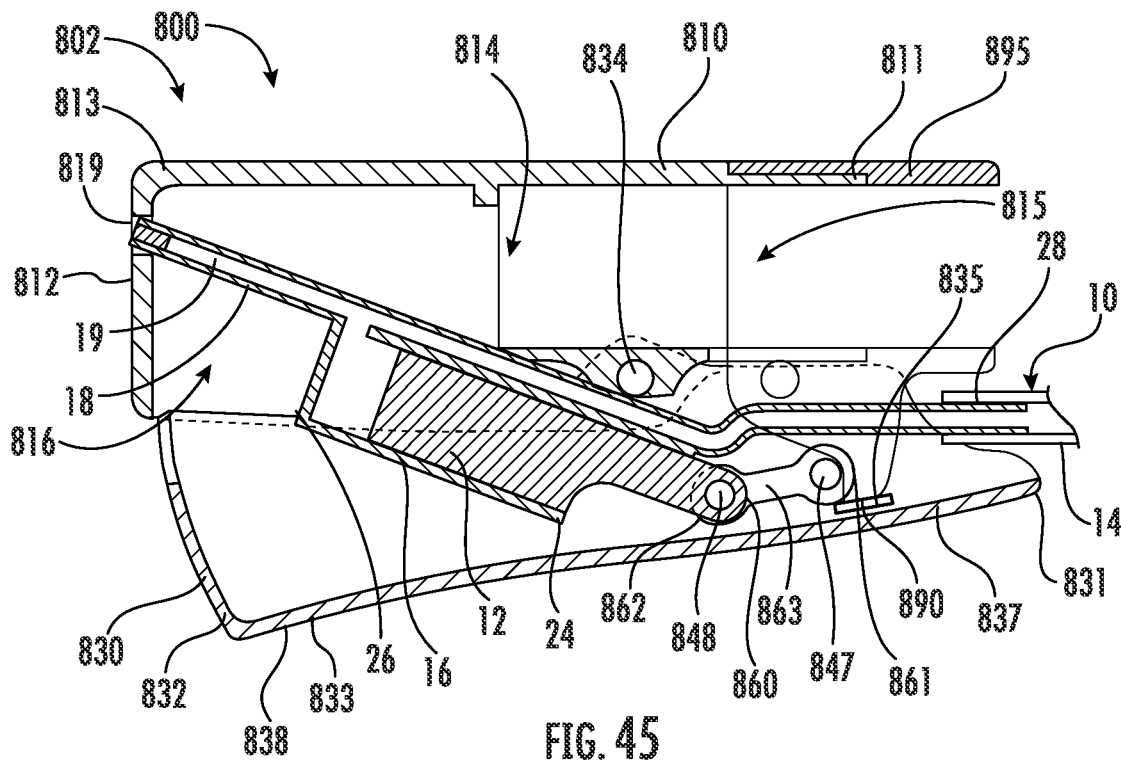
FIG. 45 illustrates a front cross-sectional view of the alternate grip assembly according to aspects disclosed herein.
Figure 46:
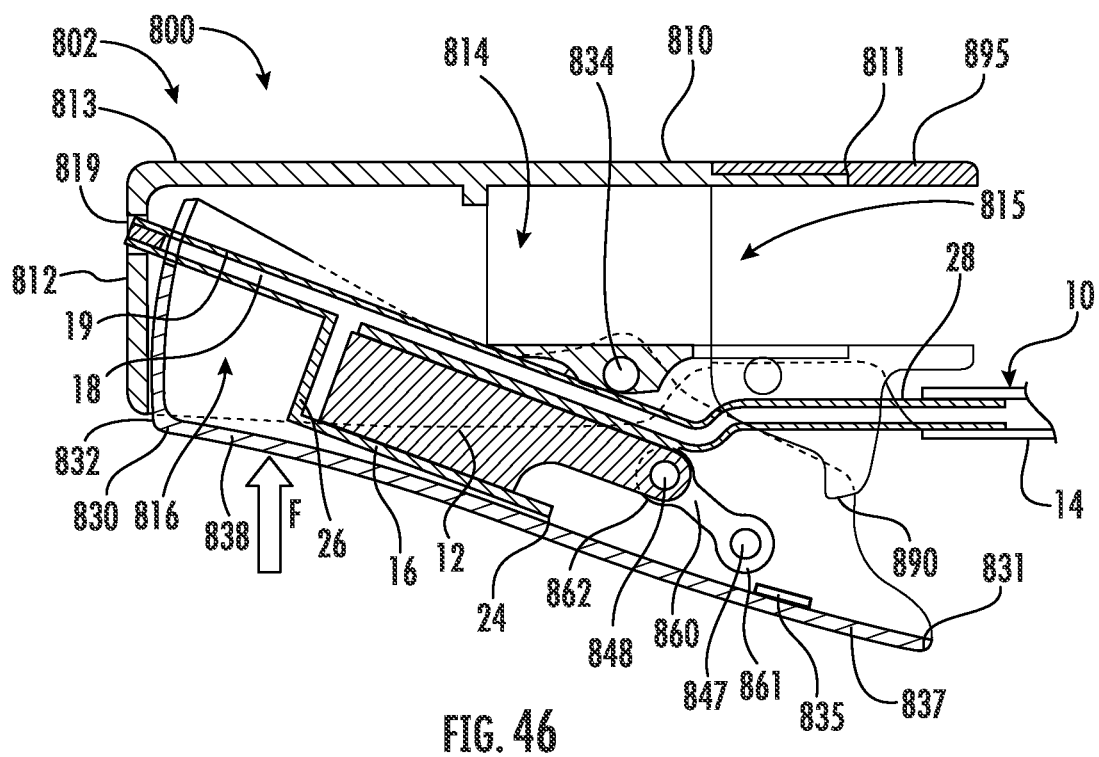
FIG. 46 illustrates a front cross-sectional view of the grip assembly of FIG. 45 according to aspects disclosed herein.

FIGS. 45-46 illustrate another exemplary grip assembly 802 with a lever system 800 arranged to activate a hydraulic braking system 10 of a vehicle. Braking system 10 in the example illustrated in FIGS. 45-46 may be a hydraulic braking system with a hydraulic line 14 routed outside the handlebar such that the hydraulic line is externally visible at the intersection of the grip assembly 802. For the example of FIGS. 45-46, the features are referred to using similar reference numerals under the "8xx" series of reference numerals, rather than "1xx" as used in the embodiment of FIGS. 1-11C, reference numerals "2xx" as used in the embodiment of FIGS. 12-14C, reference numerals under "3xx" as used in the embodiment of FIGS. 16-20, reference numerals under "4xx" as used in the embodiment of FIGS. 21-25, reference numerals under "5xx" as used in the embodiment of FIGS. 26-34, reference numerals under "6xx" as used in the embodiment of FIGS. 35-39, reference numerals under "7xx" as used in the embodiment of FIGS. 40-44. Accordingly, certain features of the grip assembly 802 that were already described above with respect to grip assemblies 102, 202, 302, 402, 502, 602, and 702 may be described in lesser detail, or may not be described at all. Grip assembly 802 may be connected to a brake system 10 that is arranged as a hydraulic brake system 10 with a hydraulic line 14 of the hydraulic braking system 10 routed outside the handlebar 22 of the vehicle 20. The grip assembly 802 may include a housing 810, a lever 830 and a bearing linkage 860, where the lever 830 may be at least partially located within an interior cavity 814 of the housing 810. The bearing linkage 860 may be pivotally connected at a first linkage pivot 847 with the lever 830 at a first end 861 and also pivotally connected with a piston 12 at a second linkage pivot 848 at a second end 862. The piston 12 may be slidably engaged with a hydraulic cylinder 16 to move the hydraulic fluid within the hydraulic line 14 to engage the braking system 10 of the vehicle. The hydraulic cylinder 16 may be anchored to the housing 810. In some examples, the hydraulic cylinder 16 may extend through the lower opening 816 of the housing 810 and extend into the lever 830. In addition, the hydraulic cylinder 16 may have a first end 24 that receives the piston 12, a second end 26 opposite the first end 24. A bleeder stem 18 may attach to an exterior of the cylinder 16 and extend outboard to connect to an access opening 819 in the outboard end 812 of the housing 810. The bleeder stem 18 may be in fluid communication with the cylinder and extend toward the inboard end 811 of the housing 810 and/or the inboard end 831 of the lever 830. The inboard end of the bleeder stem 18 may comprise a nipple or other connection feature 28 to connect to a hydraulic line 14 of the vehicle brake system 10.

As in the other examples, the lever 830 may be pivotally attached to the housing 810 at a lever pivot 834 that is spaced a predetermined distance from an inboard end 831 of the lever 830. The lever 830 may have a contact region 835 between the lever pivot 834 and the first end 831, where the contact region 835 may contact a stop 890 to prevent rotational movement toward the inboard end 811 of the housing 810. The stop 890 may positioned on the housing 810 and in some examples may be integrally formed with the housing 810. Optionally, a clamp 895 may be attached to the housing 810 and extend around a majority of the first end 811 of the housing 810 to help secure housing 810 to the handlebar of the vehicle. The clamp 895 may include the stop 890 that contacts the contact region 835 to prevent rotational movement of the lever 830 when a force is applied to the inboard region 837. The lever pivot 834 location may allow for a user to keep their hand on the brake lever 830 at all times to help improve the safety for a user, where an index finger and middle finger of a user may be located inboard of the lever pivot 834 on the inboard region 837 and a ring finger and pinky finger of a user may be located outward of the lever pivot 834 on the outboard region 838. Thus, when a user applies a force to the inboard region 837 of the brake lever 830 (e.g., when a user squeezes the lever 830 with an index and middle finger inboard of the lever pivot 834 between the first end 831 and the lever pivot 834), the interaction between the contact region 835 and the stop 890 prevents rotational movement of the lever 830 to prevent any accidental braking. To apply a braking force, a user may apply a force, F, to the outboard region 838 of the lever 830 (e.g., when a user squeezes the lever 830 outboard of the lever pivot 834 between the second end 832 and the lever pivot 834), the lever 830 may rotate toward the interior cavity 814 of the housing 810. As the outboard region 838 of the lever 830 rotates toward the interior cavity 814, the second end 862 of the bearing linkage 860 moves outboard and/or upward and toward the second end 26 of the hydraulic cylinder 16 causing the piston 12 to move toward the second end 26 of the cylinder 16 pushing the hydraulic fluid in hydraulic line 14 of a brake system 10 of the vehicle resulting in a brake engaging a wheel 25 of the vehicle 20.

As shown in FIGS. 45-46, the bearing linkage 860 may have a first end 861, a second end 862 opposite the first end 861, and bearing linkage body 863 extending between the first end 861 and the second end 862. The first end 861 may be pivotally connected the lever 830 at a first linkage pivot 847, and the second end 862 may be pivotally connected to the piston 12 at a second linkage pivot 848. The second linkage pivot 848 may be located near a rear surface 13 of the piston 12. The movement of the second end 862 of the bearing linkage 860 is configured to also move the piston 12. In addition, the linkage pivots 847, 848 may be a pivotal connection that includes a pinned connection that may include a clevis and/or a receiver. For example, the second linkage pivot 848 may include a clevis and pinned connection to allow the bearing linkage 860 to rotate relative to the piston 12.

The housing 810 having a first or inboard end 811, a second or outboard end 812 opposite the inboard end 811, and a housing body 813 extending between the inboard end 811 and the outboard end 812. The inboard end 811 may have a side opening 815 that extends into an interior cavity 814, and a lower opening 816 on the housing 810 that also extends into the interior cavity 814. The outboard end 812 of the housing 810 may include an access opening 819 to allow access to a bleeder stem 18 that extends from the hydraulic cylinder 16. The bleeder stem 18 may extend from the hydraulic cylinder 16 may also include an internal channel 19 that extends through the bleeder stem 18 to be in fluid communication with the hydraulic cylinder 16. The bleeder stem 18 may be a rigid tube that is an end that is fixed with access opening 819, or may be a flexible tube that has one end fixed to the access opening 819 and the other end fixed to the cylinder 16. The bleeder stem 18 may be arranged adjacent an upper side of the hydraulic cylinder 16 and in some cases be routed through an aperture in the clamp 895.

The lever 830 may have a first end 831, a second end 832, and a lever body 833 that extends from the first end 831 to the second end 832. As discussed above, the lever 830 may be pivotally engaged with the housing 810 at lever pivot 834. Lever pivot 834 may be located outboard of the first linkage pivot 847 that connects the bearing linkage 860 and the lever 830 and also outboard of the second linkage pivot 848. The second linkage pivot 848 may be located outboard of the first linkage pivot 847. The lever 830 may be pivotally attached to the housing 810 at a lever pivot 834 that is spaced a predetermined distance from a first end 831 of the lever 830. The predetermined distance may be approximately 50 percent of an overall length of the lever 830, where the overall length of the lever 830 is the distance from a first end 831 to the second end 832. In some examples, the predetermined distance may be within a range of 25 percent and 50 percent of the overall length of the lever 830, or within a range of 35 percent and 45 percent of the overall length of the lever 830. Optionally, the predetermined distance may be within a range of 10 percent and 90 percent of the overall length of the lever 830, or within a range of 25 percent and 75 percent of the overall length of the lever 830. A portion of the lever body 833 may be enclosed in the interior cavity 814 of the housing 810 while a portion of the lever body 833 may extend through a lower opening 816 in the housing 810.

As best illustrated in FIGS. 45-46, a force, F, applied to the lever 830 in the outboard region 838 between the second end 832 and the lever pivot 834 may cause the lever 830 to rotate toward the interior cavity 814 of the housing 810. As the lever 830 rotates, the second end 862 of the bearing linkage 860 may move upward and/or toward an outboard end 812 of the housing 810 to push the piston 12 within the cylinder 16. In FIG. 45, the lever 830 and bearing linkage 860 are in a normal or rest position. In FIG. 46, the lever 830 has received a force, F, causing the lever 830 to rotate upward toward an interior cavity 814 of the housing 810 to an engaged position. As the lever 830 moves upwards, the second end 862 of the bearing linkage 860 may move upward and/or outboard pushing the piston 12 into the cylinder 16 to push hydraulic fluid out of the cylinder 16 to engage a braking system with a wheel 25 of the vehicle 20. Once the force, F, is removed the pressure in the hydraulic line 14 pushes the piston 12 and the bearing linkage 860 back to the normal or rest position.

Figure 47:
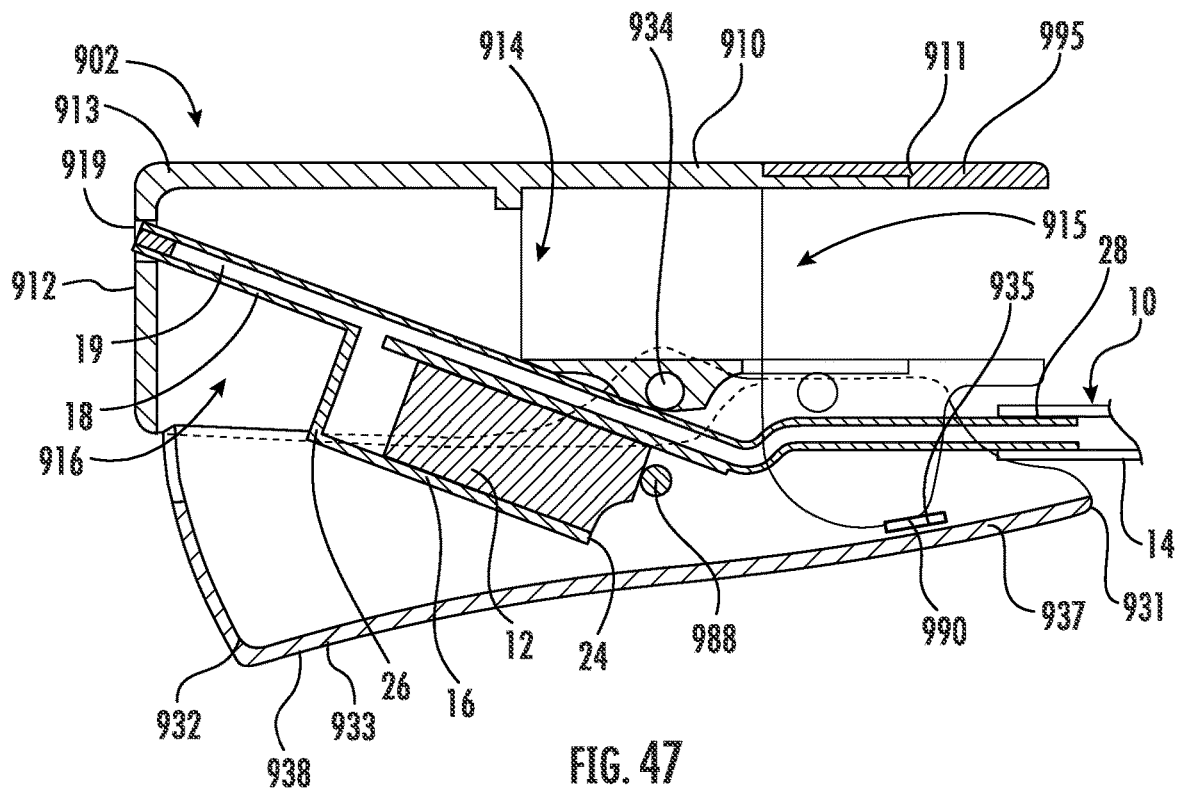
FIG. 47 illustrates a front cross-sectional view of the alternate grip assembly according to aspects disclosed herein.
Figure 48:
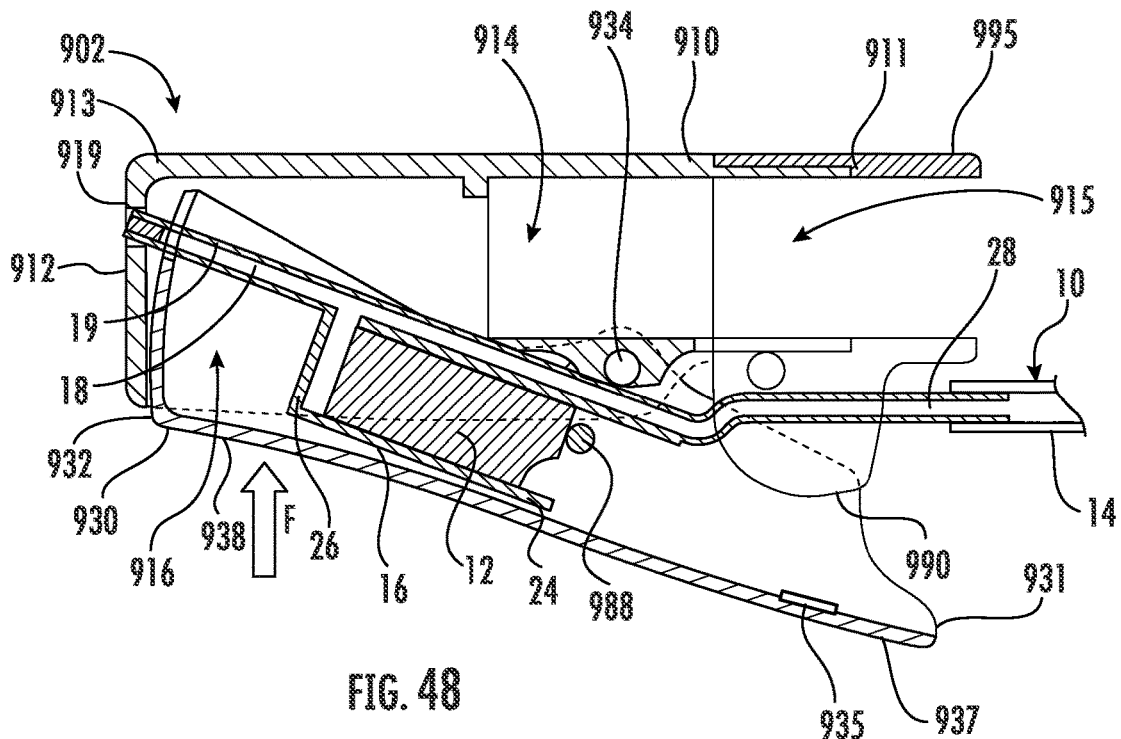
FIG. 48 illustrates a front cross-sectional view of the grip assembly of FIG. 47 according to aspects disclosed herein.

FIGS. 47-48 illustrate another exemplary grip assembly 902 arranged to activate a hydraulic braking system 10 of a vehicle. Braking system 10 in the example illustrated in FIGS. 47-48 may be a hydraulic braking system with a hydraulic line 14 routed outside the handlebars such that the hydraulic line 14 is externally visible at the intersection of the grip assembly 902 and the handlebars. For the example of FIGS. 47-48, the features are referred to using similar reference numerals under the "9xx" series of reference numerals, rather than "1xx" as used in the embodiment of FIGS. 1-11C, reference numerals "2xx" as used in the embodiment of FIGS. 12-14C, reference numerals under "3xx" as used in the embodiment of FIGS. 16-20, reference numerals under "4xx" as used in the embodiment of FIGS. 21-25, reference numerals under "5xx" as used in the embodiment of FIGS. 26-34, reference numerals under "6xx" as used in the embodiment of FIGS. 35-39, reference numerals under "7xx" as used in the embodiment of FIGS. 40-44, and reference numerals under "8xx" as used in the embodiment of FIGS. 45-46. Accordingly, certain features of the grip assembly 902 that were already described above with respect to grip assemblies 102, 202, 302, 402, 502, 602, 702, and 802 may be described in lesser detail, or may not be described at all. Grip assembly 902 may be connected to a brake system 10 that is arranged as a hydraulic brake system 10 with a hydraulic line 14 of the hydraulic braking system 10 routed outside the handlebar 22 of the vehicle 20. The grip assembly 902 may include a housing 910, and a lever 930, where the lever 930 may be at least partially located within an interior cavity 914 of the housing 910. The lever 930 may include a plunger pin 988 that is adjacent a rear surface 13 of the piston 12. The piston 12 may be slidably engaged with a hydraulic cylinder 16 to move the hydraulic fluid within the hydraulic line 14 to engage the braking system 10 of the vehicle. The hydraulic cylinder 16 may be anchored to the housing 910. In some examples, the hydraulic cylinder 16 may extend through the lower opening 916 of the housing 910 and extend into the lever 930. The piston 12 may be slidably engaged with a hydraulic cylinder 16 to move the hydraulic fluid within the hydraulic line 14 to engage the braking system 10 of the vehicle. In addition, the hydraulic cylinder 16 may have a first end 24 that receives the piston 12, a second end 26 opposite the first end 24. A bleeder stem 18 may attach to an exterior of the cylinder 16 and extend outboard to connect to an access opening 919 in the outboard end 912 of the housing 910. The bleeder stem 18 may be in fluid communication with the cylinder and extend toward the inboard end 911 of the housing 910 and/or the inboard end 931 of the lever 930. The inboard end of the bleeder stem 18 may comprise a nipple or other connection feature 28 to connect to a hydraulic line 14 of the vehicle brake system 10.

As in the other examples, the lever 930 may be pivotally attached to the housing 910 at a lever pivot 934 that is spaced a predetermined distance from an inboard end 931 of the lever 930. The lever 930 may have a contact region 935 between the lever pivot 934 and the first end 931, where the contact region 935 may contact a stop 990 to prevent rotational movement toward the inboard end 911 of the housing 910. The stop 990 may positioned on the housing 910 and in some examples may be integrally formed with the housing 910. Optionally, a clamp 995 may be attached to the housing 910 and extend around a majority of the first end 911 of the housing 910 to help secure housing 910 to the handlebar of the vehicle. The clamp 995 may include the stop 990 that contacts the contact region 935 to prevent rotational movement of the lever 930 when a force is applied to the inboard region 937. The lever pivot 934 location may allow for a user to keep their hand on the brake lever 930 at all times to help improve the safety for a user, where an index finger and middle finger of a user may be located inboard of the lever pivot 934 on the inboard region 937 and a ring finger and pinky finger of a user may be located outward of the lever pivot 934 on the outboard region 938. Thus, when a user applies a force to the inboard region 937 of the brake lever 930 (e.g., when a user squeezes the lever 930 with an index and middle finger inboard of the lever pivot 934 between the first end 931 and the lever pivot 934), the interaction between the contact region 935 and the stop 990 prevents rotational movement of the lever 930 to prevent any accidental braking. To apply a braking force, a user may apply a force, F, to the outboard region 938 of the lever 930 (e.g., when a user squeezes the lever 930 outboard of the lever pivot 934 between the second end 932 and the lever pivot 934), the lever 930 may rotate toward the interior cavity 914 of the housing 910. As the outboard region 938 of the lever 930 rotates toward the interior cavity 914, the plunger pin 988 may move outboard and/or upward toward the second end 26 of the hydraulic cylinder 16 causing the piston 12 to move toward the second end 26 of the cylinder 16 pushing the hydraulic fluid in hydraulic line 14 of a brake system 10 of the vehicle resulting in a brake engaging a wheel 25 of the vehicle 20.

As shown in FIGS. 47-48, the lever 930 may have a first end 931, a second end 932, and a lever body 933 that extends from the first end 931 to the second end 932. As discussed above, the lever 930 may be pivotally engaged with the housing 910 at lever pivot 934. The lever 930 may be pivotally attached to the housing 910 at a lever pivot 934 that is spaced a predetermined distance from a first end 931 of the lever 930. The predetermined distance may be approximately 50 percent of an overall length of the lever 930, where the overall length of the lever 930 is the distance from a first end 931 to the second end 932. In some examples, the predetermined distance may be within a range of 25 percent and 50 percent of the overall length of the lever 930, or within a range of 35 percent and 45 percent of the overall length of the lever 930. Optionally, the predetermined distance may be within a range of 10 percent and 90 percent of the overall length of the lever 930, or within a range of 25 percent and 75 percent of the overall length of the lever 930. A portion of the lever body 933 may be enclosed in the interior cavity 914 of the housing 910 while a portion of the lever body 933 may extend through a lower opening 916 in the housing 910. The plunger pin 988 may be connected to the lever 930 or integrally formed with the lever 930. The plunger pin 988 may be located outboard of the lever pivot 934 and in some cases, the plunger pin 988 may also be located below the lever pivot 934 (i.e., in a direction away from the lower opening 916 of the housing 910 toward the lever 930).

The housing 910 having a first or inboard end 911, a second or outboard end 912 opposite the inboard end 911, and a housing body 913 extending between the inboard end 911 and the outboard end 912. The inboard end 911 may have a side opening 915 that extends into an interior cavity 914, and a lower opening 916 on the housing 910 that also extends into the interior cavity 914. The outboard end 912 of the housing 910 may include an access opening 919 to allow access to a bleeder stem 18 that extends from the hydraulic cylinder 16. The bleeder stem 18 may extend from the hydraulic cylinder 16 may also include an internal channel 19 that extends through the bleeder stem 18 to be in fluid communication with the hydraulic cylinder 16. The bleeder stem 18 may be a rigid tube that is an end that is fixed with access opening 919, or may be a flexible tube that has one end fixed to the access opening 919 and the other end fixed to the cylinder 16. The bleeder stem 18 may be arranged adjacent an upper side of the hydraulic cylinder 16 and in some cases be routed through an aperture in the clamp 995.

As best illustrated in FIGS. 47-48, a force, F, applied to the lever 930 in the outboard region 938 between the second end 932 and the lever pivot 934 may cause the lever 930 to rotate toward the interior cavity 914 of the housing 910. As the lever 930 rotates, the plunger pin 988 may move upward and/or outboard to push the piston 12 within the cylinder 16. In FIG. 47, the lever 930 may be in a normal or rest position. In FIG. 48, the lever 930 has received a force, F, causing the lever 930 to rotate upward toward an interior cavity 914 of the housing 910 to an engaged position. As the lever 930 moves upwards, the plunger pin 988 may rotate with the lever 930 to contact and push the piston 12 into the cylinder 16 to push hydraulic fluid out of the cylinder 16 to engage a braking system with a wheel 25 of the vehicle 20. Once the force, F, is removed the pressure in the hydraulic line 14 pushes the piston 12 which in turn pushes back on the plunger pin 988 to move the lever 930 back to the normal or rest position.

Figure 49:
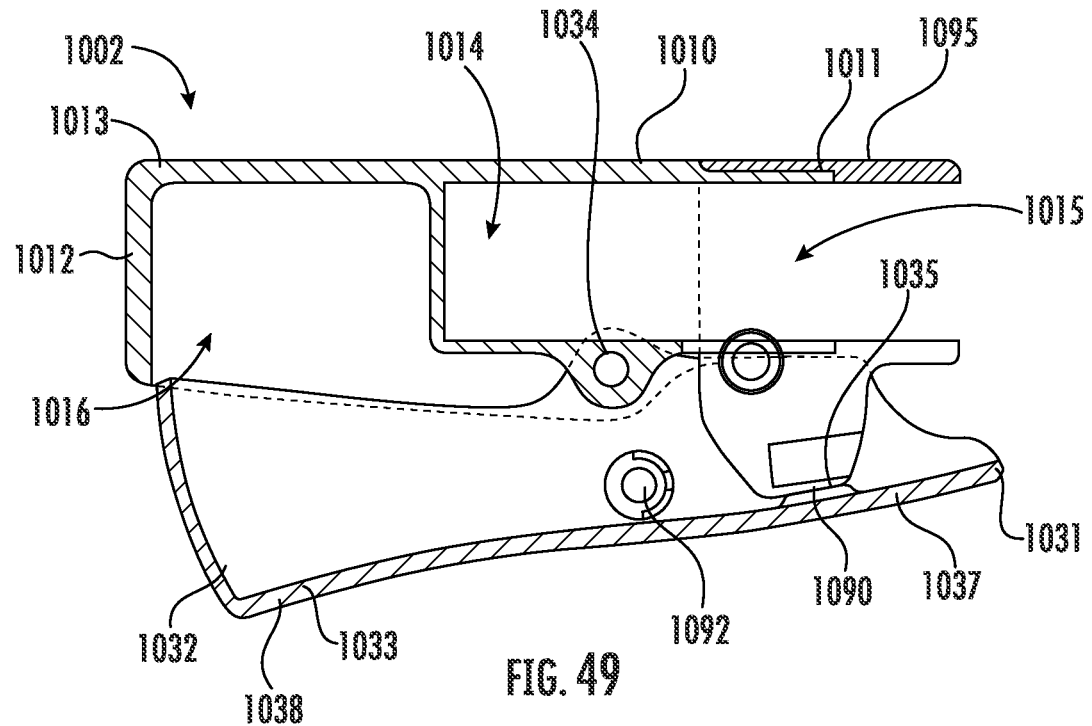
FIG. 49 illustrates a front cross-sectional view of the alternate grip assembly according to aspects disclosed herein.
Figure 50:
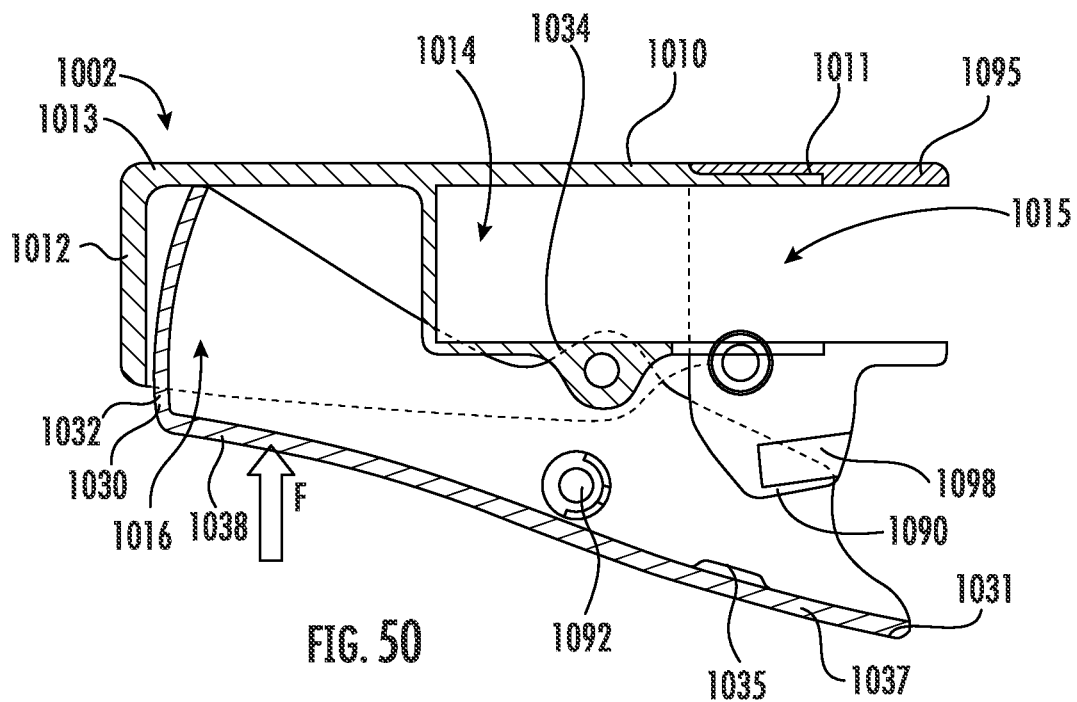
FIG. 50 illustrates a front cross-sectional view of the grip assembly of FIG. 47 according to aspects disclosed herein.

FIGS. 49-50 illustrate another exemplary grip assembly 1002 with arranged to activate a cable braking system 10 of a vehicle 20. For the example of FIGS. 49-50, the features are referred to using similar reference numerals under the "10xx" series of reference numerals, rather than "1xx" as used in the embodiment of FIGS. 1-11C, reference numerals "2xx" as used in the embodiment of FIGS. 12-14C, reference numerals under "3xx" as used in the embodiment of FIGS. 16-20, reference numerals under "4xx" as used in the embodiment of FIGS. 21-25, reference numerals under "5xx" as used in the embodiment of FIGS. 26-34, reference numerals under "6xx" as used in the embodiment of FIGS. 35-39, reference numerals under "7xx" as used in the embodiment of FIGS. 40-44, reference numerals under "8xx" as used in the embodiment of FIGS. 45-46, and reference numerals under "9xx" as used in the embodiment of FIGS. 47-48. Accordingly, certain features of the grip assembly 1002 that were already described above with respect to grip assemblies 102, 202, 302, 402, 502, 602, 702, 802, and 902 may be described in lesser detail, or may not be described at all. Grip assembly 1002 may be connected to a brake system 10 that is arranged as a cable oriented brake system 10 with a cable 32 routed inside or outside the handlebar 22. The grip assembly 1002 may include a housing 1010, and a lever 1030, where the lever 1030 may be at least partially located within an interior cavity 1014 of the housing 1010. The lever 1030 may include a cable anchor 1092 that is mounted on an internal surface of the lever 1030. The cable anchor 1092 may secure the cable (not shown in FIGS. 49-50) of the brake system. As the lever 1030 rotates, the cable anchor 1092 rotates in an outboard direction and pulls the cable of the braking system to engage a brake with a wheel 25 of the vehicle 20.

As in the other examples, the lever 1030 may be pivotally attached to the housing 1010 at a lever pivot 1034 that is spaced a predetermined distance from an inboard end 1031 of the lever 1030. The lever 1030 may have a contact region 1035 between the lever pivot 1034 and the first end 1031, where the contact region 1035 may contact a stop 1090 to prevent rotational movement toward the inboard end 1011 of the housing 1010. The stop 1090 may positioned on the housing 1010 and in some examples may be integrally formed with the housing 1010. Optionally, a clamp 1095 may be attached to the housing 1010 and extend around a majority of the first end 1011 of the housing 1010 to help secure housing 1010 to the handlebar of the vehicle. The clamp 1095 may include the stop 1090 that contacts the contact region 1035 to prevent rotational movement of the lever 1030 when a force is applied to the inboard region 1037. In addition, the clamp 1095 may also include a receiver 1098 that receives the cable casing. The cable may extend from the cable anchor 1092 to outside the grip assembly 1002 and along the outside of the handlebar and then to other brake components of the brake system.

The lever pivot 1034 location may allow for a user to keep their hand on the brake lever 1030 at all times to help improve the safety for a user, where an index finger and middle finger of a user may be located inboard of the lever pivot 1034 on the inboard region 1037 and a ring finger and pinky finger of a user may be located outward of the lever pivot 1034 on the outboard region 1038. Thus, when a user applies a force to the inboard region 1037 of the brake lever 1030 (e.g., when a user squeezes the lever 1030 with an index and middle finger inboard of the lever pivot 1034 between the first end 1031 and the lever pivot 1034), the interaction between the contact region 1035 and the stop 1090 prevents rotational movement of the lever 1030 to prevent any accidental braking. To apply a braking force, a user may apply a force, F, to the outboard region 1038 of the lever 1030 (e.g., when a user squeezes the lever 1030 outboard of the lever pivot 1034 between the second end 1032 and the lever pivot 1034), the lever 1030 may rotate toward the interior cavity 1014 of the housing 1010. As the outboard region 1038 of the lever 1030 rotates toward the interior cavity 1014, the cable anchor 1092 may move outboard and/or upward the cable of a brake system 10 of the vehicle resulting in a brake engaging a wheel 25 of the vehicle 20.

As shown in FIGS. 49-50, the lever 1030 may have a first end 1031, a second end 1032, and a lever body 1033 that extends from the first end 1031 to the second end 1032. As discussed above, the lever 1030 may be pivotally engaged with the housing 1010 at lever pivot 1034. The lever 1030 may be pivotally attached to the housing 1010 at a lever pivot 1034 that is spaced a predetermined distance from a first end 1031 of the lever 1030. The predetermined distance may be approximately 50 percent of an overall length of the lever 1030, where the overall length of the lever 1030 is the distance from a first end 1031 to the second end 1032. In some examples, the predetermined distance may be within a range of 25 percent and 50 percent of the overall length of the lever 1030, or within a range of 35 percent and 45 percent of the overall length of the lever 1030. Optionally, the predetermined distance may be within a range of 10 percent and 90 percent of the overall length of the lever 1030, or within a range of 25 percent and 75 percent of the overall length of the lever 1030. A portion of the lever body 1033 may be enclosed in the interior cavity 1014 of the housing 1010 while a portion of the lever body 1033 may extend through a lower opening 1016 in the housing 1010. The cable anchor 1092 may formed separately and be connected to the lever 1030 or may be integrally formed with the lever 1030. The cable anchor 1092 may be located inboard of the lever pivot 1034 and in some cases, the cable anchor 1092 may also be located below the lever pivot 1034 (i.e., in a direction away from the lower opening 1016 of the housing 1010 toward the lever 1030).

The housing 1010 having a first or inboard end 1011, a second or outboard end 1012 opposite the inboard end 1011, and a housing body 1013 extending between the inboard end 1011 and the outboard end 1012. The inboard end 1011 may have a side opening 1015 that extends into an interior cavity 1014, and a lower opening 1016 on the housing 1010 that also extends into the interior cavity 1014.

As best illustrated in FIGS. 49-50, a force, F, applied to the lever 1030 in the outboard region 1038 between the second end 1032 and the lever pivot 1034 may cause the lever 1030 to rotate toward the interior cavity 1014 of the housing 1010. As the lever 1030 rotates, the cable anchor 1092 move with the lever 1030 to pull the cable of the braking system to engage the brake. In FIG. 49, the lever 1030 may be in a normal or rest position. In FIG. 50, the lever 1030 has received a force, F, causing the lever 1030 to rotate upward toward an interior cavity 1014 of the housing 1010 to an engaged position. As the lever 1030 moves upwards, the cable anchor 1092 may rotate with the lever 1030 to pull the cable toward an outboard end 1012 of the housing 1010 to engage the braking system. Once the force, F, is removed the tension in the cable pulls the cable anchor 1092 along with the lever 1030 back to the normal or rest position.

The present disclosure is disclosed above and in the accompanying drawings with reference to a variety of examples and embodiments. The purpose served by the disclosure, however, is to provide examples of the various features and concepts related to the disclosure, not to limit the scope of the disclosure. One skilled in the relevant art will recognize that numerous variations and modifications may be made to the aspects described above without departing from the scope of the present invention, as defined by the appended claims. The claims are not to be limited to details of the preferred embodiment except as stated to exist in the claims, and definitions of claim terms are not to be used as a subterfuge to limit the claims to details of the preferred embodiments by defining claim terms narrowly such that they incorporate details of the preferred embodiment.

What is claimed is:

1. A grip assembly for a vehicle comprising:
    a housing having a first end, a second end opposite the first end, and a housing body extending between the first end and the second end, wherein the first end has a first opening that extends into an interior cavity, and a second opening of the housing that extends into the interior cavity, wherein the first opening receives a handlebar of the vehicle;
    a lever having a first end, a second end opposite the first end, and a lever body extending between the first end and the second end, the lever pivotally connected to the housing at a lever pivot that is located a predetermined distance from the first end of the lever, wherein the lever includes an inboard region located between the first end of the lever and the lever pivot and configured to contact an index finger of a user and an outboard region located between the second end of the lever and the lever pivot and configured for a pinky finger of the user;
    a bearing linkage having a first end pivotally connected to the housing at a first linkage pivot and a second end of the bearing linkage connected to a piston, wherein the piston is slidably connected to a hydraulic cylinder that connects to a hydraulic line that is part of a hydraulic braking system; and
    wherein when the outboard region of the lever rotates toward the interior cavity, the second end of the bearing linkage pushes on the piston.

2. The grip assembly of claim 1, wherein the hydraulic cylinder is anchored to the lever.

3. The grip assembly of claim 1, wherein the hydraulic line extends from the hydraulic cylinder and then extends outside of the handlebar of the vehicle.

4. The grip assembly of claim 1, wherein the hydraulic cylinder has a first end that receives the piston and a second end opposite the first end that connects to the hydraulic line.

5. The grip assembly of claim 1, wherein the inboard region has a contact region that contacts a stop to prevent rotational movement of the lever toward the housing when a force is applied to the inboard region.

6. The grip assembly of claim 5, wherein the stop that contacts the contact region is integrally formed with the housing.

7. The grip assembly of claim 5, wherein a clamp secures the handlebar to the housing, and wherein the clamp forms the stop that contacts the contact region.

8. The grip assembly of claim 1, wherein the second end of the lever includes an access opening to allow access to a bleeder stem extending from the hydraulic cylinder.

9. A grip assembly for a vehicle comprising:
    a housing having a first end, a second end opposite the first end, and a housing body extending between the first end and the second end, wherein the first end has a first opening that extends into an interior cavity, and a second opening of the housing that extends into the interior cavity, wherein the first opening receives a handlebar of the vehicle;
    a lever having a first end, a second end opposite the first end, and a lever body extending between the first end and the second end, the lever pivotally connected to the housing at a lever pivot that is located a predetermined distance from the first end of the lever, wherein the lever includes an inboard region located between the first end of the lever and the lever pivot and configured to contact an index finger of a user and an outboard region located between the second end of the lever and the lever pivot and configured for a pinky finger of the user;
    the lever comprising a plunger pin, wherein the plunger pin is adjacent a rear surface of a piston, wherein the piston is slidably connected to a hydraulic cylinder that connects to a hydraulic line that is part of a hydraulic braking system; and
    wherein when the outboard region of the lever rotates toward the interior cavity, the plunger pin moves upward causing the piston to move within the hydraulic cylinder.

10. The grip assembly of claim 9, wherein the hydraulic cylinder is anchored to the housing.

11. The grip assembly of claim 9, wherein the hydraulic line extends from the hydraulic cylinder and then extends outside of the handlebar of the vehicle.

12. The grip assembly of claim 11, wherein the hydraulic cylinder has a first end that receives the piston and a second end opposite the first end that connects to the hydraulic line.

13. The grip assembly of claim 9, wherein the inboard region has a contact region that contacts a stop to prevent rotational movement of the lever toward the housing when a force is applied to the inboard region.

14. The grip assembly of claim 13, wherein the stop that contacts the contact region is integrally formed with the housing.

15. The grip assembly of claim 9, wherein the plunger pin is integrally formed with the lever.

16. A grip assembly for a vehicle comprising:
    a housing having a first end, a second end opposite the first end, and a housing body extending between the first end and the second end, the first end of the housing has a first opening that extends into an interior cavity, and a second opening located on a bottom side of the housing opposite a top side that extends into the interior cavity, wherein the first opening receives a handlebar of the vehicle;
    a lever having a first end, a second end opposite the first end, and a lever body extending between the first end and the second end, the lever being pivotally connected to the housing at a lever pivot that is located a predetermined distance from the first end of the lever;

wherein the lever also includes an inboard region located between the first end of the lever and the lever pivot and configured to contact an index finger of a user and an outboard region located between the second end of the lever and the lever pivot and configured for a pinky finger of the user;

a cable anchor mounted on an internal surface of the lever, wherein the cable anchor is configured to secure a cable of a brake system; and wherein when the outboard region of the lever rotates toward the interior cavity of the housing, the cable anchor moves with the lever to pull the cable of the brake system causing a brake of the brake system to engage with a wheel of the vehicle.

17. The grip assembly of claim 16, wherein the predetermined distance is within a range of 10 percent and 90 percent of an overall length of the lever.

18. The grip assembly of claim 16, wherein the cable anchor is located below the lever pivot.

19. The grip assembly of claim 16, wherein the cable anchor is located inboard of the lever pivot.

20. The grip assembly of claim 16, wherein the inboard region has a contact region that contacts a stop to prevent rotational movement of the lever toward the housing when a force is applied to the inboard region.

* * * * *